(12) United States Patent
Morimoto

(10) Patent No.: US 6,989,677 B2
(45) Date of Patent: Jan. 24, 2006

(54) CAPACITANCE TYPE SENSOR

(75) Inventor: Hideo Morimoto, Yamatokooriyama (JP)

(73) Assignee: Nitta Corporation, (JP)

( * ) Notice: Subject to any disclaimer, the term of this patent is extended or adjusted under 35 U.S.C. 154(b) by 73 days.

(21) Appl. No.: 10/432,939

(22) PCT Filed: Dec. 27, 2000

(86) PCT No.: PCT/JP00/09355

§ 371 (c)(1),
(2), (4) Date: May 28, 2003

(87) PCT Pub. No.: WO02/44649

PCT Pub. Date: Jun. 6, 2002

(65) Prior Publication Data
US 2004/0104735 A1    Jun. 3, 2004

(51) Int. Cl.
*G01R 27/26* (2006.01)
*G01L 1/00* (2006.01)

(52) U.S. Cl. ......................................... 324/660; 73/780
(58) Field of Classification Search ................ 324/660, 324/658, 649, 600, 661, 662, 663, 671, 674, 324/678, 681, 686, 688, 765, 776; 73/862.043, 73/780
See application file for complete search history.

(56) References Cited

U.S. PATENT DOCUMENTS

| | | | | |
|---|---|---|---|---|
| 4,606,132 A | * | 8/1986 | Briney et al. | 33/366.14 |
| 5,180,986 A | * | 1/1993 | Swartz et al. | 324/660 |
| 5,450,594 A | * | 9/1995 | Aden et al. | 709/225 |
| 6,003,371 A | * | 12/1999 | Okada | 73/504.02 |
| 6,053,057 A | * | 4/2000 | Okada | 73/862.043 |
| 6,076,401 A | * | 6/2000 | Okada | 73/504.12 |
| 6,098,461 A | * | 8/2000 | Okada | 73/514.34 |
| 6,158,291 A | * | 12/2000 | Okada | 73/862.043 |
| 6,159,761 A | * | 12/2000 | Okada | 438/53 |
| 6,205,856 B1 | * | 3/2001 | Okada | 73/504.11 |
| 6,282,956 B1 | * | 9/2001 | Okada | 73/504.12 |
| 6,378,381 B1 | * | 4/2002 | Okada et al. | 73/862.043 |
| 6,464,411 B1 | * | 10/2002 | Yoshida et al. | 396/349 |
| 6,530,283 B2 | * | 3/2003 | Okada et al. | 73/780 |
| 6,867,602 B2 | * | 3/2005 | Davis et al. | 324/664 |
| 6,882,164 B2 | * | 4/2005 | Yano et al. | 324/663 |
| 6,900,644 B2 | * | 5/2005 | Chou et al. | 324/661 |
| 6,910,385 B2 | * | 6/2005 | Shkel | 73/780 |

FOREIGN PATENT DOCUMENTS

| | | |
|---|---|---|
| JP | 6-139880 | 5/1994 |
| JP | 6-323939 | 11/1994 |
| JP | 6-324801 | 11/1994 |

(Continued)

Primary Examiner—Anjan Deb
Assistant Examiner—Hoai-An D Nguyen
(74) Attorney, Agent, or Firm—Osha Liang LLP

(57) ABSTRACT

Capacitance element electrodes (E1 to E5) and a grounded reference electrode (E0) are formed on a substrate (20). At a position opposite to these electrodes (E0 to E5), a displacement electrode (40) is disposed that is Z-axially deformable as a detective member (30) is externally operated to move Z-axially. The displacement electrode (40) cooperates with the reference electrode (E0) and capacitance element electrodes (E1 to E5) to form capacitance elements (C0 to C5), respectively. Each of the capacitance elements (C1 to C5) is connected in series with the capacitance element (C0) with respect to a signal externally input. Changes in the capacitance values of the capacitance elements (C1 to C5) as the detective member (30) is moved are detected to sense the displacement of the detective member (30).

33 Claims, 29 Drawing Sheets

FOREIGN PATENT DOCUMENTS

| | | |
|---|---|---|
| JP | 8-123613 | 5/1996 |
| JP | 10-141992 | 5/1998 |
| JP | 11-2504 | 1/1999 |
| JP | 2000-292271 | 10/2000 |

* cited by examiner

CAPACITANCE TYPE SENSOR

TECHNICAL FIELD

The present invention relates to capacitance type sensors suitably used for inputting operations in multidimensional directions, particularly to capacitance type sensors good in withstand voltage characteristic and capable of simplifying the manufacturing process.

BACKGROUND ART

A capacitance type sensor is used as a device for converting, into an electric signal, the intensity and direction of a force applied by an operator. For example, as an input device for a game machine used is a device incorporated as a capacitance type force sensor (so-called joy stick) for inputting operations in multidimensional directions.

Using the capacitance type sensor, an operation quantity with a predetermined dynamic range can be input as the intensity of a force applied by the operator. Such a sensor may be used in the form of a two-dimensional or three-dimensional force sensor capable of detecting each directional component divided from the applied force. In particular, a capacitance type sensor in which a capacitance element is made up of two electrodes and a force is detected on the basis of a change in the capacitance value due to a change in the interval between the electrodes, has a merit that a cost reduction can be intended by simplifying the construction. Therefore, sensors of this type have been put in practical use in various fields.

For example, Japanese Patent Application Laid-open No. 7(1995)-200164 discloses a capacitance type force sensor as illustrated in FIG. 36. The force sensor 510 is made up of a substrate 520, an elastic rubber sheet 530 provided on the substrate 520, an electrode 540 provided on the lower face of the elastic rubber sheet 530, electrodes 500 to 504 (see FIG. 37) provided on the upper face of the substrate 520, a holder plate 560 for supporting and fixing the elastic rubber sheet 530 to the substrate 520, and an electronic device 580 provided on the lower face of the substrate 520. As illustrated in FIG. 37, the electrodes 500 to 504 are constituted by four electrodes 501 to 504 disposed symmetrically around the origin, and an annular electrode 500 disposed outside them. An outer peripheral portion of the electrode 540 is in contact with the electrode 500, which is grounded, so that the electrode 540 is also grounded through the electrode 500.

When an operator depresses the elastic rubber sheet 530, the elastic rubber sheet 530 is deformed downward to change the respective distances between it and the four electrodes 501 to 504. The capacitance values of the respective capacitance elements formed between the four electrodes 501 to 504 and the electrode 540 change accordingly. Thus, by detecting the changes in the capacitance values, the intensity and direction of the force applied by the operator can be known.

On the other hand, Japanese Patent No. 3020736 discloses a capacitance type acceleration sensor as illustrated in FIG. 38. The acceleration sensor 610 is made up of a fixed substrate 620, a flexible substrate 621, a fixed electrode 600 provided on the fixed substrate 620, displacement electrodes 641 to 645 (see FIG. 39) provided on the flexible substrate 621, an action member 630, and a device casing 660. As illustrated in FIG. 39, the displacement electrodes 641 to 645 are constituted by four electrodes 641 to 644 disposed symmetrically around the Z-axis, and a disk-shaped electrode 645 disposed inside them. The fixed electrode 600 is grounded through a not-illustrated wire.

When a force is applied to an application point P, the flexible substrate 621 is curved. The displacement electrodes 641 to 645 thereby move upward to change the respective intervals between them and the fixed electrode 600. The capacitance values of the respective capacitance elements formed between the five displacement electrodes 641 to 645 and the fixed electrode 600 change accordingly. Thus, by detecting the changes in the capacitance values, the intensity and direction of the force applied to the application point P can be known.

As described above, in case of the force sensor 510 illustrated in FIG. 36, the electrode 540 is grounded through its outer peripheral portion being in contact with the electrode 500. Therefore, the force sensor 510 has no need of a wire for grounding the electrode 540. In this force sensor 510, however, since the electrode 540 is electrically connected directly to the electrode 500, if a high voltage is applied to the electrode 540, a spike current may flow in the substrate 520 that is supporting the electrode 500. There is a possibility of a trouble with or a breakdown of the force sensor 510. That is, the force sensor 510 is inferior in view of its withstand voltage characteristic. Besides, if the electrical connection between the electrodes 540 and 500 has become bad due to aged deterioration or the like, an accurate sensor output cannot be obtained. Thus, the force sensor 510 illustrated in FIG. 36 is unsatisfactory in view of its reliability.

On the other hand, the acceleration sensor 610 illustrated in FIG. 38 is superior in view of its reliability. But, since the capacitance elements are in parallel relation in a way, the fixed substrate 620 must be provided with a wire for grounding the fixed electrode 600, besides the flexible substrate 621 supporting the displacement electrodes 641 to 645 must be provided with wires for supplying external signals to those electrodes. However, providing both of the fixed and flexible substrates 620 and 621 with such wires brings about a complicated structure and a complicated manufacturing process of this kind of acceleration sensor.

A primary object of the present invention is to provide capacitance type sensors high in reliability and simple in manufacturing process and structure.

DISCLOSURE OF THE INVENTION

According to an aspect, a capacitance type sensor of the present invention is characterized in that said sensor comprises a conductive member determining an XY-plane in a defined XYZ three-dimensional coordinate system; a pair of capacitance element electrodes cooperating with said conductive member to form first capacitance elements, respectively; a reference electrode cooperating with said conductive member to form a second capacitance element, said reference electrode being grounded or kept at a certain potential; and a detective member Z-axially movable to move said conductive member or said pair of capacitance element electrodes Z-axially, and each of said first capacitance elements and said second capacitance element are connected in series with each other with respect to a signal input to each of said capacitance element electrodes in said pair, and said sensor can sense displacement of said detective member on the basis of detection of changes in the respective capacitance values of said first capacitance elements caused by changes in the intervals between said conductive member and said capacitance element electrodes in said pair.

According to a further aspect, a capacitance type sensor of the present invention is characterized in that said sensor comprises a substrate determining an XY-plane in a defined XYZ three-dimensional coordinate system; a detective member being opposite to said substrate; a conductive member disposed in between said substrate and said detective member, said conductive member being Z-axially movable as said detective member is Z-axially moved; a pair of capacitance element electrodes formed on said substrate and cooperating with said conductive member to form first capacitance elements, respectively; and a reference electrode formed on said substrate and cooperating with said conductive member to form a second capacitance element, said reference electrode being grounded or kept at a certain potential, and each of said first capacitance elements and said second capacitance element are connected in series with each other with respect to a signal input to each of said capacitance element electrodes in said pair, and said sensor can sense displacement of said detective member on the basis of detection of changes in the respective capacitance values of said first capacitance elements caused by changes in the intervals between said conductive member and said capacitance element electrodes in said pair.

According to another aspect, a capacitance type sensor of the present invention is characterized in that said sensor comprises a conductive member determining an XY-plane in a defined XYZ three-dimensional coordinate system; a pair of capacitance element electrodes cooperating with said conductive member to form first capacitance elements, respectively; a reference electrode cooperating with said conductive member to form a second capacitance element, said reference electrode being grounded or kept at a certain potential; an insulating member disposed in between said conductive member and said pair of capacitance element electrodes; and a detective member movable along said XY-plane to move said insulating member or said conductive member and said pair of capacitance element electrodes along said XY-plane, and each of said first capacitance elements and said second capacitance element are connected in series with each other with respect to a signal input to each of said capacitance element electrodes in said pair, and said sensor can sense displacement of said detective member on the basis of detection of changes in the respective capacitance values of said first capacitance elements caused by a change, along said XY-plane, of the position of an end portion of said insulating member between said conductive member and said pair of capacitance element electrodes.

According to still another aspect, a capacitance type sensor of the present invention is characterized in that said sensor comprises a substrate determining an XY-plane in a defined XYZ three-dimensional coordinate system; a detective member being opposite to said substrate; a conductive member being opposite to said substrate; a pair of capacitance element electrodes formed on said substrate and cooperating with said conductive member to form first capacitance elements, respectively; a reference electrode formed on said substrate and cooperating with said conductive member to form a second capacitance element, said reference electrode being grounded or kept at a certain potential; and an insulating member disposed in between said conductive member and said pair of capacitance element electrodes, and movable in parallel with said substrate as said detective member is moved along said XY-plane, and each of said first capacitance elements and said second capacitance element are connected in series with each other with respect to a signal input to each of said capacitance element electrodes in said pair, and said sensor can sense displacement of said detective member on the basis of detection of changes in the respective capacitance values of said first capacitance elements caused by a change, along said XY-plane, of the position of an end portion of said insulating member between said conductive member and said pair of capacitance element electrodes.

In the above constructions, the conductive member used in common for constituting the first and second capacitance elements is electrically coupled with the reference electrode grounded or kept at a certain potential, not by being in direct contact with the reference electrode but through capacitive coupling. Therefore, the withstand voltage characteristic of the sensor is improved and the sensor is hardly broken due to the flow of a spark current. Besides, a bad condition in electrical connection or the like can be prevented. Thus, a highly reliable capacitance type sensor can be obtained. In addition, since the first and second capacitance elements are connected in series with each other, by providing wiring only on a member such as the substrate supporting the capacitance element electrode and the reference electrode, any wiring for grounding the conductive member or keeping it at a certain potential need not separately be provided. Therefore, a capacitance type sensor having a simple structure can be manufactured through a less number of manufacturing steps.

Any of the capacitance type sensors of the present invention may comprise a single reference electrode. By this, the manufacture of the reference electrode becomes easy.

Any of the capacitance type sensors of the present invention may comprise a plurality of reference electrodes. By this, even in case that the capacitance element electrode is disposed to be surrounded by the reference electrodes for example, wiring for the capacitance element electrode can easily be provided through the gaps between the reference electrodes. Besides, in the capacitance type sensors of the present invention, it is preferable to form a plurality of capacitance element electrodes. By this, the respective capacitance element electrodes can be used for sensing forces in different directions. This makes it possible to sense a multidimensional force.

In the capacitance type sensors of the present invention, two capacitance element electrodes in a pair may be provided and signals different in phase from each other may be supplied to a circuit including one of the capacitance element electrodes in the pair and a circuit including the other of the capacitance element electrodes. By this, irrespective of whether or not the circuit including one of the capacitance element electrodes in the pair and the circuit including the other of the capacitance element electrodes have the same time constant, displacement of the detective member can be sensed.

In the capacitance type sensors of the present invention, two capacitance element electrodes in a pair may be provided and a CR circuit including one of the capacitance element electrodes in the pair may differ in time constant from a CR circuit including the other of the capacitance element electrodes. In this construction, since phase shifts in signals by passing through the circuits can be increased, the accuracy in sensing displacement of the detective member can be improved.

In the capacitance type sensors of the present invention, the signal to be input to the capacitance element electrode may be a signal periodically repeating a high level and a low level, and a control element (such as an open-collector type inverter) may be provided that has a function of discharging the first capacitance element when the signal is at the low level. By this, since electric charges having been held by the capacitance element can be relieved in a moment, charging can efficiently be performed. In addition, the waveform density of the signal can be made high and the accuracy of the signal processing circuit can be improved.

In the capacitance type sensors of the present invention, it is preferable that two capacitance element electrodes in a pair are provided and output signals obtained from signals respectively input to a circuit including one of the capacitance element electrodes in the pair and a circuit including the other of the capacitance element electrodes are detected with a signal processing circuit utilizing a logic element that performs an exclusive-OR, OR, or AND operation. By this, the output signals can accurately be detected. Further, the detection accuracy can be controlled as occasion demands.

Any of the capacitance type sensors of the present invention preferably further comprises an insulating film formed in close contact with the capacitance element electrode and the reference electrode to cover the substrate. As the insulating film usable are thin resin films, thin resist films, etc. By this, since the insulating film is formed in close contact with the capacitance element electrode to cover the corresponding part of the upper portion of the substrate, the capacitance element electrode can be prevented from being exposed to air and thereby the electrode surface can be prevented from being oxidized.

In the capacitance type sensors of the present invention, the capacitance element electrode may comprise a pair of first capacitance element electrodes disposed symmetrically with respect to a Y-axis, a pair of second capacitance element electrodes disposed symmetrically with respect to an X-axis, and a third capacitance element electrode disposed near the origin. By this, the X-axial, Y-axial, and Z-axial components of an external force received by the detective member can be sensed independently of one another. The third capacitance element electrode may not be used for sensing any Z-axial component but be used for determination operations for inputs.

In the capacitance type sensors of the present invention, a protrusion may be formed on the conductive member at the position opposite to the third capacitance element electrode. By this, since the conductive member can be deformed with the protrusion serving as a fulcrum, an X- or Y-axial component can easily be detected.

In the capacitance type sensors of the present invention, the detective member is preferably divided so as to correspond to the first capacitance element electrodes, the second capacitance element electrodes, and the third capacitance element electrode, respectively, or to the first and second capacitance element electrodes and the third capacitance element electrode, respectively. In this construction, since the X-axial, Y-axial, and Z-axial components of an external force are distinctly separated, the interference between components in different directions can be relieved and so erroneous operations can be decreased.

In the capacitance type sensors of the present invention, the surface of the conductive member opposite to the capacitance element electrode is preferably made uneven in height. By this, since the uneven surface of the conductive member is opposite to the capacitance element electrode to form a capacitance element, the capacitance value of the capacitance element can change more minutely. This can improve the detection accuracy of an external force.

In the capacitance type sensors of the present invention, the conductive member may comprise a displacement portion movable as the detective member is moved by receiving an external force, a fixed portion fixed to the substrate, and an interconnecting portion for interconnecting the displacement and fixed portions, the first and second capacitance element electrodes may be formed outside the third capacitance element electrode, and the reference electrode may be formed outside the first and second capacitance element electrodes.

In the capacitance type sensors of the present invention, the reference electrode may comprise a first reference electrode and a second reference electrode, either of which is grounded or kept at a certain potential, the conductive member may be divided so as to correspond to the first and second capacitance element electrodes and the third capacitance element electrode, respectively, the first reference electrode may be formed outside the third capacitance element electrode, the first and second capacitance element electrodes may be formed outside the first reference electrode, and the second reference electrode may be formed outside the first and second capacitance element electrodes. In this construction, since three of the X-axial, Y-axial, and Z-axial components of an external force received by the detective member can be sensed, operations along the three different axes can be sensed.

In the capacitance type sensors of the present invention, the reference electrode may be formed outside the third capacitance element electrode, and the first and second capacitance element electrodes may be formed outside the reference electrode. In addition, any of the capacitance type sensors may comprise a fourth capacitance element electrode disposed in contact with the reference electrode and at a distance from the third capacitance element electrode to cover the third capacitance element electrode. The fourth capacitance element electrode may be capable of coming into contact with the third capacitance element electrode when the conductive member is moved as the detective member is moved by receiving an external force. In this construction, since two of the X-axial and Y-axial components of an external force received by the detective member can be sensed, operations along the two different axes can be sensed. Further, since the fourth capacitance element electrode is provided, determination operations for inputs can be sensed. In addition, since distinct operation feeling is obtained upon a determination operation, erroneous operations can be prevented.

The capacitance type sensors of those constructions are preferably used for input devices for personal computers, portable telephones, games, etc.

In the capacitance type sensors of the present invention, the detective member and the conductive member may be formed into one body. In this construction, since the detective member and the conductive member are formed into one body, the manufacture is easy and further the manufacturing cost can be decreased.

In the capacitance type sensors of the present invention, the conductive member is preferably made of an elastic material. In this construction, the efficiency of transmission of an external force received by the detective member, to the conductive member is improved. This brings about an improvement of operability. In addition, since the impact of the external force can be relieved, the damage of the capacitance type sensor can be relieved.

Any of the capacitance type sensors of the present invention preferably further comprises a supporting member made of an elastic material for supporting the conductive member. In this construction, since the supporting member is made of an elastic material, the impact of the external force can be relieved and so the damage of the capacitance type sensor can be relieved. Further, the water and dust proofing can effectively be obtained between the supporting member and a cover case. In addition, by an elastic restoring force of the supporting member, the conductive member can automatically be returned to its original position when a force is relieved.

In the present invention, for the conductive member, a conductive rubber, a conductive ink, or a conductive thermoplastic resin (PPT or elastomer) is used for example.

BEST MODE FOR CARRYING OUT THE INVENTION

Hereinafter, preferred embodiments of the present invention will be described with reference to drawings. In any of the below-described embodiments, a capacitance type sensor of the present invention is used as a force sensor.

Figure 1:
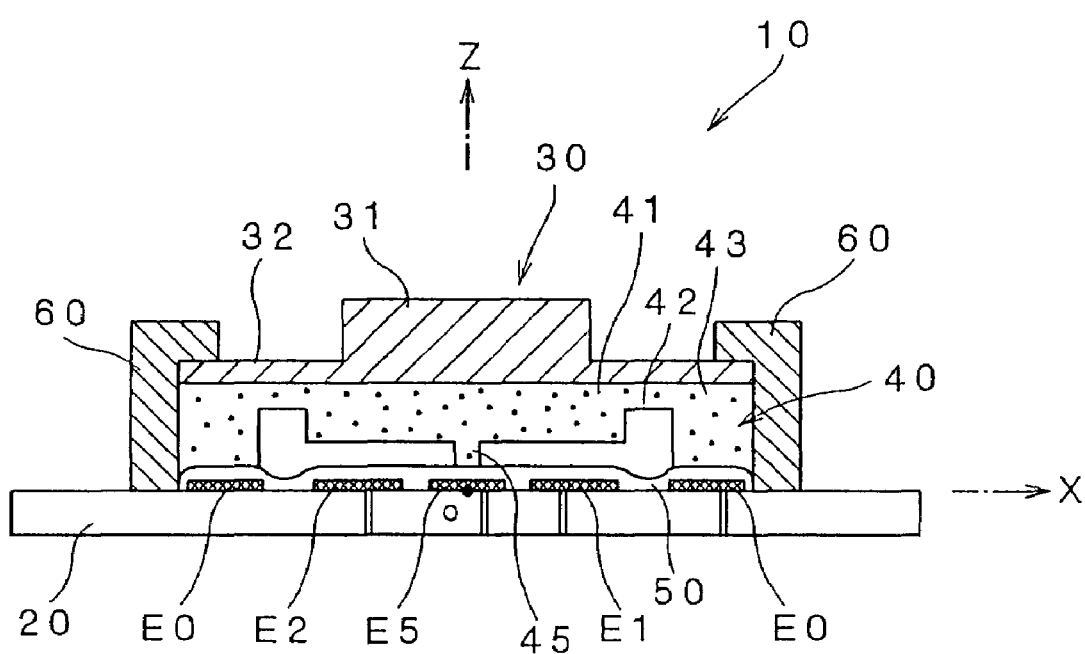
FIG. 1 is a schematic sectional view of a capacitance type sensor according to the first embodiment of the present invention.
Figure 2:
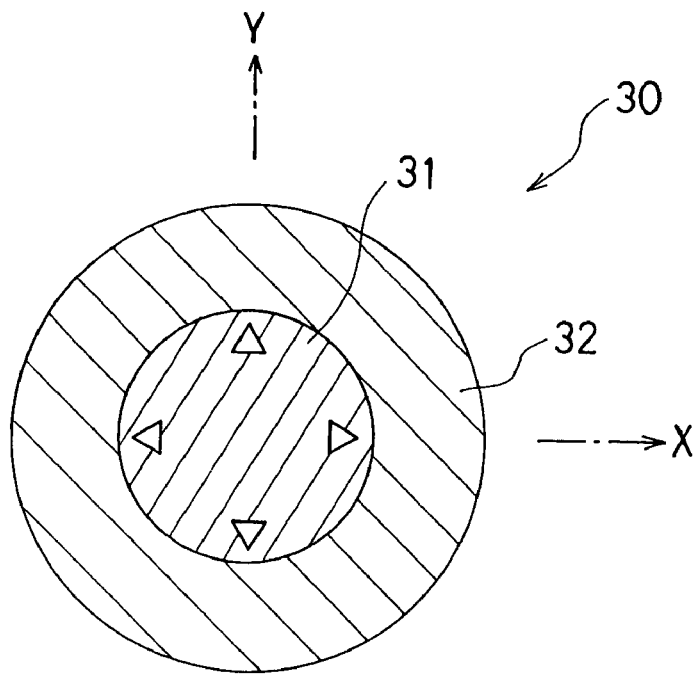
FIG. 2 is an upper view of a detective member of the capacitance type sensor of FIG. 1.
Figure 3:
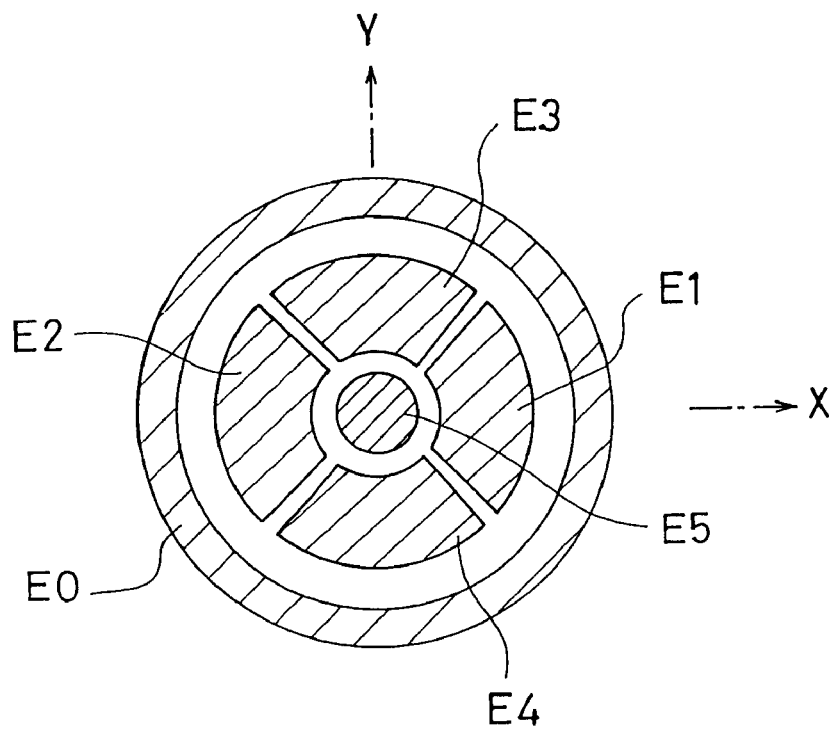
FIG. 3 illustrates an arrangement of electrodes formed on a substrate of the capacitance type sensor of FIG. 1.

FIG. 1 is a schematic sectional view of a capacitance type sensor according to the first embodiment of the present invention. FIG. 2 is an upper view of a detective member of the capacitance type sensor of FIG. 1. FIG. 3 illustrates an arrangement of electrodes formed on a substrate of the capacitance type sensor of FIG. 1.

The capacitance type sensor 10 includes a substrate 20, a detective member 30 as an operation member to which a force is externally applied by being operated by a person or the like, a displacement electrode 40, capacitance element electrodes E1 to E5 and a reference electrode (a common electrode) E0 formed on the substrate 20, an insulating film 50 formed in close contact with the capacitance element electrodes E1 to E5 and the reference electrode E0 to cover the corresponding part of the upper portion of the substrate 20, and a supporting member 60 for supporting and fixing the detective member 30 and the displacement electrode 40 to the substrate 20.

For convenience of explanation, an XYZ three-dimensional coordinate system is defined as illustrated and the arrangement of the aforementioned components will be explained with reference to the coordinate system. That is, in FIG. 1, the origin O is set on the substrate 20 at the position opposite to the center of the displacement electrode 40, the X-axis is set so as to horizontally extend rightward, the Z-axis is set so as to vertically extend upward, and the Y-axis is set so as to extend backward perpendicularly to FIG. 1. Thus, the upper face of the substrate 20 is on the XY-plane and the Z-axis extends through the respective centers of the capacitance element electrode E5 on the substrate 20, the detective member 30, and the displacement electrode 40.

The substrate 20 may be a general printed circuit board for an electronic circuit. In this embodiment, a glass epoxy board is employed. Otherwise, a filmy substrate such as a polyimide film may be used as the substrate 20. However, such a filmy substrate may be too flexible, so it is preferably disposed on a sufficiently rigid supporting board.

The detective member 30 is made up of a small-diameter upper step portion 31 as a force-receiving portion and a large-diameter lower step portion 32 formed on the lower side of the upper step portion 31. The whole of the detective member 30 is formed into a disk shape. The diameter of the upper step portion 31 is substantially equal to or somewhat smaller than the diameter of the circle determined by connecting the outer circumferential curves of the capacitance element electrodes E1 to E4, while the diameter of the lower step portion 32 is substantially equal to the outer diameter of the reference electrode E0. In order to improve the operability, a resin cap may be put on the detective member 30.

On the upper face of the upper step portion 31 of the detective member 30, as illustrated in FIG. 2, indicators corresponding to the respective operation directions (movement directions of a cursor) are provided so as to correspond to the positive and negative directions of the X- and Y-axes, i.e., to the capacitance element electrodes E1 to E4.

The displacement electrode 40 is made of a conductive rubber. The displacement electrode 40 is disk-shaped having its diameter equal to the diameter of the lower step portion 32 of the detective member 30. The displacement electrode 40 is attached to the lower face of the detective member 30. In the lower face of the displacement electrode 40, a circular recess open downward is formed concentrically with the displacement electrode 40. On the bottom of the recess, a circular, downward swelling is formed concentrically with the displacement electrode 40. A protrusion 45 is formed at the center of the swelling (the center of the displacement electrode 40). Thus, the displacement electrode 40 is made up of a displacement portion 41 (the swelling on the bottom of the recess formed in the lower portion of the displacement electrode 40) that is displaced attendant upon the displacement of the detective member 30, a fixed portion 43 being most peripheral (the portion other than the recess formed in the lower portion of the displacement electrode 40), and an interconnecting portion (the portion other than the swelling on the bottom of the recess formed in the lower portion of the displacement electrode 40) interconnecting the displacement and fixed portions 41 and 43. Note that the protrusion 45 may not be provided. Besides, the displacement electrode 40 may be made of metal having electrical conductivity.

As described above, since the protrusion 45 is formed at the center of the displacement electrode 40, when a force is applied to the detective member 30, the displacement electrode 40 can incline with the protrusion 45 serving as a fulcrum. As well as the detective member 30, the displacement electrode 40 is supported and fixed by the supporting member 60 so that the lower faces of the fixed portion 43 and protrusion 45 may be in close contact with the insulating film 50 formed on the substrate 20.

As illustrated in FIG. 3, on the substrate 20 formed are a circular capacitance element electrode E5 having its center at the origin O, fan-shaped capacitance element electrodes E1 to E4 disposed outside the capacitance element electrode E5, and a ring-shaped reference electrode E0 disposed outside the capacitance element electrodes E1 to E4 so that the center of the reference electrode E0 may be at the origin O. The capacitance element electrodes E1 and E2 in a pair are disposed at a distance from each other along the X-axis and symmetrically with respect to the Y-axis. Also, the capacitance element electrodes E3 and E4 in a pair are disposed at a distance from each other along the Y-axis and symmetrically with respect to the X-axis. Alternatively, the reference electrode E0 may be formed between the capacitance element electrode E5 and the capacitance element electrodes E1 to E4. Otherwise, the capacitance element electrode E5 may be omitted to form there a circular reference electrode E0 having its center at the origin O. In this case, however, any Z-axial component cannot be detected.

In this embodiment, the capacitance element electrode E1 is disposed so as to correspond to the X-axial positive direction while the capacitance element electrode E2 is disposed so as to correspond to the X-axial negative direction. Thus, they are used for detecting the X-axial component of an external force. Also, the capacitance element electrode E3 is disposed so as to correspond to the Y-axial positive direction while the capacitance element electrode E4 is disposed so as to correspond to the Y-axial negative direction. Thus, they are used for detecting the Y-axial component of an external force. Further, the capacitance element electrode E5 is disposed on the origin O and it is used for detecting the Z-axial component of an external force.

The reference electrode E0 and the capacitance element electrodes E1 to E5 are connected to terminals T0 to T5 (see FIG. 4) via through-holes or the like, respectively. They are connected with an external electronic circuit through the terminals T0 to T5. In this embodiment, the reference electrode E0 is grounded via the terminal T0.

The insulating film 50 is formed in close contact with the capacitance element electrodes E1 to E5 and reference electrode E0 on the substrate 20 to cover the corresponding part of the upper portion of the substrate 20. Therefore, the capacitance element electrodes E1 to E5 and reference electrode E0, which are made of copper or the like, are never exposed to air. Thus, the insulating film 50 has a function of preventing them from being oxidized. Since the insulating film 50 is formed, the capacitance element electrodes E1 to E5 and reference electrode E0 never come into direct contact with the displacement electrode 40.

Thus, each of the capacitance element electrodes E1 to E5 and reference electrode E0 cooperates with the displacement electrode 40 to form a capacitance element between them. More specifically, the capacitance element electrodes E1 to E5 cooperate with the displacement portion 41 of the displacement electrode 40 to constitute capacitance elements C1 to C5, respectively. The reference electrode E0 cooperates with the fixed portion 43 of the displacement electrode 40 to constitute a capacitance element C0.

Figure 4:
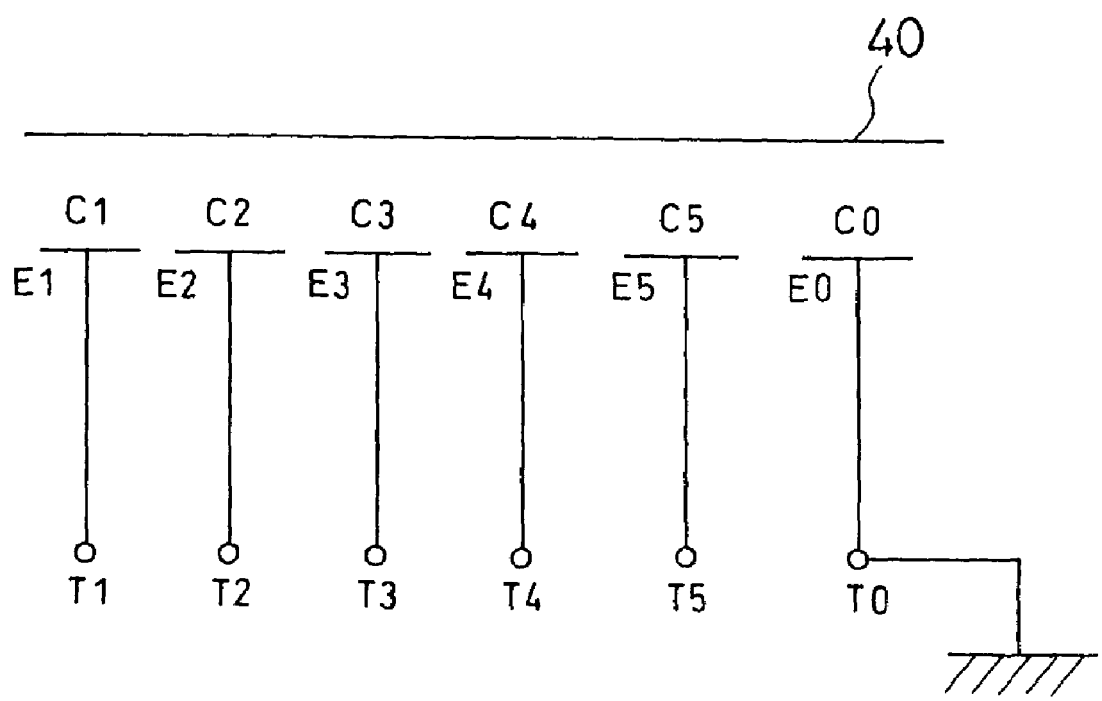
FIG. 4 is a circuit diagram equivalent to the construction of the capacitance type sensor illustrated in FIG. 1.
Figure 5:
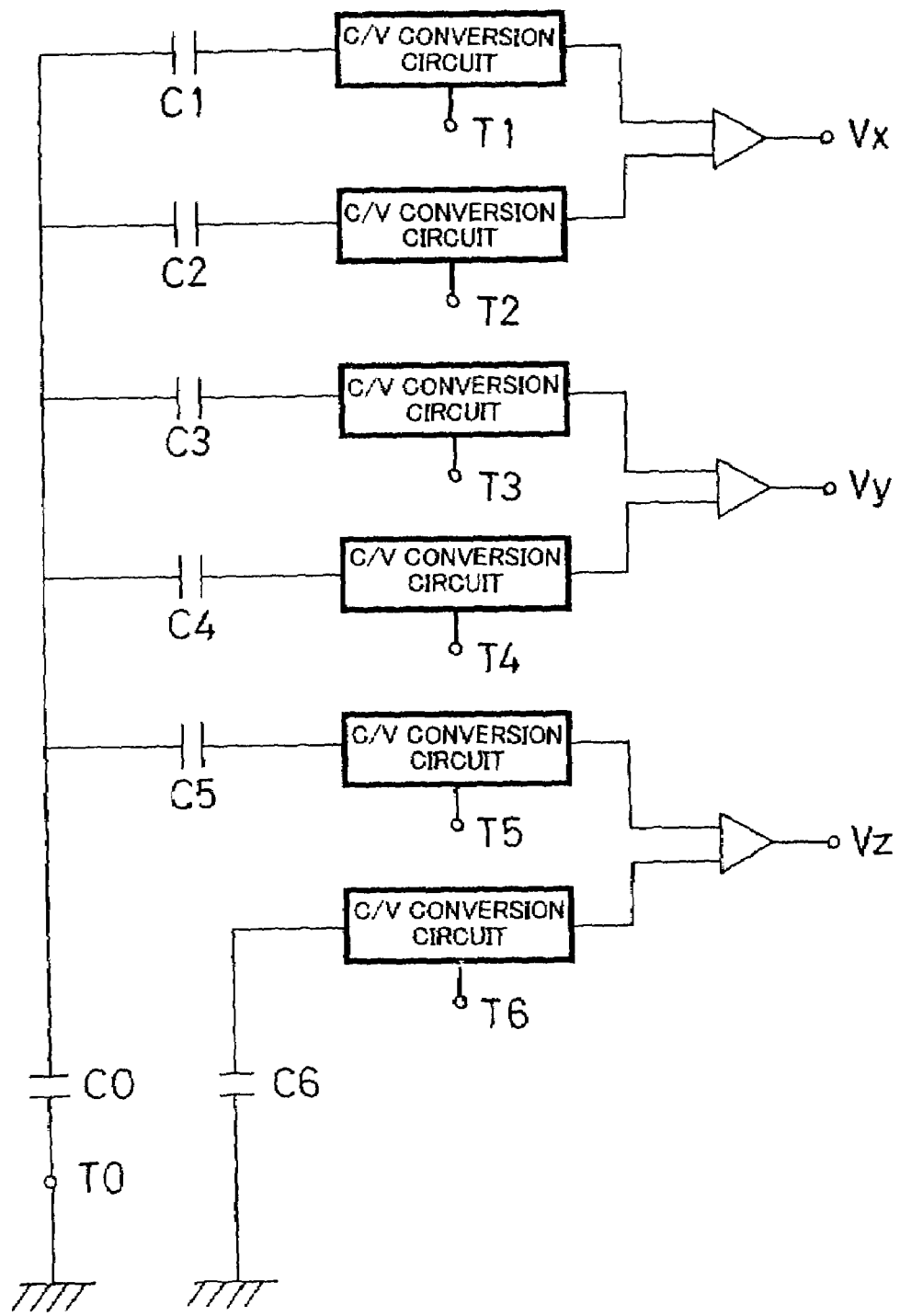
FIG. 5 is an explanatory diagram for explaining a method for deriving an output signal from a cyclic signal being input to the capacitance type sensor illustrated in FIG. 1.
Figure 6:
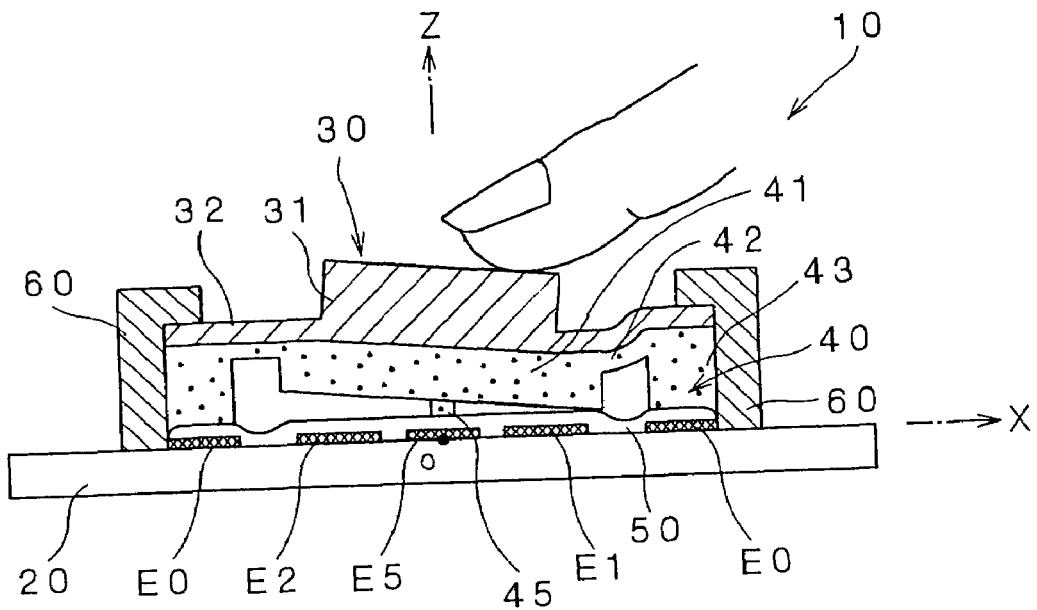
FIG. 6 is a schematic sectional side view when an operation in the X-axial positive direction is applied to the detective member of the capacitance type sensor illustrated in FIG. 1.
Figure 7:
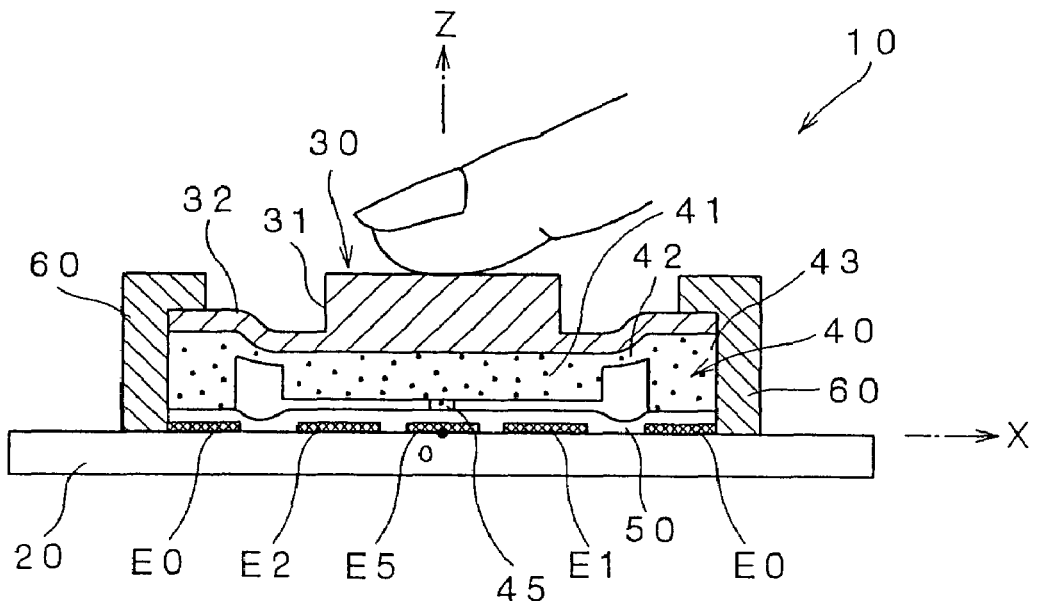
FIG. 7 is a schematic sectional side view when a Z-axial operation is applied to the detective member of the capacitance type sensor illustrated in FIG. 1.

Next, the operation of the capacitance type sensor 10 according to this embodiment constructed as described above will be described with reference to drawings. FIG. 4 is a circuit diagram equivalent to the construction of the capacitance type sensor illustrated in FIG. 1. FIG. 5 is an explanatory diagram for explaining a method for deriving an output signal from a cyclic signal being input to the capacitance type sensor illustrated in FIG. 1. FIG. 6 is a schematic sectional side view when an operation in the X-axial positive direction is applied to the detective member of the capacitance type sensor illustrated in FIG. 1. FIG. 7 is a schematic sectional side view when a Z-axial operation is applied to the detective member of the capacitance type sensor illustrated in FIG. 1.

First, a circuit construction equivalent to the construction of the capacitance type sensor 10 will be described with reference to FIG. 4. The capacitance element electrodes E1 to E5 and reference electrode E0 formed on the substrate 20 are opposite to the displacement electrode 40. The capacitance elements C0 to C5 are formed between the deformable displacement electrode 40 as a common electrode and the fixed reference electrode E0 and capacitance element electrodes E1 to E5, respectively. The capacitance elements C1 to C5 are variable capacitance elements whose capacitance values change due to the deformation of the displacement electrode 40.

The capacitance values of the capacitance elements C0 to C5 can be measured independently of one another as the capacitance values between the displacement electrode 40 and the respective terminals T0 to T5 connected to the reference electrode E0 and capacitance element electrodes E1 to E5. The reference electrode E0 is grounded via the terminal T0. Thus, the displacement electrode 40 as a common electrode of the capacitance elements C1 to C5 is considered to be grounded via the capacitance element C0 and the terminal T0. That is, the capacitance element C0 makes capacitive coupling between the displacement electrode 40 and the terminal T0.

Next, a deriving method of an output signal indicating the intensity and direction of an external force to the detective member 30, from a change in capacitance value of each of the capacitance elements C1 to C5, will be described with reference to FIG. 5. In FIG. 5, output signals $V_x$, $V_y$, and $V_z$ indicate the intensities and directions of the X-axial, Y-axial, and Z-axial components of an external force, respectively.

A capacitance element C6 illustrated in FIG. 5 is formed on the lower face of the substrate 20 so as to always keep a certain capacitance value. One electrode constituting the capacitance element C6 is connected to a C/V converting circuit for deriving the output signal $V_z$, and the other electrode is grounded. This capacitance element C6 is used in cooperation with the capacitance element C5 to derive the output signal $V_z$ for the Z-axial component of an external force.

In this embodiment, for deriving the output signals $V_x$, $V_y$, and $V_z$, a cyclic signal such as a clock signal is always being input to each of the terminals T1 to T6. For example, with respect to the cyclic signal being input to the terminal T1, two capacitance elements C1 and C0 are connected in series. Also, two capacitance elements C2 and C0 are connected in series with respect to the cyclic signal being input to the terminal T2, two capacitance elements C3 and C0 are connected in series with respect to the cyclic signal being input to the terminal T3, two capacitance elements C4 and C0 are connected in series with respect to the cyclic signal being input to the terminal T4, and two capacitance elements C5 and C0 are connected in series with respect to the cyclic signal being input to the terminal T5.

When the detective member 30 receives an external force to be deformed in a state that the cyclic signals are being input to the terminals T1 to T6, the displacement electrode 40 is Z-axially deformed accordingly. The interval between the electrodes of each of the capacitance elements C1 to C5 then changes and thereby the capacitance values of the respective capacitance elements C1 to C5 change. As a result, phase shifts occur in the cyclic signals being input to the terminals T1 to T6. Using the phase shifts thus occurring in the cyclic signals, the output signals $V_x$, $V_y$, and $V_z$ can be obtained that indicate the deformation of the detective member 30, i.e., the X-axial, Y-axial, and Z-axial intensities and directions of the external force received by the detective member 30.

More specifically, when cyclic signals are being input to the terminals T1 to T6, a cyclic signal A is being input to the terminals T1, T3, and T5, and another cyclic signal B having the same cycle as the cyclic signal A and different in phase from the cyclic signal A is being input to the terminals T2, T4, and T6. In this case, when the detective member 30 receives an external force and the capacitance values of the respective capacitance elements C1 to C5 change, different quantities of phase shifts occur in the cyclic signal A or B being input to the terminals T1 to T5. Note that no phase shift occurs in the cyclic signal B being input to the terminal T6 because the capacitance value of the capacitance element C6 dose not change.

When the external force includes an X-axial component, the capacitance value of the capacitance element C1 changes and it causes a phase shift in the cyclic signal A being input to the terminal T1. Additionally, the capacitance value of the capacitance element C2 changes and it causes a phase shift also in the cyclic signal B being input to the terminal T2. The changes in capacitance value of the capacitance elements C1 and C2 correspond to the X-axial positive and negative components of the external force, respectively. Therefore, the phase shift in the cyclic signal A being input to the terminal T1 is in the reverse direction to the phase shift in the cyclic signal B being input to the terminal T2. The respective phase shifts in the cyclic signals A and B being input to the terminals T1 and T2 are read with an exclusive-OR circuit to derive an output signal $V_x$. The sign of this output signal $V_x$ indicates whether the X-axial component of the external force is in the positive or negative direction, and the absolute value of the output signal $V_x$ indicates the intensity of the X-axial component.

On the other hand, when the external force includes a Y-axial component, the capacitance value of the capacitance element C3 changes and it causes a phase shift in the cyclic signal A being input to the terminal T3. Additionally, the capacitance value of the capacitance element C4 changes and it causes a phase shift also in the cyclic signal B being input to the terminal T4. The changes in capacitance value of the capacitance elements C3 and C4 correspond to the Y-axial positive and negative components of the external force, respectively. Therefore, the phase shift in the cyclic signal A being input to the terminal T3 is in the reverse direction to the phase shift in the cyclic signal B being input to the terminal T4. The respective phase shifts in the cyclic signals A and B being input to the terminals T3 and T4 are read with an exclusive-OR circuit to derive an output signal $V_y$. The sign of this output signal $V_y$ indicates whether the Y-axial component of the external force is in the positive or negative direction, and the absolute value of the output signal $V_y$ indicates the intensity of the Y-axial component.

Further, when the external force includes a Z-axial component, the capacitance value of the capacitance element C5 changes and it causes a phase shift in the cyclic signal A being input to the terminal T5. In this case, no phase shift occurs in the cyclic signal B being input to the terminal T6 because the capacitance value of the capacitance element C6 is kept constant. Thus, the phase shift occurs only in the cyclic signal A being input to the terminal T5. This phase shift in the cyclic signal A is read with an exclusive-OR circuit to derive an output signal $V_z$. The sign of this output signal $V_z$ indicates whether the Z-axial component of the external force is in the positive or negative direction, and the absolute value of the output signal $V_z$ indicates the intensity of the Z-axial component.

Incidentally, when the external force includes an X-axial or Y-axial component, in accordance with the manner of application of the force to the detective member 30, the following cases are thinkable. For example, as for the X-axial directions, there may be a case wherein the X-axial positive and negative parts of the displacement portion 41 are deformed with the protrusion 45 serving as a fulcrum not in the vertically reverse directions to each other but both the X-axial positive and negative parts are deformed downward in different quantities. In this case, although phase shifts in the same direction occur in the cyclic signals A and B being input to the terminals T1 and T2, an output signal $V_x$ can be derived by reading the phase shifts with the exclusive-OR circuit, like the above-described case. The same applies to the case of deriving an output signal $V_y$ with respect to the Y-axis.

Next will be discussed a case wherein, in a state that no force has been applied to the detective member 30 illustrated in FIG. 1, as illustrated in FIG. 6, an operation in the X-axial positive direction is applied to the detective member 30, i.e., a force (in the Z-axial negative direction) is applied so that the indicator formed on the upper step portion 31 of the detective member 30 to correspond to the X-axial positive direction may be depressed toward the substrate 20.

By depressing the part of the detective member 30 corresponding to the X-axial positive direction, the interconnecting portion 42 of the displacement electrode 40 is elastically deformed and bent. The X-axial positive part of the displacement portion 41 thereby moves downward. In a short time, the X-axial positive part of the displacement portion 41 reaches the position at which its lower surface is in contact with the insulating film 50. At this time, the X-axial positive and negative parts of the displacement portion 41 move in the vertically reverse directions to each other, with the protrusion 45 serving as a fulcrum. That is, when the X-axial positive part of the displacement portion 41 moves downward, the X-axial negative part of the displacement portion 41 moves upward, with the protrusion 45 serving as a fulcrum.

Besides, the X-axial positive side of the Y-axial positive part of the displacement portion 41 somewhat moves downward, while the X-axial negative side somewhat moves upward. Also, the X-axial positive side of the Y-axial negative part somewhat moves downward, while the X-axial negative side somewhat moves upward. Further, at this time, the protrusion 45 formed at the center of the displacement portion 41 (at the Z-axis) is crushed and elastically deformed.

Thus, the interval between the X-axial positive part of the displacement portion 41 and the capacitance element electrode E1 decreases, while the interval between the X-axial negative part of the displacement portion 41 and the capacitance element electrode E2 increases. The interval between the Y-axial positive part of the displacement portion 41 and the capacitance element electrode E3 and the interval between the Y-axial negative part of the displacement portion 41 and the capacitance element electrode E4 are considered to be unchanged. Actually, as described above, the X-axial positive sides of the Y-axial positive and negative parts of the displacement portion 41 somewhat move downward and the X-axial negative sides somewhat move upward. But, on the whole, the respective intervals between the Y-axial positive and negative parts of the displacement portion 41 and the capacitance element electrodes E3 and E4 can be considered to be unchanged. The interval between the central part of the displacement portion 41 and the capacitance element electrode E5 decreases.

Thus, of the capacitance elements C1 to C5, changes occur in the capacitance values of the only capacitance elements C1, C2, and C5 that have suffered changes in the intervals between the capacitance element electrodes E1 to E5 and the displacement electrode 40. In general, the capacitance value of a capacitance element is in inverse proportion to the interval between the electrodes constituting the capacitance element. So, the capacitance value of the capacitance element C1 increases and the capacitance value of the capacitance element C2 decreases. As a result, the relation in magnitude among the capacitance values of the capacitance elements C1 to C4 is as follows:

C2<C3=C4<C1.

The capacitance value of the capacitance element C5 increases from its original value.

At this time, phase shifts occur in the cyclic signals A and B being input to the terminals T1 and T2. The phase shifts are read to derive an output signal $V_x$. Also, a phase shift occurs in the cyclic signal A being input to the terminal T5 and the phase shift is read (actually, together with the phase of the cyclic signal B being input to the terminal T6) to derive an output signal $V_y$.

Next will be discussed a case wherein, in a state that no force has been applied to the detective member 30 illustrated in FIG. 1, as illustrated in FIG. 7, an operation in the Z-axial positive direction is applied to the detective member 30, i.e., a force (in the Z-axial negative direction) is applied so that a central portion of the four indicators formed on the upper step portion 31 of the detective member 30 may be depressed toward the substrate 20.

By depressing the central portion of the detective member 30, the interconnecting portion 42 of the displacement electrode 40 is elastically deformed and bent. The displacement portion 41 thereby moves in the Z-axial negative direction and the protrusion 45 formed at the center of the displacement portion 41 (at the Z-axis) is crushed and elastically deformed.

Thus, the displacement portion 41 moves downward with keeping its horizontal posture. Therefore, the respective intervals between the capacitance element electrodes E1 to E5 and the displacement portion 41 change with keeping values equal to one another. That is, the intervals decrease evenly. As a result, the capacitance values of all the capacitance elements C1 to C5 increase. The relation in magnitude among the capacitance values of the capacitance elements C1 to C4 is as follows:

C1=C2=C3=C4.

The capacitance value of the capacitance element C5 increases from its original value. In case of depressing the central portion of the detective member 30 (the case illustrated in FIG. 7), the quantity of the change in the capacitance value is larger than that in case of applying an operation in the X-axial positive direction (the case illustrated in FIG. 6) because the quantity of the depression to the detective member 30 is directly reflected on the change in the interval between the displacement electrode 40 and the capacitance element electrode E5.

At this time, phase shifts occur in the cyclic signals A and B being input to the terminals T1 to T5 and the phase shifts are read to derive output signals $V_x$, $V_y$, and $V_z$.

Figure 8:
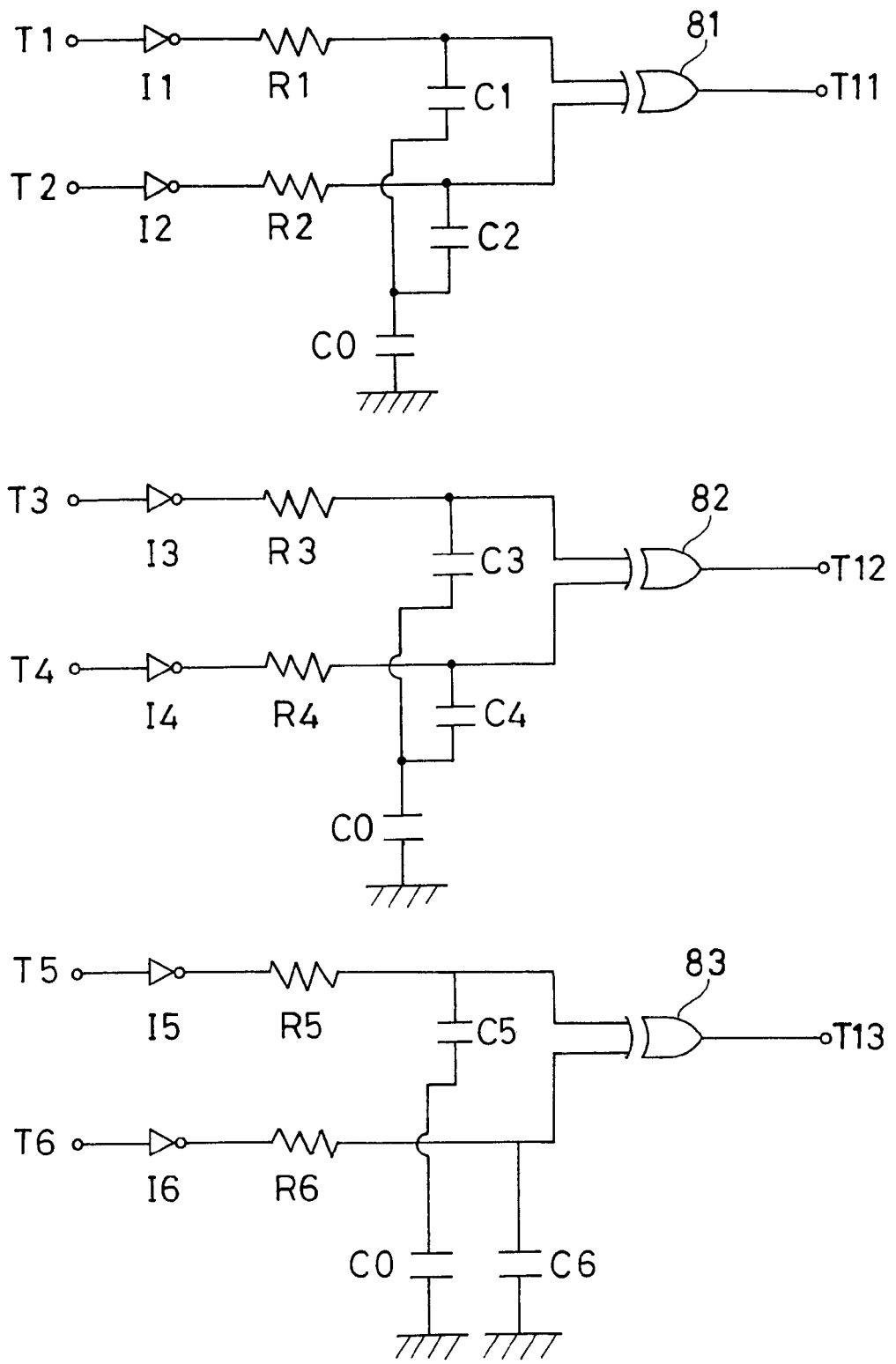
FIG. 8 illustrates circuit diagrams of signal processing circuits of the capacitance type sensor illustrated in FIG. 1.

Next, signal processing circuits for deriving output signals $V_x$, $V_y$, and $V_z$ from the cyclic signals A and B being input to the terminals T1 to T6 will be described with reference to drawings. FIG. 8 illustrates circuit diagrams of signal processing circuits of the capacitance type sensor illustrated in FIG. 1.

As described above, cyclic signals of a predetermined frequency are being input to the terminals T1 to T6 from a not-illustrated AC signal oscillator. To these terminals T1 to T6 connected are inverter elements I1 to I6 and resistance elements R1 to R6, respectively. The inverter elements I1 to I6 and the resistance elements R1 to R6 are connected in this order from the terminals T1 to T6 sides, respectively. EX-OR elements 81 to 83 as logic elements of exclusive-OR circuits are connected to the output terminals of the resistance elements R1 and R2, the output terminals of the resistance elements R3 and R4, and the output terminals of the resistance elements R5 and R6, respectively. The output terminals of the EX-OR elements 81 to 83 are connected to terminals T11 to T13, respectively. The output terminals of the resistance elements R1 to R5 are connected to the capacitance element electrodes E1 to E5 to form the respective capacitance elements C1 to C5 between them and the displacement electrode 40. The displacement electrode 40 is grounded via the capacitance element C0.

Figure 9A:
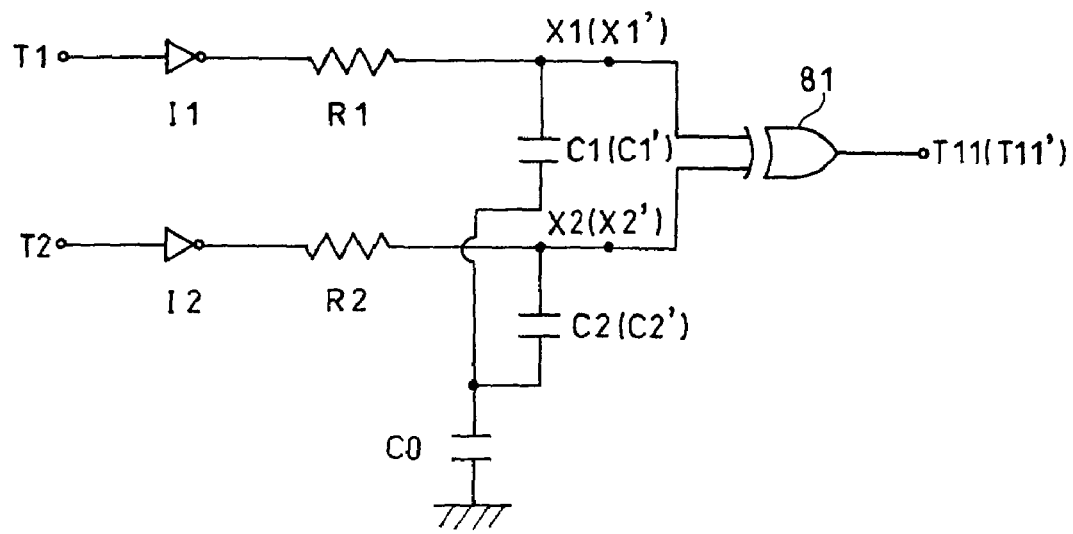
FIG. 9 illustrates circuit diagrams either of which corresponds to a signal processing circuit for X-axial component in the capacitance type sensor illustrated in FIG. 1.
Figure 9B:
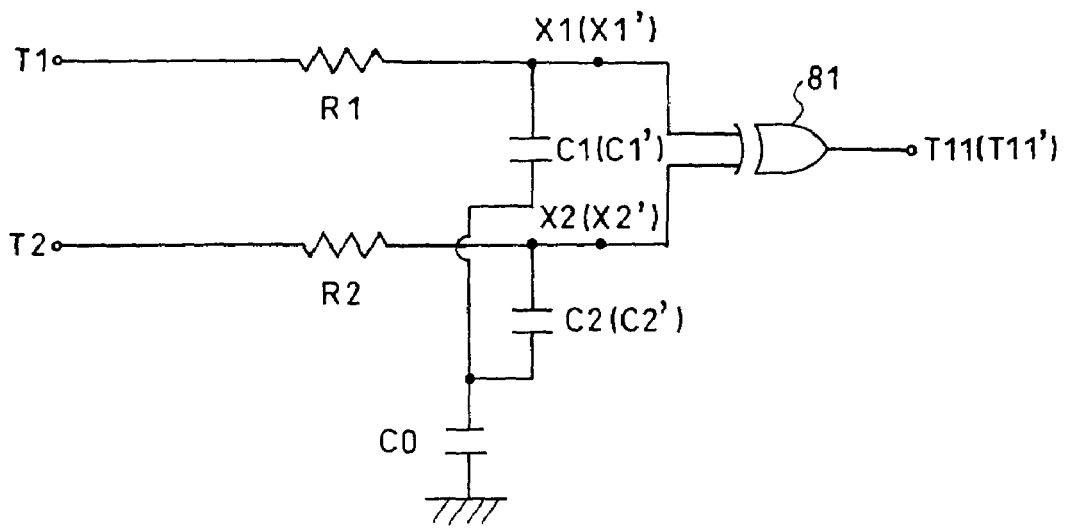

Hereinafter, a deriving method of an output signal $V_x$ for X-axial component will be described by way of example with reference to FIG. 9. Either of FIG. 9(a) and FIG. 9(b) illustrates a circuit diagram (part of FIG. 8) showing a signal processing circuit for X-axial component in the capacitance type sensor illustrated in FIG. 1. In this signal processing circuit, the capacitance element C1 and the resistance element R1 forms a CR delay circuit and the capacitance element C2 and the resistance element R2 forms another CR delay circuit. Cyclic signals (rectangular wave signals) being input to the terminals T1 and T2 suffer predetermined delays due to the respective CR delay circuits and then unites in the EX-OR element 81. Since identical elements are used as the inverter elements I1 and I2, the signals through the different paths can be compared under the same conditions. The inverter elements I1 and I2 are elements to produce driving powers sufficient for driving the respective CR delay circuits, and they are logically meaningless elements. Therefore, if the terminals T1 and T2 can be supplied with signals each having sufficient driving ability, these inverter elements I1 and I2 may be omitted. Thus, in FIG. 9(b) omitted are the inverter elements I1 and I2 that are included in the signal processing circuit of FIG. 9(a). The circuit of FIG. 9(b) is considered to be quite equivalent to the circuit of FIG. 9(a).

Figure 10:
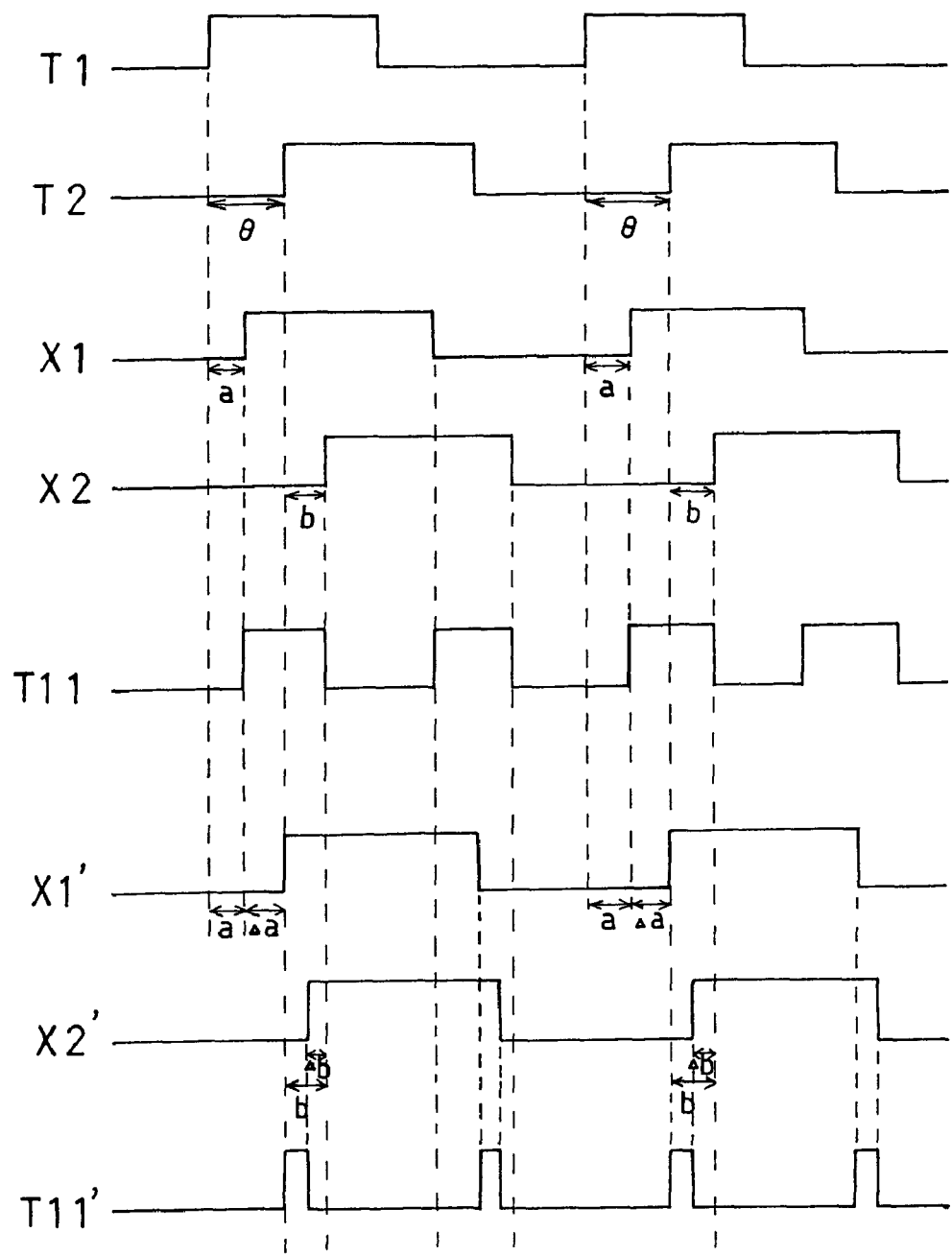
FIG. 10 is a chart showing the waveform of a cyclic signal at each terminal or node of the signal processing circuit illustrated in FIG. 1.

Next, the operation of the circuit of FIG. 9 will be described with reference to FIG. 10. FIG. 10 is a chart illustrating the waveform of a cyclic signal at each terminal or node of the signal processing circuit illustrated in FIG. 9. Note that the influence of the inverter elements I1 and I2 is disregarded in FIG. 10.

In the signal processing circuit of FIG. 9, the cyclic signals being input to the terminals T1 and T2 suffer predetermined delays by passing through the CR delay circuits, and then enter the EX-OR element 81. More specifically, a cyclic signal $f(\phi)$ (corresponding to the above-described cyclic signal A) is being input to the terminal T1, while a cyclic signal $f(\phi+\theta)$ (corresponding to the above-described cyclic signal B) having the same cycle as the cyclic signal $f(\phi)$ and different in phase by $\theta$ is being input to the terminal T2. The cyclic signal $f(\phi)$ being input to the terminal T1 passes through the CR delay circuit constituted by the capacitance element C1 and the resistance element R1, and then reaches a node X1. At this time, in the cyclic signal at the node X1, as illustrated in FIG. 10, a delay of a time a has occurred. Also, the cyclic signal $f(\phi+\theta)$ being input to the terminal T2 passes through the CR delay circuit constituted by the capacitance element C2 and the resistance element R2, and then reaches a node X2. At this time, in the cyclic signal at the node X2, a delay of a time b has occurred.

The times a and b correspond to the delay times in the respective CR delay circuits and they are determined by the respective CR time constants. Therefore, if the resistance values of the resistance elements R1 and R2 are equal to each other, then the values of the times a and b correspond to the capacitance values of the respective capacitance elements C1 and C2. That is, as the capacitance values of the respective capacitance elements C1 and C2 increase, the values of the times a and b increase accordingly. Inversely, as the capacitance values of the respective capacitance elements C1 and C2 decrease, the values of the times a and b decrease accordingly.

Strictly speaking, in case of the signal processing circuit including the inverter elements I1 and I2, either of the cyclic signals being input to the terminals T1 and T2 may suffer a predetermined delay by passing through the corresponding inverter element I1 or I2. However, since identical elements are used as the inverter elements I1 and I2 as described above, the delay times in the two paths due to the inverter elements can be considered to be equal to each other, so they will be canceled out in the EX-OR element 81. For this reason, the description of the delay times due to the inverter elements is omitted here.

Thus, the signals having the same waveforms as the cyclic signals at the nodes X1 and X2 are being input to the EX-OR element 81, which performs an exclusive-OR logical operation to those signals and outputs the result to the terminal T11. The signal being output to the terminal T11 is a rectangular wave signal having a predetermined duty ratio (see FIG. 10).

Here will be discussed the waveforms of the cyclic signals at the respective terminals and nodes when an operation in the X-axial positive direction is applied to the detective member 30 as described above (see FIG. 6). The capacitance elements constituted by the respective capacitance element electrodes E1 and E2 and the displacement electrode 40 of the signal processing circuit in this case will be referred to as C1' and C2', and the respective nodes and terminal at the same positions as the nodes X1 and X2 and terminal T11 of the signal processing circuit when no operation is applied to the detective member 30 will be referred to as nodes X1' and X2' and terminal T11' (see FIG. 9).

In this case, in the signal processing circuit of FIG. 9, a cyclic signal f($\phi$) is being input to the terminal T1, while a cyclic signal f($\phi$+$\theta$) having the same cycle as the cyclic signal f($\phi$) and different in phase by $\theta$ is being input to the terminal T2. The cyclic signal f($\phi$) being input to the terminal T1 passes through the CR delay circuit constituted by the capacitance element C1' and the resistance element R1, and then reaches a node X1'. At this time, in the cyclic signal at the node X1', as illustrated in FIG. 10, a delay of a time of a+$\Delta$a has occurred. This is because the capacitance value of the capacitance element C1' is larger than that of the capacitance element C1 and so the time constant of the CR delay circuit has increased. Also, the cyclic signal f($\phi$+$\theta$) being input to the terminal T2 passes through the CR delay circuit constituted by the capacitance element C2' and the resistance element R2, and then reaches a node X2'. At this time, in the cyclic signal at the node X2', a delay of a time of b−$\Delta$b has occurred. This is because the capacitance value of the capacitance element C2' is smaller than that of the capacitance element C2 and so the time constant of the CR delay circuit has decreased.

Thus, the signals having the same waveforms as the cyclic signals at the nodes X1' and X2' are being input to the EX-OR element 81, which performs an exclusive-OR logical operation to those signals and outputs the result to the terminal T11'. The signal being output to the terminal T11' is a rectangular wave signal having a predetermined duty ratio, which is smaller than that of the rectangular wave signal being output to the terminal T11 when no operation is applied to the detective member 30, as illustrated in FIG. 10.

In the capacitance type sensor 10 of this embodiment, as described above, the protrusion 45 is formed at the center of the displacement electrode 40 and the displacement electrode 40 is deformed with the protrusion 45 serving as a fulcrum. Therefore, in many cases, the capacitance values of the capacitance elements C1' and C2' change inversely to each other, i.e., one increases while the other decreases. Thus, the time constants of the CR delay circuits constituted by the respective capacitance elements C1' and C2' change similarly. This brings about a remarkable change in the duty ratio of the rectangular wave signal being output, so the detection of the force applied to the detective member 30 can easily be performed.

In the signal processing circuit for deriving an output signal $V_z$ for Z-axial component (see FIG. 8), the only signal being input to the terminal T5 suffers a predetermined delay by passing through a CR delay circuit and the signal being input to the terminal T6 suffers no delay due to any CR delay circuit because it does not pass through such a CR delay circuit. Also in such a circuit as brings about a delay in only one signal, the detection of the force applied to the detective member 30 can easily be performed in the same manner as described above.

As described above, changes in the capacitance values of the respective capacitance elements C1 and C2 are detected as a change in the duty ratio of the waveform at the terminal T11. This signal is rectified by passing through a rectifying circuit and thereby the duty ratio can be converted into voltage values to be utilized. If the time of each high level (Hi) or low level (Lo) of the signal at T11 is counted with a higher-frequency clock signal, then the duty ratio can be converted into digital count values to be utilized.

Incidentally, the cyclic signals f($\phi$) and f($\phi$+$\theta$) different in phase, being input to the respective terminals T1 and T2, can be generated in the manner that a cyclic signal being output from one AC signal oscillator is divided into two paths, a not-illustrated CR delay circuit is provided in one of the paths, and thereby the phase of the cyclic signal passing through the CR delay circuit is delayed. Note that the method for shifting the phase of a cyclic signal is not limited to that using such a CR delay circuit. Any other method may be employed. Further, two AC signal oscillators may be used for generating the respective cyclic signals f($\phi$) and f($\phi$+$\theta$) different in phase to be input to the respective terminals T1 and T2.

Next, a manufacturing method of the capacitance type sensor 10 of this embodiment will be described. For manufacturing the capacitance type sensor 10, first, the reference electrode E0, the capacitance element electrodes E1 to E5, and conductive wiring (circuit) are formed in a pattern on the substrate 20. After this, the insulating film 50 is formed in a pattern so as to be in close contact with the reference electrode E0 and capacitance element electrodes E1 to E5 and cover the corresponding part of the upper surface of the substrate 20.

Next, the displacement electrode 40 is disposed on the insulating film 50 and then the detective member 30 is disposed on the displacement electrode 40. After this, the supporting member 60 having a cylindrical shape along the periphery of the displacement electrode 40 and detective member 30 and having an upper end portion protruding inward is fixedly disposed on the substrate 20 to prevent deviation of the displacement electrode 40 and detective member 30 from the insulating film 50. After this, necessary electrical wiring is made to complete the manufacture of the capacitance type sensor 10 of this embodiment.

As described above, in the capacitance type sensor 10 of this embodiment, the displacement electrode 40 used in common for constituting the capacitance elements C0 to C5 is electrically coupled through capacitive coupling with the reference electrode E0 grounded or kept at a certain potential. Therefore, the displacement electrode 40 need not come into direct contact with reference electrode E0 for electrical connection. As a result, the withstand voltage characteristic of the sensor is improved and the sensor is hardly broken due to the flow of a spark current. Besides, a bad condition in electrical connection or the like can be prevented. Thus, a highly reliable capacitance type sensor can be obtained. In addition, since the capacitance elements C1 and C0; C2 and C0; . . . ; or C5 and C0 are connected in series with respect to a cyclic signal, by providing wiring only on the substrate 20 supporting the capacitance element electrodes and reference electrode, any wiring for grounding the displacement electrode 40 or keeping it at a certain potential need not be provided. Therefore, a capacitance type sensor having a simple structure can be manufactured through a less number of manufacturing steps.

Besides, the plural capacitance element electrodes E1 to E5 are formed and thereby the X-axial, Y-axial, and Z-axial components of an external force received by the detective member 30 can be known independently of one another. Further, since the displacement electrode 40 is deformed to incline with the protrusion 45 serving as a fulcrum, the X- or Y-axial component can easily be detected.

Since signals different in phase from each other are supplied to the capacitance element electrodes in each pair (E1 and E2, and E3 and E4), the phase shift by passing through a circuit can be made wider. In addition, since a signal processing circuit utilizing a logic element is used, the signal can accurately be detected.

Besides, since the insulating film 50 is formed so as to be in close contact with the capacitance element electrodes E1 to E5 and the reference electrode E0 and cover the corresponding part of the upper portion of the substrate 20, the capacitance element electrodes E1 to E5 and reference electrode E0 are prevented from being exposed to air and thereby each electrode surface is prevented from being oxidized.

Besides, either of the displacement electrode 40 and the supporting member 60 is made of an elastic material, the efficiency of transmission of an external force, which has been received by the detective member 30, to the displacement electrode 40 is improved. This brings about an improvement of operability. In addition, since the impact of the external force can be relieved, the damage of the capacitance type sensor can be relieved.

Figure 11:
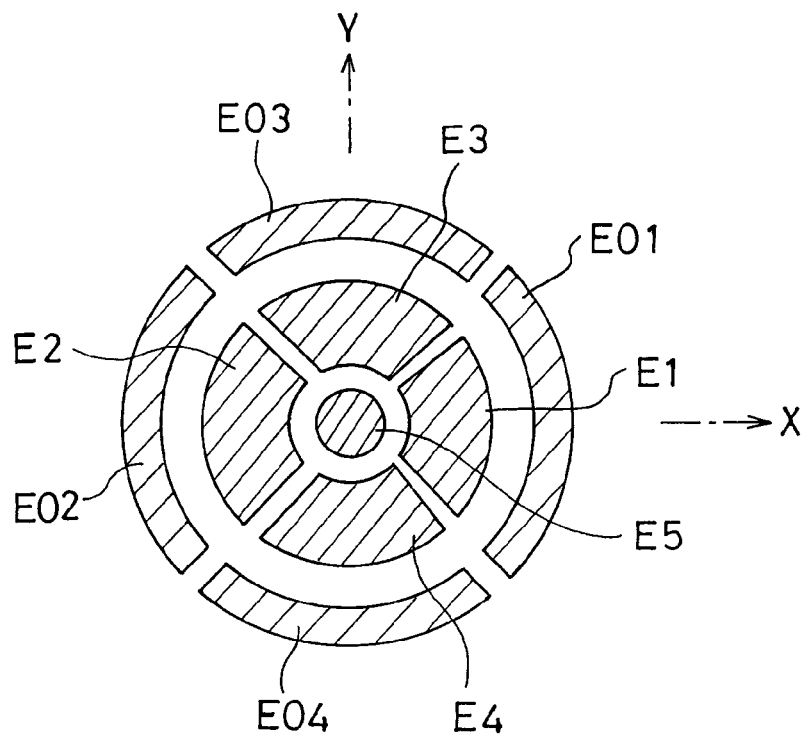
FIG. 11 illustrates an arrangement of electrodes formed on a substrate according to the first modification of the capacitance type sensor of FIG. 1.

Next, the first modification of the first embodiment of the present invention will be described with reference to drawings. FIG. 11 illustrates an arrangement of electrodes formed on the substrate of the capacitance type sensor according to the first modification.

In the capacitance type sensor according to the first modification, the construction of the reference electrode E0 on the substrate 20 in the capacitance type sensor of FIG. 1 is altered so that reference electrodes E01 to E04 are formed as illustrated in FIG. 11. The other construction is the same as that of the capacitance type sensor of FIG. 1, so the description will be omitted by using the same references.

As illustrated in FIG. 11, on the substrate 20 formed are a circular capacitance element electrode E5 having its center at the origin O, fan-shaped capacitance element electrodes E1 to E4 disposed outside the capacitance element electrode E5, and fan-shaped reference electrodes E01 to E04 disposed outside the capacitance element electrodes E1 to E4. The capacitance element electrode E1 and reference electrode E01, the capacitance element electrode E2 and reference electrode E02, the capacitance element electrode E3 and reference electrode E03, and the capacitance element electrode E4 and reference electrode E04 are formed so that the fan shapes in each pair have the same central angle and the same center.

Figure 12:
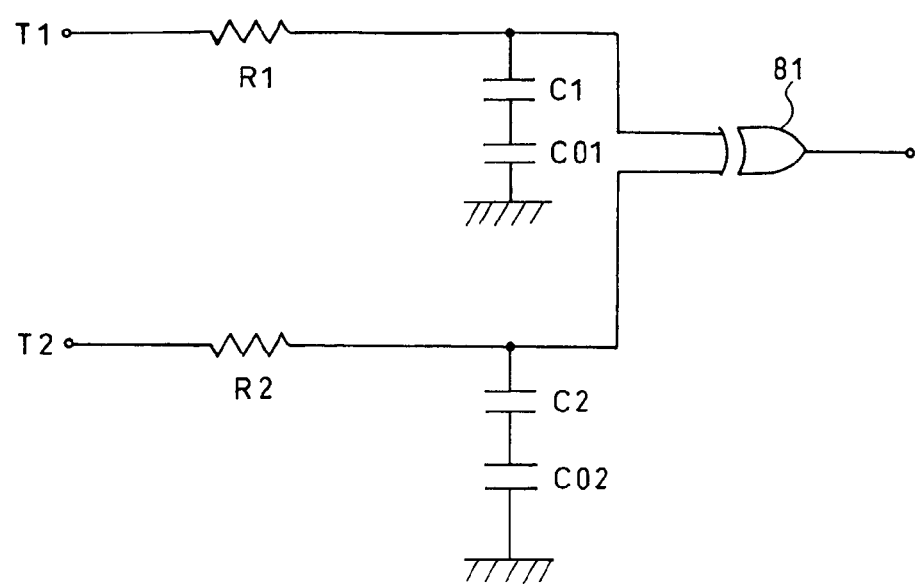
FIG. 12 is a circuit diagram of a signal processing circuit for X-axial component according to the first modification of the capacitance type sensor illustrated in FIG. 1.

FIG. 12 is a circuit diagram of a signal processing circuit for X-axial component in the capacitance type sensor according to the first modification. The different feature of the signal processing circuit of FIG. 12 from the signal processing circuit of the capacitance type sensor of FIG. 1 is that the reference electrodes E01 and E02 are separately formed on the substrate 20 to correspond to the respective capacitance element electrodes E1 and E2. Therefore, the displacement electrode 40 is grounded separately via capacitance elements C01 and C02. The same applies to the detection of the Y-axial component.

When the reference electrodes E01 to E04 thus divided are formed, even in case that the capacitance element electrodes E1 to E4 are disposed so as to be surrounded by the reference electrodes E01 to E04, wiring for the capacitance element electrodes can easily be provided through the gaps between the reference electrodes E01 to E04. In this modification, the reference electrode is divided into four. But, the number of divisions of the reference electrode, the shape of each divided reference electrode, and the arrangement of the divided reference electrodes are optional. They can properly be changed in consideration of the disposition of the wiring on the substrate.

Figure 13:
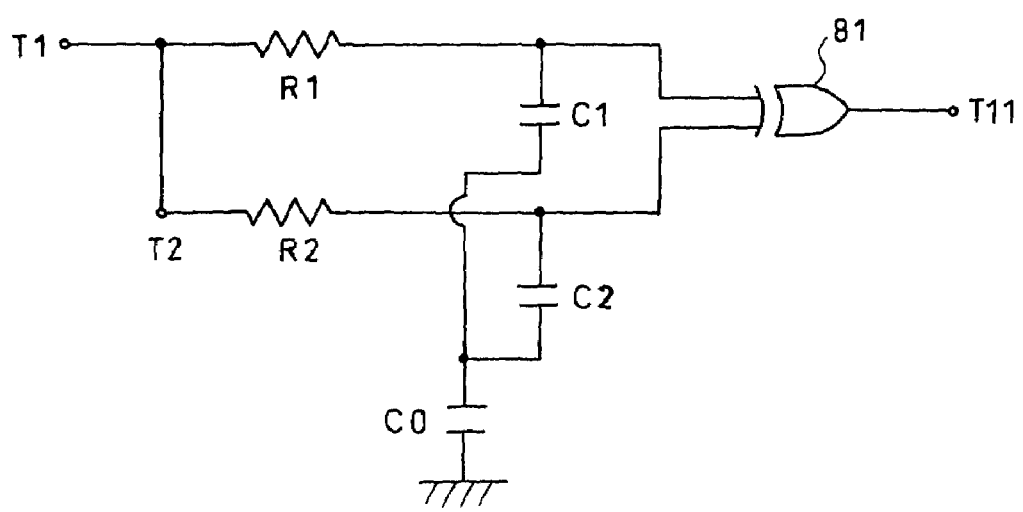
FIG. 13 is a circuit diagram of a signal processing circuit for X-axial component according to the second modification of the capacitance type sensor illustrated in FIG. 1.

Next, the second modification of the first embodiment of the present invention will be described with reference to a drawing. FIG. 13 is a circuit diagram of a signal processing circuit for X-axial component in the capacitance type sensor according to the second modification. The different feature of the signal processing circuit of FIG. 13 from the signal processing circuit of the capacitance type sensor of FIG. 1 is that cyclic signals not different in phase but in the same phase are being input to the respective terminals T1 and 2. The other construction is the same as that of the capacitance type sensor of FIG. 1, so the description will be omitted by using the same references.

In case of inputting the cyclic signals in the same phase to the terminals T1 and 2, resistance elements R1 and R2 different in resistance value are preferably used. By thus using the resistance elements R1 and R2 different in resistance value, detection in the EX-OR element 81 can easily be performed. Alternatively, resistance elements R1 and R2 having the same resistance value may be used.

By using such a circuit, a construction for making a difference in phase between the cyclic signals becomes unnecessary. As a result, the construction of the signal processing circuit can be simplified.

Figure 14:
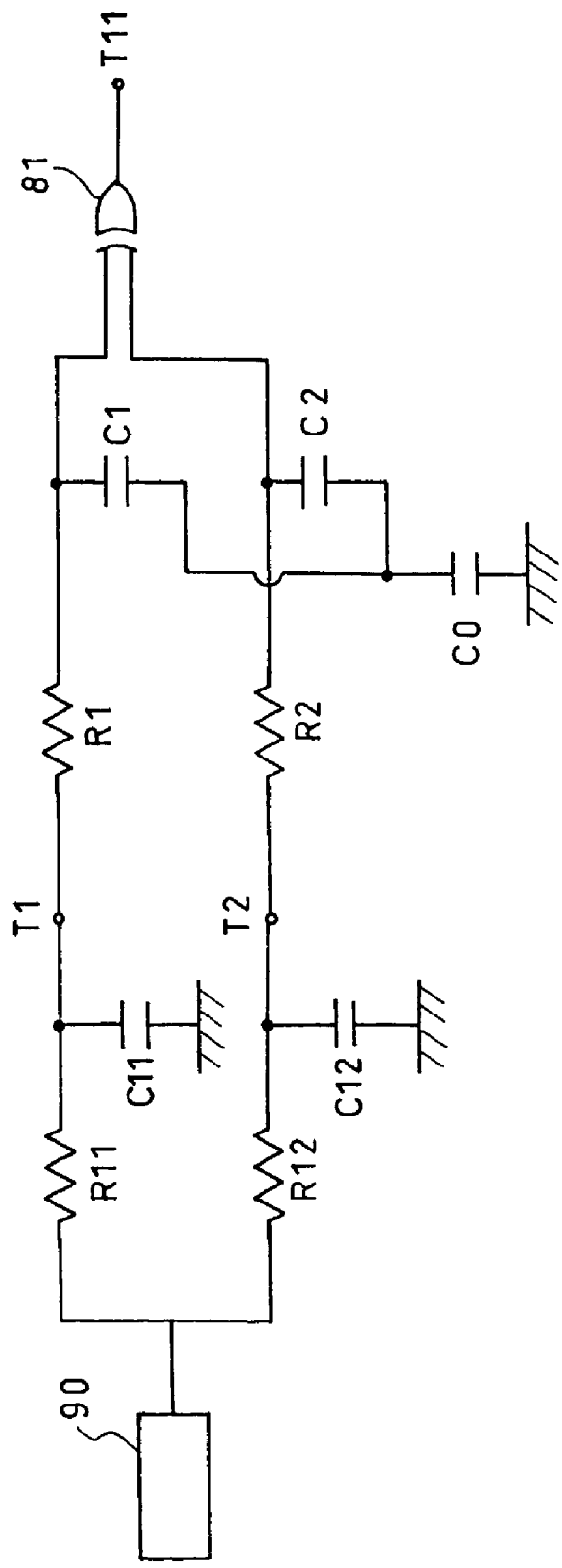
FIG. 14 is a circuit diagram of a signal processing circuit for X-axial component according to the third modification of the capacitance type sensor illustrated in FIG. 1.

Next, the third modification of the first embodiment of the present invention will be described with reference to a drawing. FIG. 14 is a circuit diagram of a signal processing circuit for X-axial component in the capacitance type sensor according to the third modification. The different feature of the signal processing circuit of FIG. 14 from the signal processing circuit of the capacitance type sensor of FIG. 1 is that, as a construction for making a difference in phase between the cyclic signals being input to the terminals T1 and T2, a cyclic signal being output from one AC signal oscillator is divided into two paths and a CR delay circuit is provided in either of the paths. The other construction is the same as that of the capacitance type sensor of FIG. 1, so the description will be omitted by using the same references.

The construction for making a difference in phase between the cyclic signals includes an AC signal oscillator 90, resistance elements R11 and R12, and capacitance elements C11 and C12. The resistance element R11 and the capacitance element C11 constitute a CR delay circuit and the resistance element R12 and the capacitance element C12 constitute another CR delay circuit. A cyclic signal being output from the AC signal oscillator 90 is divided into two paths. The divided cyclic signals pass through the different CR delay circuits, respectively. Delays different in phase thereby occur in the cyclic signals.

In case of thus providing the CR delay circuits in both paths, ones or either of the resistance elements and the capacitance elements constituting the two CR delay circuits are preferably different in value from each other. By constructing as described above, delays different in phase can be given to the cyclic signals having passed through the two CR delay circuits. As a result, the cyclic signals different in phase are being input to the terminals T1 and T2, respectively.

Such a resistance element constituting a CR delay circuit is apt to be influenced by temperature. Therefore, in case of providing a CR delay circuit in one of the two paths, the only one path is influenced by temperature and this may deteriorate the temperature characteristic of the signal processing circuit. But, by providing such CR delay circuits in both paths, the influences by temperature can be compensated in the two paths. Thus, the temperature characteristic of the signal processing circuit can be improved.

Figure 15:
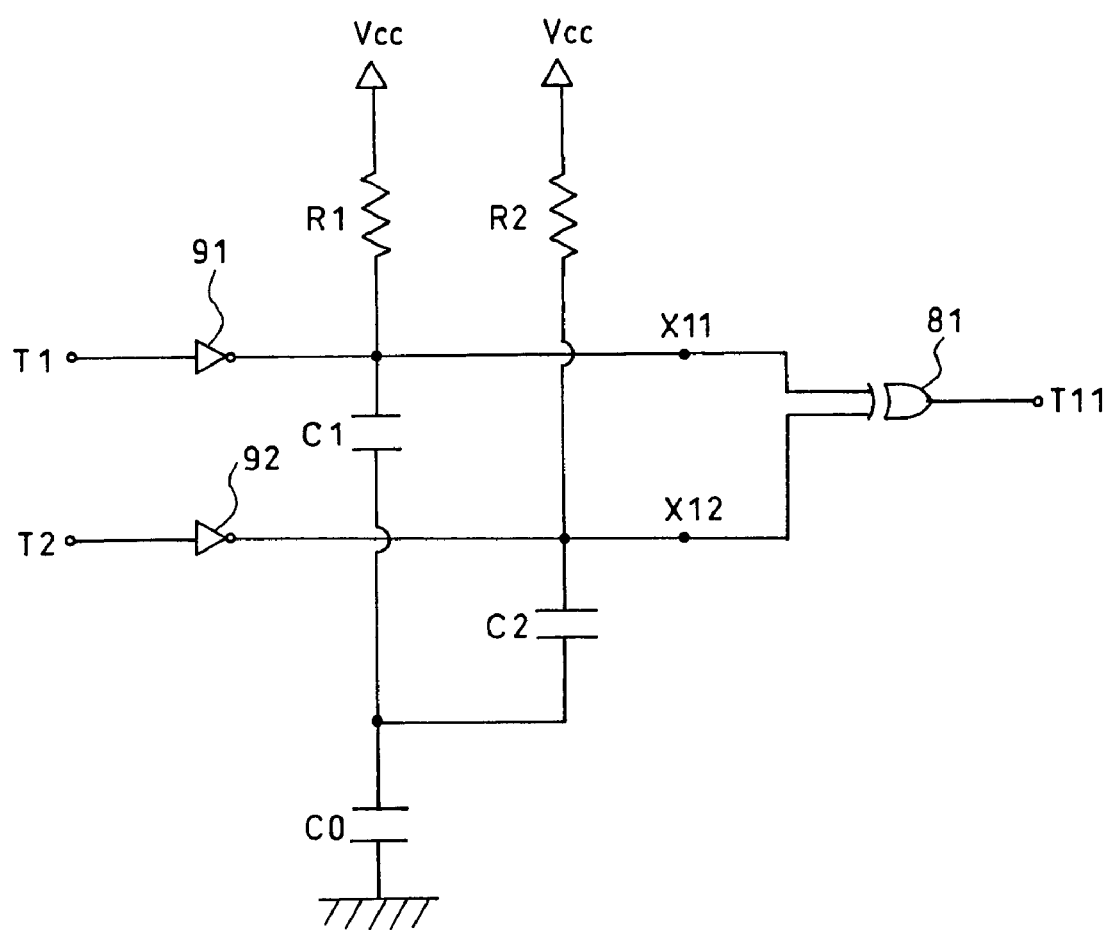
FIG. 15 is a circuit diagram of a signal processing circuit for X-axial component according to the fourth modification of the capacitance type sensor illustrated in FIG. 1.

Next, the fourth modification of the first embodiment of the present invention will be described with reference to drawings. FIG. 15 is a circuit diagram of a signal processing circuit for X-axial component in the capacitance type sensor according to the fourth modification. The different feature of the signal processing circuit of FIG. 15 from the signal processing circuit of the capacitance type sensor of FIG. 1 is as follows. That is, an open-collector type inverter element 91 is disposed between the terminal T1 and the resistance element R1 and capacitance element C1. Also, an open-collector type inverter element 92 is disposed between the terminal T2 and the resistance element R2 and capacitance element C2. In addition, the potentials at the ends of the resistance elements R1 and R2 opposite to the ends connected to the terminals T1 and T2 are kept at a fixed potential Vcc. The other construction is the same as that of the capacitance type sensor of FIG. 1, so the description will be omitted by using the same references. The open-collector type inverter elements 91 and 92 are control elements each having no influence on the condition of the input terminal of the EX-OR element when a signal being input to the corresponding capacitance element electrode with periodically repeating a high level and a low level is at its high level, but having a function of discharging the first capacitance element when the signal is at its low level.

Changes in potential at the nodes X1 and X2 of the signal processing circuit illustrated in FIG. 9 and at the nodes X11 and X12 of the signal processing circuit illustrated in FIG. 15 when cyclic signals are being input to the terminals T1 and T2 will be described with reference to FIG. 16. Here will be described changes in potential at the only nodes X1 and X11.

Figure 16:
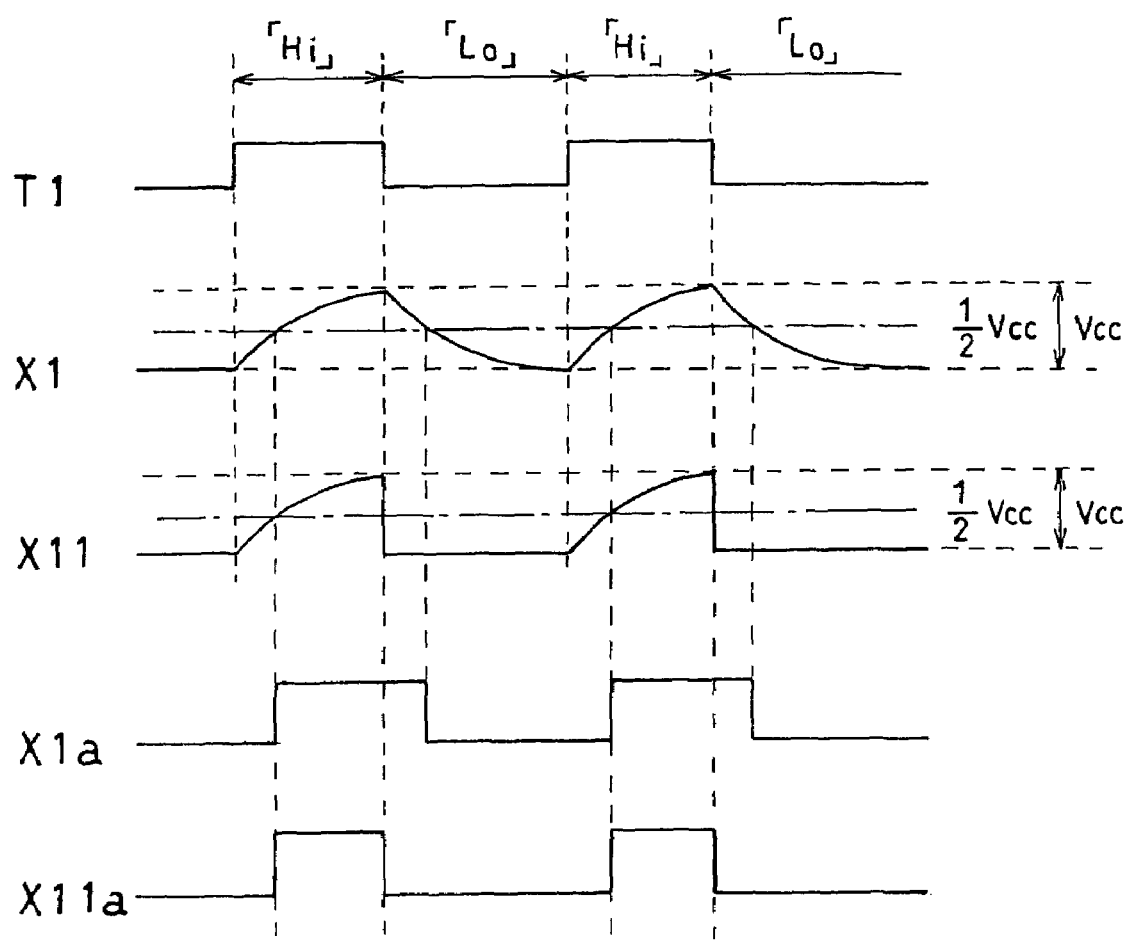
FIG. 16 is a chart showing the waveform of a cyclic signal at each of a terminal and nodes of the signal processing circuit illustrated in FIG. 1 and the signal processing circuit illustrated in FIG. 15.

A case will be discussed wherein a cyclic signal in which signals "Hi" and "Lo" are repeated is being input to the terminal T1, as illustrated in FIG. 16. When a signal "Hi" starts, the capacitance element C1 constituting a CR delay circuit is gradually charged and thereby the potential at the node X1 gradually rises, and when a signal "Lo" starts, the capacitance element C1 constituting the CR delay circuit is gradually discharged and thereby the potential at the node X1 gradually lowers. These changes are repeated. On the other hand, as for the potential at the node X11, when a signal "Hi" starts, the capacitance element C1 constituting the CR delay circuit is gradually charged and thereby the potential gradually rises, and when a signal "Lo" starts, the capacitance element C1 constituting the CR delay circuit is discharged in a moment through the open-collector type inverter element 91 and thereby the potential lowers in a moment. These changes are repeated.

Actually, the waveform of the potential at each of the nodes X1 and X11 is converted into a rectangular wave (pulse waveform) by passing through a comparator (not illustrated) having a predetermined threshold. This comparator outputs a signal "Hi" when the input signal is higher than the set threshold, and a signal "Lo" when the input signal is lower than the set threshold, and thereby generates a rectangular wave. The threshold of the comparator is preferably set at Vcc/2. In this way, by passing through the comparator, the waveforms of the potentials at the nodes X1 and X11 are converted into rectangular waves X1a and X11a having duty ratios different from each other, as illustrated in FIG. 16.

By this construction, since electric charges held in each capacitance element can be released in a moment, charging can efficiently be performed. In addition, the waveform density of the cyclic signal can be increased in the signal processing circuit of FIG. 16, in comparison with the signal processing circuit of FIG. 9, so the accuracy of the signal processing circuit can be improved.

Figure 17:
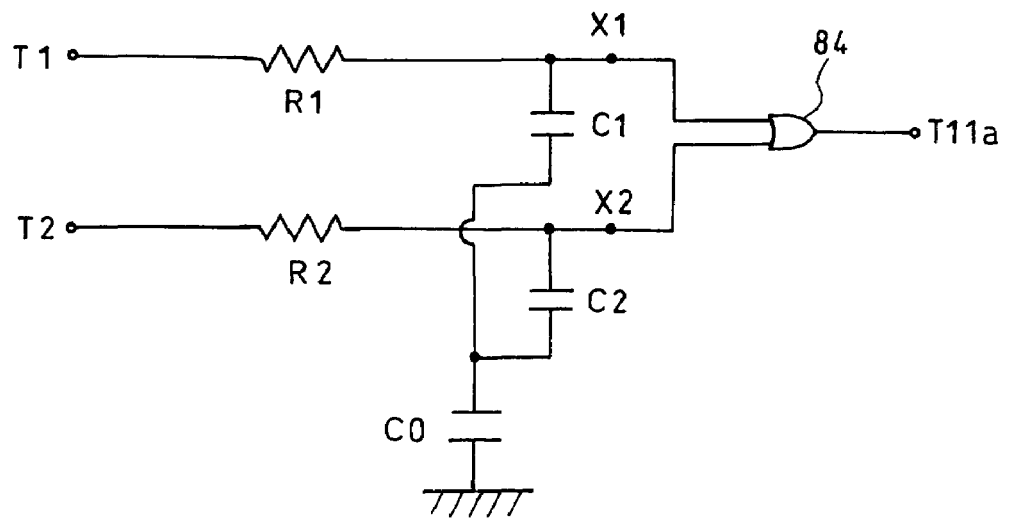
FIG. 17 is a circuit diagram of a signal processing circuit for X-axial component according to the fifth modification of the capacitance type sensor illustrated in FIG. 1.

Next, the fifth modification of the first embodiment of the present invention will be described with reference to a drawing. FIG. 17 is a circuit diagram of a signal processing circuit for X-axial component in the capacitance type sensor according to the fourth modification. The different feature of the signal processing circuit of FIG. 17 from the signal processing circuit of the capacitance type sensor of FIG. 1 is that an OR element is used as a logic element in place of the EX-OR element. The other construction is the same as that of the capacitance type sensor of FIG. 1, so the description will be omitted by using the same references.

In FIG. 17, the cyclic signal f($\phi$) being input to the terminal T1 passes through the CR delay circuit constituted by the capacitance element C1 and the resistance element R1, and then reaches the node X1. At this time, in the cyclic signal at the node X1, as illustrated in FIG. 10, a delay of a time a has occurred. Also, the cyclic signal f($\phi$+$\theta$) being input to the terminal T2 passes through the CR delay circuit constituted by the capacitance element C2 and the resistance element R2, and then reaches the node X2. At this time, in the cyclic signal at the node 2, a delay of a time b has occurred. Therefore, similarly in FIG. 9, the signals having the same waveforms as the cyclic signals at the nodes X1 and X2 are being input to the OR element 84, which performs an OR logical operation to those signals and outputs the result to a terminal T11a. The signal being output to the terminal T11a is a rectangular wave signal having a predetermined duty ratio.

The values of the duty ratio of the rectangular wave signal being output to the terminal T11a can be higher on average than those of the rectangular wave signal being output to the terminal T11 in case of using the EX-OR element, so the sensitivity of the capacitance type sensor can lower.

Therefore, this modification is preferably employed for controlling the sensitivity of the capacitance type sensor (for lowering the sensitivity in this example) by the construction of the signal processing circuit in case that each component of the capacitance type sensor is made of a material that will bring about a very good sensitivity.

Figure 18:
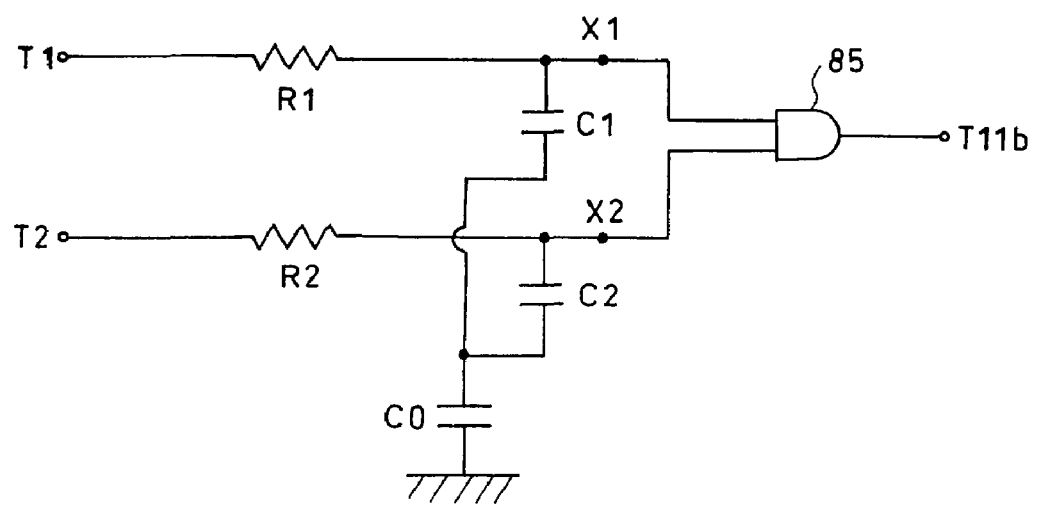
FIG. 18 is a circuit diagram of a signal processing circuit for X-axial component according to the sixth modification of the capacitance type sensor illustrated in FIG. 1.

Next, the sixth modification of the first embodiment of the present invention will be described with reference to a drawing. FIG. 18 is a circuit diagram of a signal processing circuit for X-axial component in the capacitance type sensor according to the fifth modification. The different feature of the signal processing circuit of FIG. 18 from the signal processing circuit of the capacitance type sensor of FIG. 1 is that an AND element is used as a logic element in place of the EX-OR element. The other construction is the same as that of the capacitance type sensor of FIG. 1, so the description will be omitted by using the same references.

In FIG. 18, in the cyclic signal at the node X1, as illustrated in FIG. 10, a delay of a time a has occurred. Also, the cyclic signal f($\phi$+$\theta$) being input to the terminal T2 passes through the CR delay circuit constituted by the capacitance element C2 and the resistance element R2, and thereby, in the cyclic signal at the node 2, a delay of a time b has occurred. Therefore, similarly in FIG. 9, the signals having the same waveforms as the cyclic signals at the nodes X1 and X2 are being input to the AND element 85, which performs an AND logical operation to those signals and outputs the result to a terminal T11b. The signal being output to the terminal T11b is a rectangular wave signal having a predetermined duty ratio.

The values of the duty ratio of the rectangular wave signal being output to the terminal T11b can be lower on average than those of the rectangular wave signal being output to the terminal T11 in case of using the EX-OR element, so the sensitivity of the capacitance type sensor can lower.

Therefore, this modification is preferably employed for controlling the sensitivity of the capacitance type sensor (for lowering the sensitivity in this example) by the construction of the signal processing circuit in case that each component of the capacitance type sensor is made of a material that will bring about a very good sensitivity.

Next, the second embodiment of the present invention will be described with reference to drawings.

Figure 19:
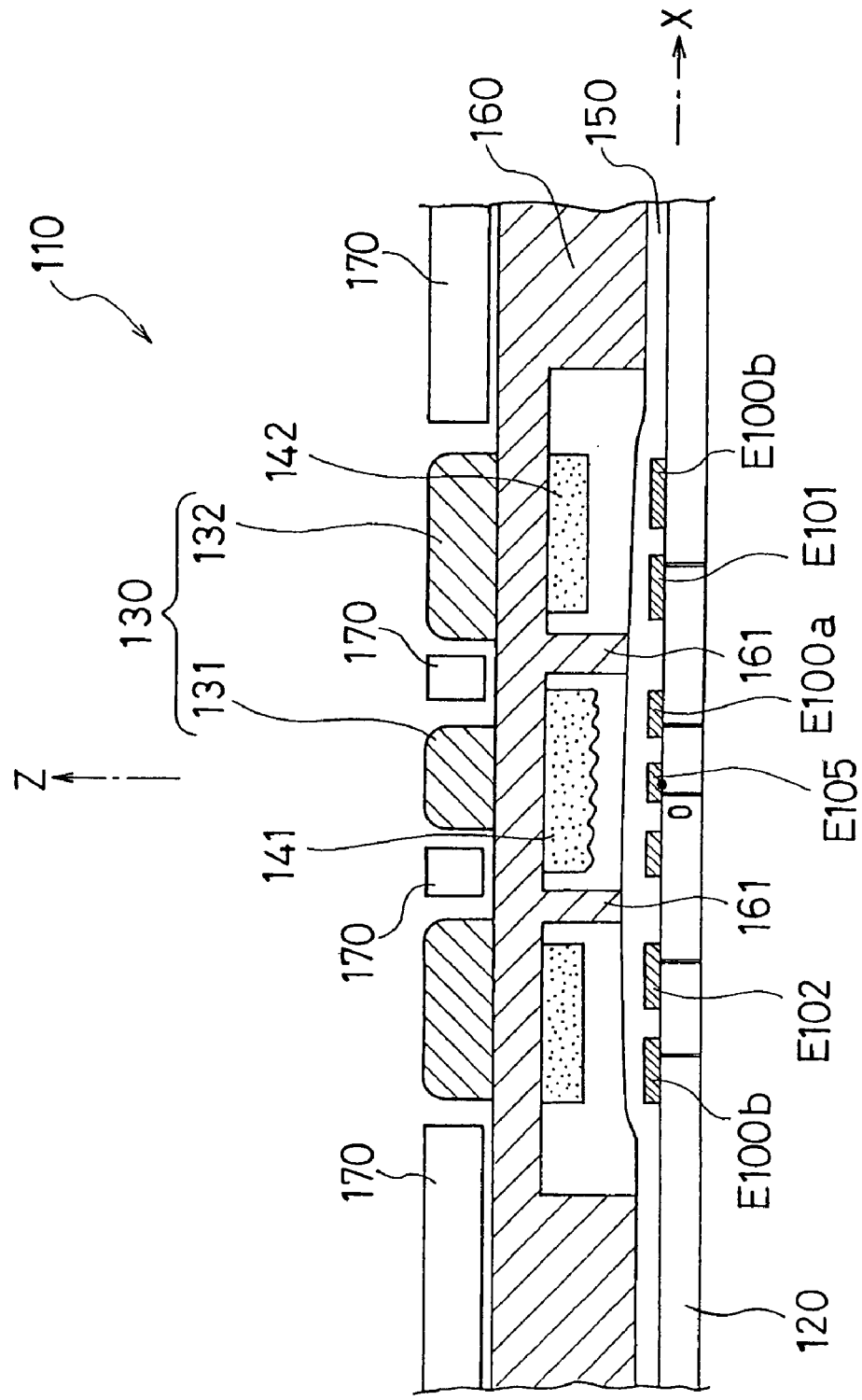
FIG. 19 is a schematic sectional view of a capacitance type sensor according to the second embodiment of the present invention.
Figure 20:
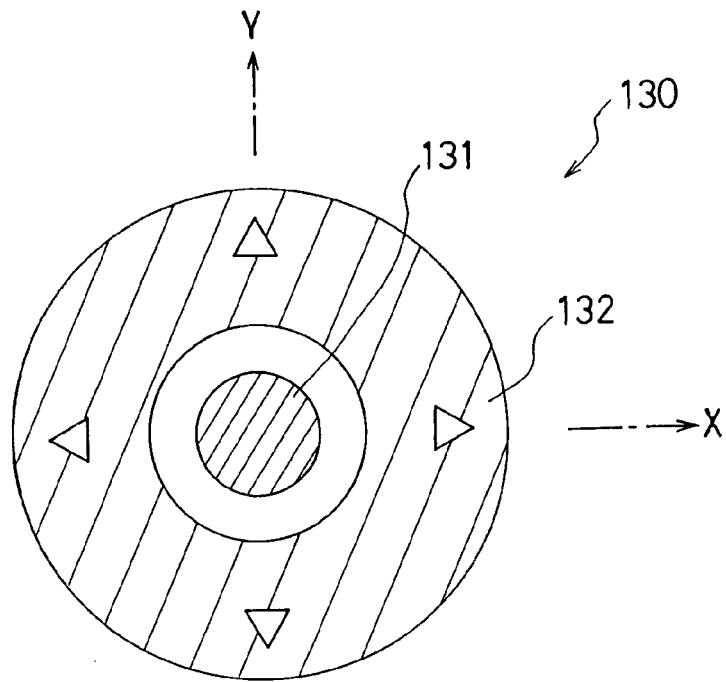
FIG. 20 is an upper view of detective buttons of the capacitance type sensor of FIG. 19.
Figure 21:
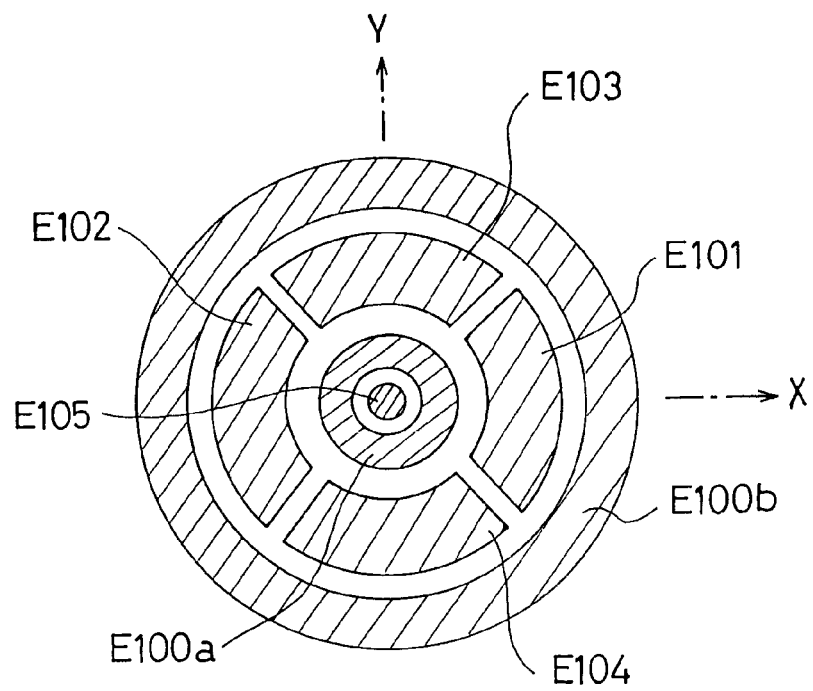
FIG. 21 illustrates an arrangement of electrodes formed on a substrate of the capacitance type sensor of FIG. 19.

FIG. 19 is a schematic sectional side view of a capacitance type sensor according to the second embodiment of the present invention. FIG. 20 is an upper view of detective buttons of the capacitance type sensor of FIG. 19. FIG. 21 illustrates an arrangement of electrodes formed on a substrate of the capacitance type sensor of FIG. 19.

The capacitance type sensor 110 includes a substrate 120, detective buttons 130, displacement electrodes 140, capacitance element electrodes E101 to E105 and reference electrodes E100a and E100b formed on the substrate 120, an insulating film 150 formed in close contact with the capacitance element electrodes E101 to E105 and the reference electrodes E100a and E100b to cover the upper portion of the substrate 120, a supporting member 160 for supporting and fixing the detective buttons 130 and the displacement electrodes 140 to the substrate 120, and a cover case 170 disposed so as to separate the detective buttons 130.

For convenience of explanation, an XYZ three-dimensional coordinate system is defined as illustrated and the arrangement of the aforementioned components will be explained with reference to the coordinate system. That is, in FIG. 19, the origin O is set on the substrate 120 at the position opposite to the center of a displacement electrode 141, the X-axis is set so as to horizontally extend rightward, the Z-axis is set so as to vertically extend upward, and the Y-axis is set so as to extend backward perpendicularly to FIG. 19. Thus, the upper face of the substrate 120 is on the XY-plane and the Z-axis extends through the respective centers of the capacitance element electrode E105 on the substrate 120, a detective button 131, and the displacement electrode 141.

The substrate 120 may be a general printed circuit board for an electronic circuit, like the substrate 20. In this embodiment, a glass epoxy board is employed. Otherwise, a filmy substrate such as a polyimide film may be used as the substrate 120. However, such a filmy substrate may be too flexible, so it is preferably disposed on a sufficiently rigid supporting board.

The detective buttons 130 are constituted by an circular button 131 whose center is at the origin, and a ring-shaped button 132 disposed outside the button 131. The diameter of the button 131 is substantially equal to or somewhat smaller than the outer diameter of the reference electrode E100a, while the outer diameter of the button 132 is substantially equal to the outer diameter of the reference electrode E100b.

On the upper surface of the detective member 132, as illustrated in FIG. 20, indicators corresponding to the respective operation directions (movement directions of a cursor) are provided so as to correspond to the positive and negative directions of the X- and Y-axes, i.e., to the capacitance element electrodes E101 to E104.

The displacement electrodes 140 are made of conductive rubbers and constituted by a circular displacement electrode 141 whose center is at the origin, and a ring-shaped displacement electrode 142 disposed outside the displacement electrode 141. The diameter of the displacement electrode 141 is substantially equal to the outer diameter of the reference electrode E100a, while the outer diameter of the displacement electrode 142 is substantially equal to the outer diameter of the reference electrode E100b. The surface of the displacement electrode 141 opposite to the capacitance element electrode E105 is made uneven in height.

In one face of the supporting member 160 formed are a downward circular recess having its center at the Z-axis and being somewhat larger than the displacement electrode 141, and a downward ring-shaped recess whose center is at the Z-axis and which is somewhat larger than the width of the displacement electrode 142. The displacement electrodes 141 and 142 are attached to the bottoms of the respective recesses. A partition 161 separates the displacement electrodes 141 and 142. The partition 161 can relieve the interference between operations on the respective buttons 131 and 132. To the other face of the supporting member 160, the buttons 131 and 132 are attached so as to correspond to the respective displacement electrodes 141 and 142. On the upper face of the supporting member 160, the cover case 170 is disposed so as to separate the buttons 131 and 132.

As illustrated in FIG. 21, on the substrate 120 formed are a circular capacitance element electrode E105 having its center at the origin O, a ring-shaped reference electrode E100a disposed outside the capacitance element electrode E105 so that the center of the reference electrode E100a may be at the origin O, fan-shaped capacitance element electrodes E101 to E104 disposed outside the reference electrode E100a, and a ring-shaped reference electrode E100b disposed outside the capacitance element electrodes E101 to E104 so that the center of the reference electrode E100b may be at the origin O. The capacitance element electrodes E101 and E102 in a pair are disposed at a distance from each other along the X-axis and symmetrically with respect to the Y-axis. Also, the capacitance element electrodes E103 and E104 in a pair are disposed at a distance from each other along the Y-axis and symmetrically with respect to the X-axis.

In this embodiment, the capacitance element electrode E101 is disposed so as to correspond to the X-axial positive direction while the capacitance element electrode E102 is disposed so as to correspond to the X-axial negative direction. Thus, they are used for detecting the X-axial component of an external force. Also, the capacitance element electrode E103 is disposed so as to correspond to the Y-axial positive direction while the capacitance element electrode E104 is disposed so as to correspond to the Y-axial negative direction. Thus, they are used for detecting the Y-axial component of an external force. Further, the capacitance element electrode E105 is disposed on the origin O and it is used for detecting the Z-axial component of an external force.

The capacitance element electrodes E101 to E105 and the reference electrodes E100a and E100b are connected to terminals T101 to T105, T100a, and T100b (see FIG. 22) via through-holes or the like, respectively. They are connected with an external electronic circuit through the terminals T101 to T105, T100a, and T100b. In this embodiment, the reference electrodes E100a and E100b are grounded via the respective terminals T100a and T100b.

The insulating film 150 is formed in close contact with the capacitance element electrodes E101 to E105 and reference electrodes E100a and E100b on the substrate 120 to cover the corresponding part of the upper portion of the substrate 120. Therefore, the capacitance element electrodes E101 to E105 and reference electrode E100a and E100b, which are made of copper or the like, are never exposed to air. Thus, the insulating film 150 has a function of preventing those electrodes from being oxidized. Since the insulating film 150 is formed, the capacitance element electrodes E101 to E105 and reference electrode E100a and E100b never come into direct contact with the displacement electrodes 140.

Thus, the capacitance element electrodes E101 to E105 and reference electrodes E100a and E100b cooperate with the displacement electrodes 140 to form capacitance elements between them. More specifically, each of the capacitance element electrode E105 and the reference electrode E100a cooperates with the displacement electrode 141 to constitute a capacitance element. Each of the capacitance element electrodes E101 to E104 and the reference electrode E100b cooperates with the displacement electrode 142 to constitute a capacitance element.

Figure 22:
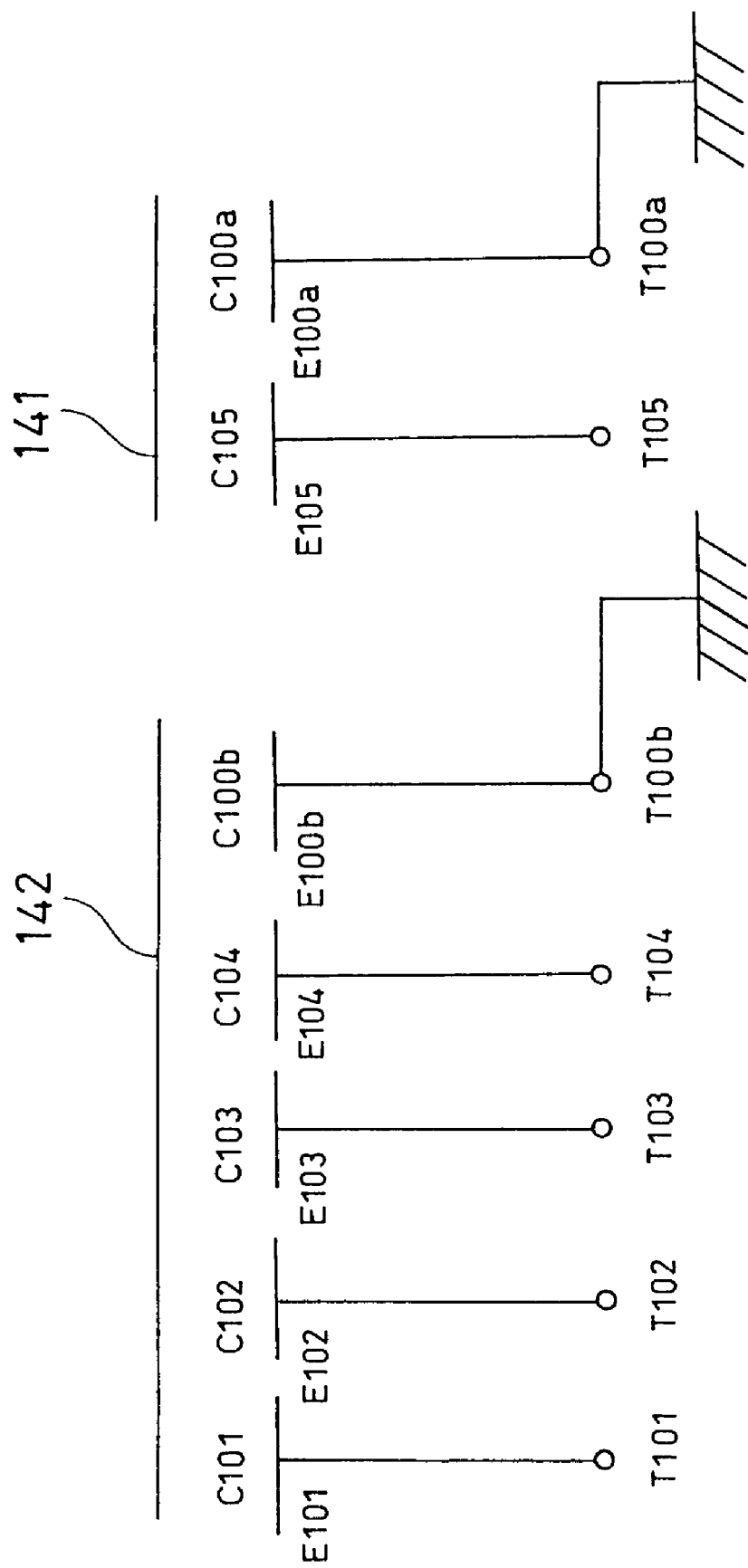
FIG. 22 is a circuit diagram equivalent to the construction of the capacitance type sensor illustrated in FIG. 19.
Figure 23:
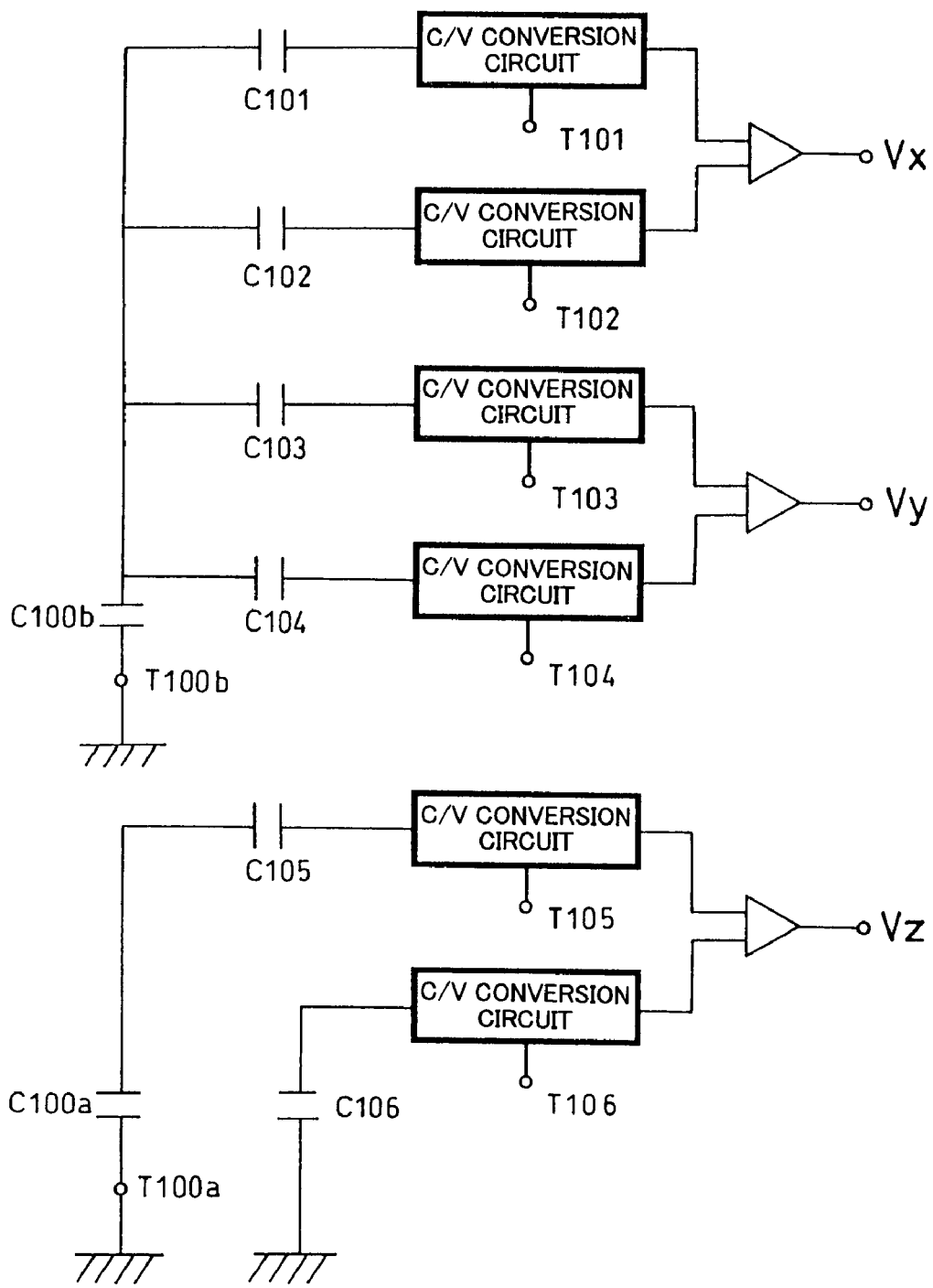
FIG. 23 is an explanatory diagram for explaining a method for deriving an output signal from a cyclic signal being input to the capacitance type sensor illustrated in FIG. 19.

Next, the operation of the capacitance type sensor 110 according to this embodiment constructed as described above will be described with reference to drawings. FIG. 22 is a circuit diagram equivalent to the construction of the capacitance type sensor illustrated in FIG. 19. FIG. 23 is an explanatory diagram for explaining a method for deriving an output signal from a cyclic signal being input to the capacitance type sensor illustrated in FIG. 19.

First, a circuit construction equivalent to the construction of the capacitance type sensor 110 will be described with reference to FIG. 22. The capacitance element electrode E105 and the reference electrode E100a formed on the substrate 120 are opposite to the displacement electrode 141. The capacitance elements C105 and C100a are formed between the movable displacement electrode 141 as a common electrode and the fixed capacitance element electrode E105 and reference electrode E100a, respectively. Also, the capacitance element electrodes E101 to E104 and the reference electrode E100b are opposite to the displacement electrode 142. The capacitance elements C101 to C104 and C100b are formed between the movable displacement electrode 142 as a common electrode and the fixed capacitance element electrodes E101 to E104 and reference electrode E100b, respectively. The capacitance elements C101 to C105, C100a, and C100b are variable capacitance elements whose capacitance values change due to the movement of the displacement electrode 141 or 142.

The capacitance values of the capacitance elements C101 to C105, C100a, and C100b can be measured independently of one another as the capacitance values between the displacement electrode 141 and the respective terminals T105 and T100a connected to the capacitance element electrode E105 and the reference electrode E100a, or the capacitance values between the displacement electrode 142 and the respective terminals T101 to T104 and T100b connected to the capacitance element electrodes E101 to E104 and the reference electrode E100b.

In this embodiment, since the reference electrode E100a is grounded via the terminal T100a, the displacement electrode 141 as a common electrode of the capacitance elements C105 and C100a is considered to be grounded via the capacitance element C100a and the terminal T100a. That is, the capacitance element C100a makes capacitive coupling between the displacement electrode 141 and the terminal T100a. Also, since the reference electrode E100b is grounded via the terminal T100b, the displacement electrode 142 as a common electrode of the capacitance elements C101 to C104 and C100b is considered to be grounded via the capacitance element C100b and the terminal T100b. That is, the capacitance element C100b makes capacitive coupling between the displacement electrode 142 and the terminal T100b.

Next, a deriving method of an output signal indicating the intensity and direction of an external force to the button 130, from a change in the capacitance value of each of the capacitance elements C101 to C105, C100a, and C100b will be described with reference to FIG. 23. In FIG. 23, output signals $V_x$, $V_y$, and $V_z$ indicate the intensities and directions of the X-axial, Y-axial, and Z-axial components of an external force, respectively.

A capacitance element C6 illustrated in FIG. 23 is formed on the lower surface of the substrate 120 so as to always keep a certain capacitance value. One electrode constituting the capacitance element C106 is connected to a terminal T106 and the other electrode is grounded. This capacitance element C106 is used in cooperation with the capacitance element C105 to derive the output signal $V_z$ for the Z-axial component of an external force. In this embodiment, for deriving the output signals $V_x$, $V_y$, and $V_z$, a cyclic signal such as a clock signal is always being input to each of the terminals T101 to T106, like the embodiment described with reference to FIG. 5. For example, with respect to the cyclic signal being input to the terminal T101, two capacitance elements C101 and C100b are connected in series. Also, two capacitance elements C102 and C100b are connected in series with respect to the cyclic signal being input to the terminal T102, two capacitance elements C103 and C100b are connected in series with respect to the cyclic signal being input to the terminal T103, two capacitance elements C104 and C100b are connected in series with respect to the cyclic signal being input to the terminal T104, and two capacitance elements C105 and C100a are connected in series with respect to the cyclic signal being input to the terminal T105.

When the detective buttons 130 receive an external force to be moved in a state that the cyclic signals are being input to the terminals T101 to T106, the displacement electrode 141 or 142 moves accordingly. The interval between the electrodes of each of the capacitance elements C101 to C105 then changes and thereby the capacitance values of the respective capacitance elements C101 to C105 change. As a result, phase shifts occur in the cyclic signals being input to the terminals T101 to T106. Using the phase shifts thus occurring in the cyclic signals, the output signals $V_x$, $V_y$, and $V_z$ can be obtained that indicate the X-axial, Y-axial, and Z-axial intensities and directions of the external force received by the button 131 or 132. The details of the deriving method are the same as those described with respect to the signal processing circuit in the capacitance type sensor of FIG. 1, so the description will be omitted here.

As described above, in the capacitance type sensor 110 of this embodiment, the displacement electrodes 141 and 142 used for constituting the capacitance elements C101 to C105, C100a, and C100b are capacitively coupled with the reference electrodes E100a and E100b grounded or kept at a certain potential. Therefore, the withstand voltage characteristic of the sensor 110 is improved and the sensor is hardly broken due to the flow of a spark current. Besides, a bad condition in electrical connection or the like can be prevented. Thus, a highly reliable capacitance type sensor 110 can be obtained. In addition, since the capacitance elements C101 and C100b; C102 and C100b; . . . ; or C105 and C100a are connected in series with respect to a cyclic signal, by providing wiring only on the substrate 120 supporting the capacitance element electrodes E101 to E105 and the reference electrodes E100a and E100b, any wiring for grounding the displacement electrodes 141 and 142 or keeping them at a certain potential need not separately be provided. Therefore, a capacitance type sensor having a simple structure can be manufactured through a less number of manufacturing steps.

Besides, the plural capacitance element electrodes E101 to E105 are formed and thereby the X-axial, Y-axial, and Z-axial components of an external force received by the detective member 131 or 132 can be known independently of one another. Further, the surface of the displacement electrode 141 opposite to the capacitance element electrode E105 and reference electrode E100a is made uneven in height and the capacitance element C105 is formed between the surface of the displacement electrode 141 and the capacitance element electrode E105. This can make the change in the capacitance value of the capacitance element C105 more minutely, and thus the detection accuracy of an external force is improved.

Since signals different in phase from each other are supplied to the capacitance element electrodes in each pair (E101 and E102, and E103 and E104), the phase shift by passing through a circuit can be made wider. In addition, since a signal processing circuit utilizing a logic element is used, the signal can accurately be detected.

Besides, since the detective members 130 are separated so as to correspond to the capacitance element electrodes E101 to E104 and the capacitance element electrode E105, respectively, the X- or Y-axial component and the Z-axial component of an external force can specifically be separated. This can relieve the interference between components in different directions and so decrease erroneous operations.

Besides, since the insulating film 150 is formed so as to be in close contact with the capacitance element electrodes E101 to E105 and the reference electrodes E100$a$ and E100$b$ and cover the corresponding part of the upper portion of the substrate 120, the capacitance element electrodes E101 to E105 and the reference electrodes E100$a$ and E100$b$ are prevented from being exposed to air and thereby each electrode surface is prevented from being oxidized.

Besides, each of the displacement electrodes 140 and supporting member 160 is made of an elastic material, the efficiency of transmission of an external force, which has been received by the detective members 130, to the displacement electrodes 140 is improved. This brings about an improvement of operability. In addition, since the impact of the external force can be relieved, the damage of the capacitance type sensor can be relieved.

Next, the third embodiment of the present invention will be described with reference to drawings.

Figure 24:
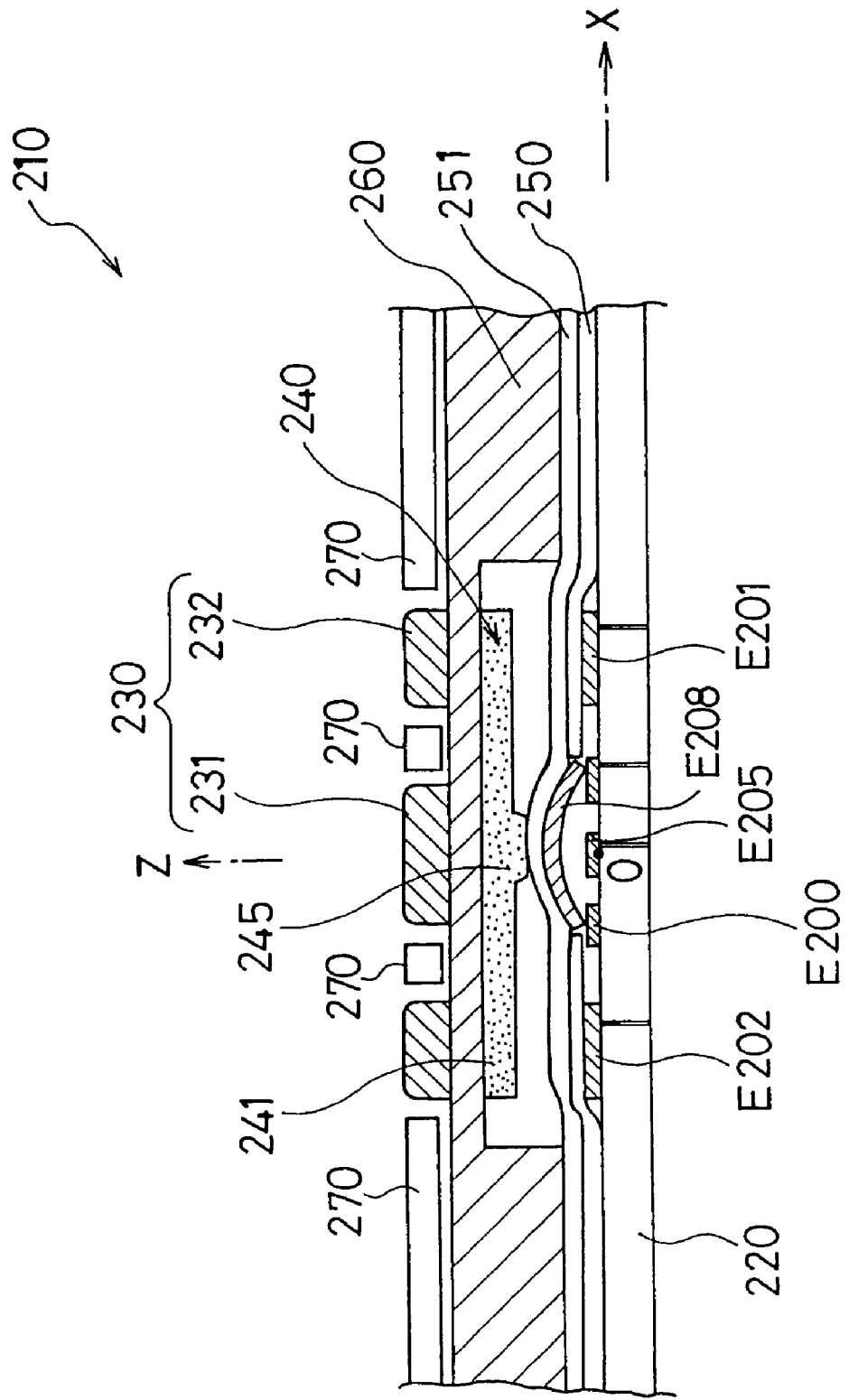
FIG. 24 is a schematic sectional view of a capacitance type sensor according to the third embodiment of the present invention.
Figure 25:
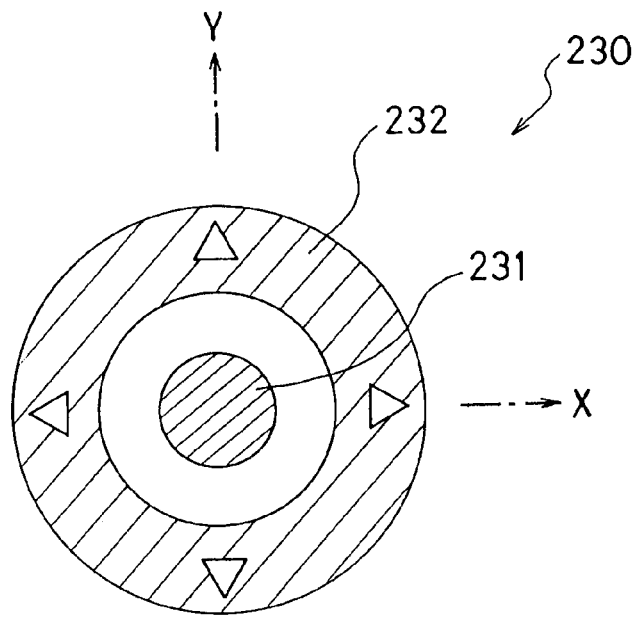
FIG. 25 is an upper view of a detective button of the capacitance type sensor of FIG. 24.
Figure 26:
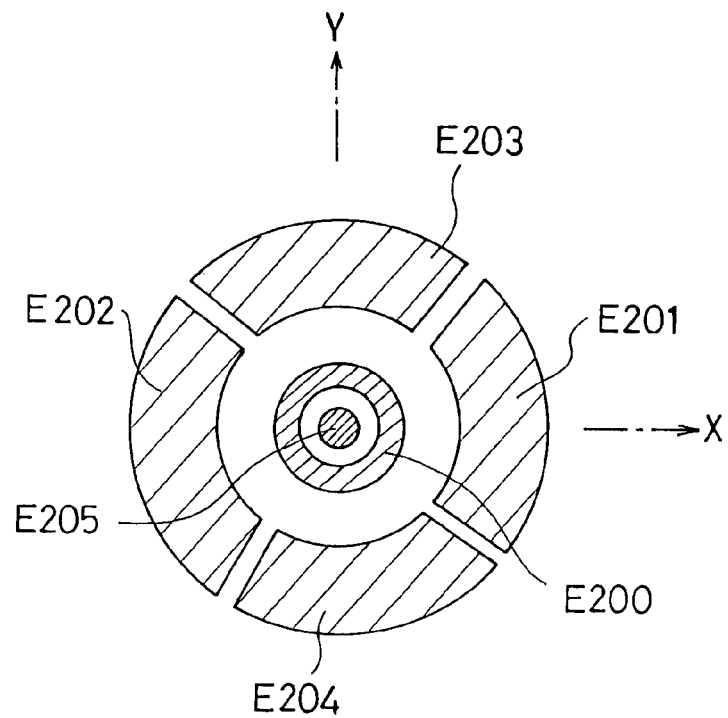
FIG. 26 illustrates an arrangement of electrodes formed on a substrate of the capacitance type sensor of FIG. 24.

FIG. 24 is a schematic sectional side view of a capacitance type sensor according to another embodiment of the present invention. FIG. 25 is an upper view of detective buttons of the capacitance type sensor of FIG. 24. FIG. 26 illustrates an arrangement of electrodes formed on the substrate of the capacitance type sensor of FIG. 24.

The capacitance type sensor 210 includes a substrate 220, detective buttons 230, a displacement electrode 240, capacitance element electrodes E201 to E204 formed on the substrate 220, a fixed switch electrode E205, a movable switch electrode E208, a reference electrode E200, an insulating film 250 formed in close contact with the capacitance element electrodes E201 to E204 to cover the upper portion of the substrate 220, an insulating film 251 formed in close contact with the movable switch electrode E208 to cover the upper portion of the insulating film 250, a supporting member 260 for supporting and fixing the detective buttons 230 and the displacement electrode 240 to the substrate 220, and a cover case 270 disposed so as to separate the detective buttons 230.

For convenience of explanation, an XYZ three-dimensional coordinate system is defined as illustrated and the arrangement of the aforementioned components will be explained with reference to the coordinate system. That is, in FIG. 24, the origin O is set on the substrate 220 at the position opposite to the center of the displacement electrode 240, the X-axis is set so as to horizontally extend rightward, the Z-axis is set so as to vertically extend upward, and the Y-axis is set so as to extend backward perpendicularly to FIG. 24. Thus, the upper face of the substrate 220 is on the XY-plane and the Z-axis extends through the respective centers of the fixed switch electrode E205 on the substrate 220, a detective button 231, and the displacement electrode 140.

The substrate 220 may be a general printed circuit board for an electronic circuit, like the substrate 20. In this embodiment, a glass epoxy board is employed. Otherwise, a filmy substrate such as a polyimide film may be used as the substrate 220. However, such a filmy substrate may be too flexible, so it is preferably disposed on a sufficiently rigid supporting board.

The detective buttons 230 are constituted by a circular button 231 having its center at the origin, and a ring-shaped button 232 disposed outside the button 231 so that the center of the button 232 may be at the origin. The detective buttons 230 have the same shapes as the detective buttons 130 illustrated in FIG. 8. The diameter of the button 231 is substantially equal to or somewhat smaller than the outer diameter of the reference electrode E200, while the outer diameter of the button 232 is substantially equal to the diameter of the circle determined by connecting the outer circumferential curves of the capacitance element electrodes E201 to E204.

On the upper surface of the button 232, as illustrated in FIG. 25, indicators corresponding to the respective operation directions (movement directions of a cursor) are provided so as to correspond to the positive and negative directions of the X- and Y-axes, i.e., to the capacitance element electrodes E201 to E204.

The displacement electrode 240 is made of a conductive rubber into a disk shape having its diameter equal to the outer diameter of the button 232. The displacement electrode 240 is made up of a displacement portion 241 that moves with being attendant upon the movement of the button 232, and a protrusion 245 formed on the lower face of the displacement electrode 240 so as to be opposite to the movable switch electrode E208.

In the lower face of the supporting member 260 formed is a downward circular recess having its center at the Z-axis. The diameter of the recess is somewhat larger than the diameter of the displacement electrode 240. The displacement electrode 240 is attached to the bottom of the recess. To the upper face of the supporting member 260 attached are the detective button 232 at the position corresponding to the displacement electrode 241 and the button 231 at the position corresponding to the protrusion 245. On the upper face of the supporting member 260, the cover case 270 is disposed so as to separate the buttons 231 and 232.

As illustrated in FIG. 26, on the substrate 220 formed are a circular fixed switch electrode E205 having its center at the origin O, a ring-shaped reference electrode E200 disposed outside the capacitance element electrode E205 so that the center of the reference electrode E200 may be at the origin O, fan-shaped capacitance element electrodes E201 to E204 disposed outside the reference electrode E200. The capacitance element electrodes E201 and E202 in a pair are disposed at a distance from each other along the X-axis and symmetrically with respect to the Y-axis. Also, the capacitance element electrodes E203 and E204 in a pair are disposed at a distance from each other along the Y-axis and symmetrically with respect to the X-axis.

In this embodiment, the capacitance element electrode E201 is disposed so as to correspond to the X-axial positive direction while the capacitance element electrode E202 is disposed so as to correspond to the X-axial negative direction. Thus, they are used for detecting the X-axial component of an external force. Also, the capacitance element electrode E203 is disposed so as to correspond to the Y-axial positive direction while the capacitance element electrode E204 is disposed so as to correspond to the Y-axial negative direction. Thus, they are used for detecting the Y-axial component of an external force. Further, the fixed switch electrode E205 is disposed on the origin O and it is used in cooperation with the movable switch electrode E208 for an operation for determining an input or the like.

The reference electrode E200, the capacitance element electrodes E201 to E204, and the fixed switch electrode E205 are connected to terminals T200 to T205 (see FIG. 27) via through-holes or the like, respectively. They are connected with an external electronic circuit through the terminals T200 to T205. In this embodiment, the reference electrode E200 is grounded via the terminal T200.

The insulating film 250 is formed in close contact with the capacitance element electrodes E201 to E204 on the substrate 220 to cover a part of the upper portion of the substrate 220 other than the movable switch electrode E208, and further the insulating film 251 is formed in close contact with the movable switch electrode E208 to cover the upper portion of the insulating film 250. Therefore, the capacitance element electrodes E201 to E204, which are made of copper or the like, are never exposed to air. Thus, the insulating films 250 and 251 have a function of preventing those electrodes from being oxidized. Since the insulating films 250 and 251 are formed, the reference electrode E200 and the movable switch electrode E208 never come into direct contact with the displacement electrode 240.

Thus, the capacitance element electrodes E201 to E204 and the movable switch electrode E200 (the reference electrode E208) cooperate with the displacement electrode 240 to form capacitance elements between them. More specifically, each of the capacitance element electrodes E201 to E204 cooperates with the displacement portion 241 of the displacement electrode 240 to constitute a capacitance element. The movable switch electrode E208 cooperates with the protrusion 245 of the displacement electrode 140 to constitute a capacitance element.

Figure 27:
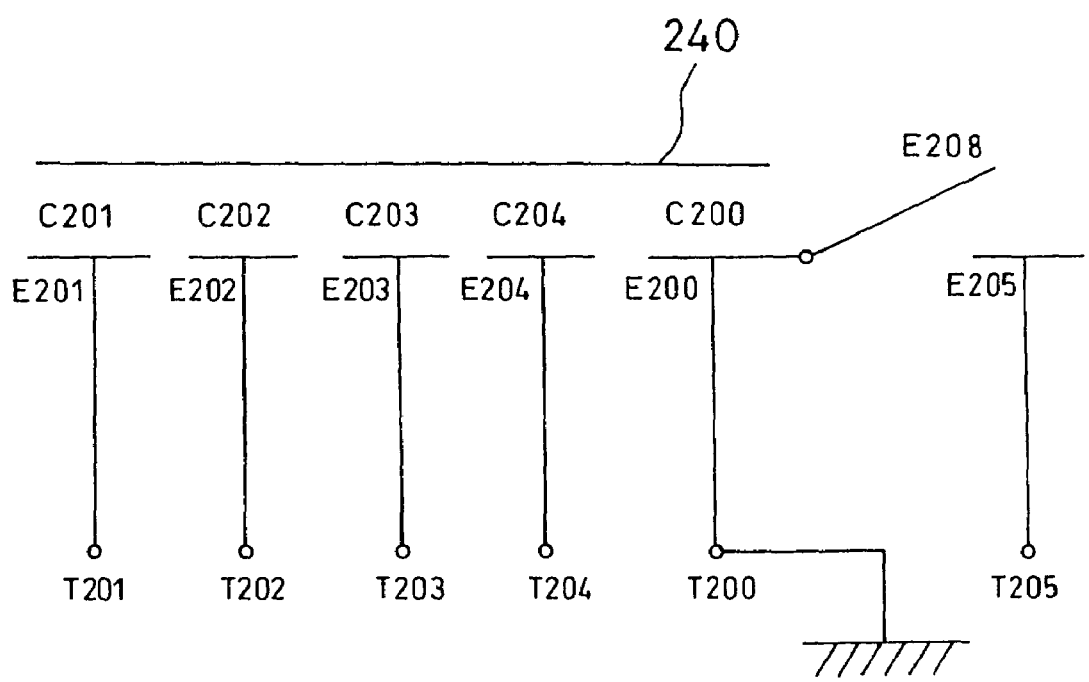
FIG. 27 is a circuit diagram equivalent to the construction of the capacitance type sensor illustrated in FIG. 24.
Figure 28:
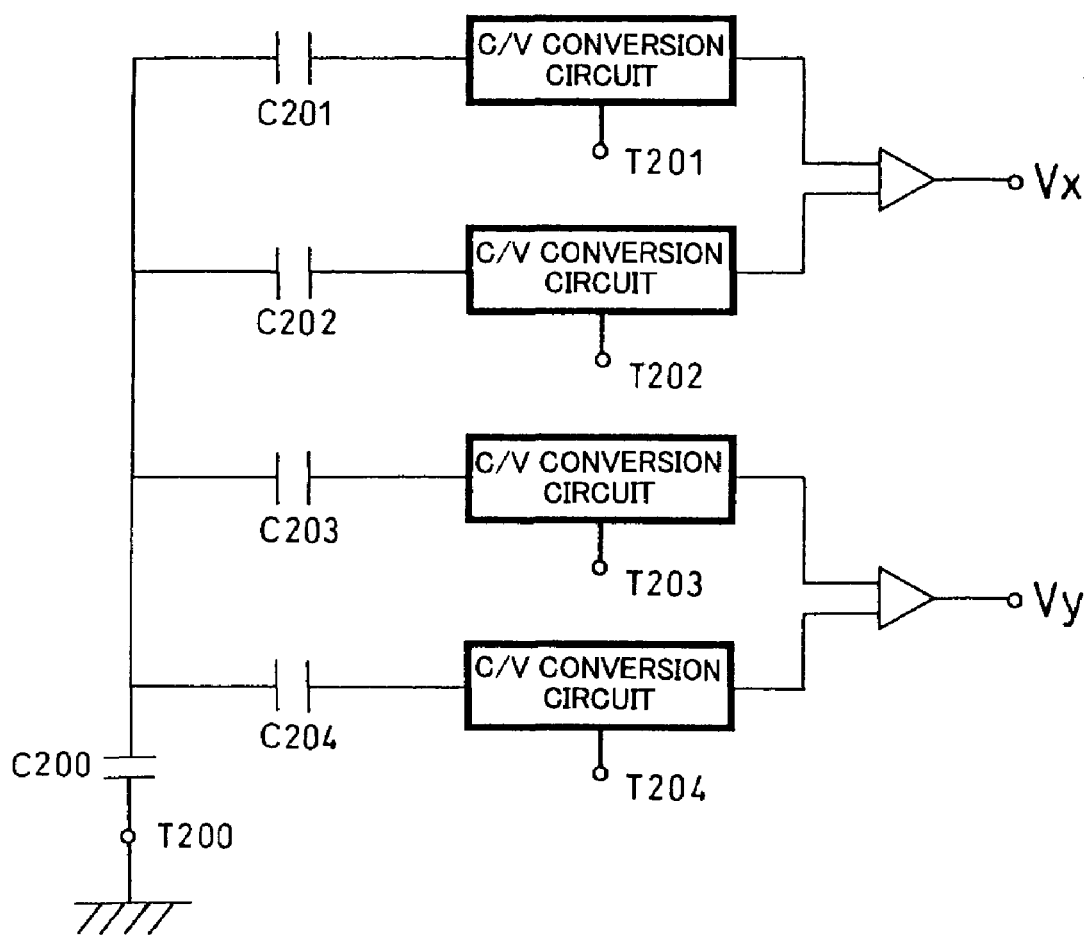
FIG. 28 is an explanatory diagram for explaining a method for deriving an output signal from a cyclic signal being input to the capacitance type sensor illustrated in FIG. 24.

Next, the operation of the capacitance type sensor 210 according to this embodiment constructed as described above will be described with reference to drawings. FIG. 27 is a circuit diagram equivalent to the construction of the capacitance type sensor illustrated in FIG. 24. FIG. 28 is an explanatory diagram for explaining a method for deriving an output signal from a cyclic signal being input to the capacitance type sensor illustrated in FIG. 24.

First, a circuit construction equivalent to the construction of the capacitance type sensor 210 will be described with reference to FIG. 27. The capacitance element electrodes E201 to E204 and reference electrode E200 (the movable switch electrode E200) formed on the substrate 220 are opposite to the displacement electrode 240. The capacitance elements C200 to C204 are formed between the movable displacement electrode 240 as a common electrode and the fixed reference electrode E200 and capacitance element electrodes E201 to E204, respectively. The capacitance elements C201 to C204 are variable capacitance elements whose capacitance values change due to the movement of the displacement electrode 240. In addition, a switch to be opened/closed in accordance with a depression of the button 231 is formed between the movable switch electrode E208 connected to the reference electrode E200 and the fixed switch electrode E205.

The capacitance values of the capacitance elements C200 to C204 can be measured independently of one another as the capacitance values between the displacement electrode 240 and the respective terminals T200 to T204 connected to the reference electrode E200 and capacitance element electrodes E201 to C204. In this embodiment, since the reference electrode E200 is grounded via the terminal T200, the displacement electrode 240 as a common electrode of the capacitance elements C200 to C204 is considered to be grounded via the capacitance element C200 and the terminal T200. That is, the capacitance element C200 has a function of electrically coupling the displacement electrode 240 with the terminal T200.

Next, a deriving method of an output signal indicating the intensity and direction of an external force to the button 232, from a change in capacitance value of each of the capacitance elements C200 to C204 win be described with reference to FIG. 28. In FIG. 28, output signals $V_x$ and $V_y$ indicate the intensities and directions of the X-axial and Y-axial components of an external force, respectively.

In this embodiment, for deriving the output signals $V_x$ and $V_y$, a cyclic signal such as a clock signal is always being input to each of the terminals T201 to T104, like the embodiment described with reference to FIG. 5. For example, with respect to the cyclic signal being input to the terminal T201, two capacitance elements C201 and C200 are connected in series. Also, two capacitance elements C202 and C200 are connected in series with respect to the cyclic signal being input to the terminal T202, two capacitance elements C203 and C200 are connected in series with respect to the cyclic signal being input to the terminal T203, and two capacitance elements C204 and C200 are connected in series with respect to the cyclic signal being input to the terminal T204.

When the button 232 receives an external force to be moved in a state that the cyclic signals are being input to the terminals T201 to T204, the displacement portion 241 of the displacement electrode 240 moves accordingly. The interval between the electrodes of each of the capacitance elements C201 to C204 then changes and thereby the capacitance values of the respective capacitance elements C201 to C204 change. As a result, phase shifts occur in the cyclic signals being input to the terminals T201 to T204. Using the phase shifts thus occurring in the cyclic signals, the output signals $V_x$ and $V_y$ can be obtained that indicate the X-axial and Y-axial intensities and directions of the external force received by the button 232. The details of the deriving method are the same as those described with respect to the signal processing circuit in the capacitance type sensor of FIG. 1, so the description will be omitted here.

As described above, in the capacitance type sensor 210 of this embodiment, the displacement electrode 240 used for constituting the capacitance elements C200 to C204 is capacitively coupled with the reference electrode E200 grounded or kept at a certain potential. Therefore, the withstand voltage characteristic of the sensor 210 is improved and the sensor is hardly broken due to the flow of a spark current. Besides, a bad condition in electrical connection or the like can be prevented. Thus, a highly reliable capacitance type sensor 210 can be obtained. In addition, since the capacitance elements C201 and C200; C202 and C200; . . . ; or C204 and C200 are connected in series with respect to a cyclic signal, by providing wiring only on the substrate 220 supporting the capacitance element electrodes E201 to E204 and the reference electrode E200, any wiring for grounding the displacement electrode 240 or keeping it at a certain potential need not separately be provided. Therefore, a capacitance type sensor having a simple structure can be manufactured through a less number of manufacturing steps.

Besides, the plural capacitance element electrodes E201 to E204 are formed and thereby the X-axial and Y-axial components of an external force received by the detective member 231 can be known independently of one another. Further, since the displacement electrode 240 is deformed to incline with the protrusion 245 serving as a fulcrum, the X- or Y-axial component can easily be detected. In addition, an input device with a switch for determination operations can be provided. In this device, since a distinct operation feeling can be obtained upon a determination operation, erroneous operations can be prevented.

Since signals different in phase from each other are supplied to the capacitance element electrodes in each pair (E201 and E202, and E203 and E204), the phase shift by passing through a circuit can be made wider. In addition, since a signal processing circuit utilizing a logic element is used, the signal can accurately be detected.

Besides, since the detective members 230 are separated so as to correspond to the capacitance element electrodes E201 to E204 and E205, respectively, the X- or Y-axial component and the Z-axial component of an external force can specifically be separated. This can relieve the interference between components in different directions and so decrease erroneous operations.

Besides, since the insulating films 250 and 251 are formed so as to be in close contact with the capacitance element electrodes E201 to E204 and the movable switch electrode E208 and cover the corresponding part of the upper portion of the substrate 220, the capacitance element electrodes E201 to E204 and the movable switch electrode E208 are prevented from being exposed to air and thereby each electrode surface is prevented from being oxidized. In addition, by using the insulating films 250 and 251, the movable switch electrode E208 can easily be fixed to the reference electrode E200.

Besides, each of the displacement electrode 240 and the supporting member 260 is made of an elastic material, the efficiency of transmission of an external force, which has been received by the detective members 230, to the displacement electrode 240 is improved. This brings about an improvement of operability. In addition, since the impact of the external force can be relieved, the damage of the capacitance type sensor can be relieved.

Next, the fourth embodiment of the present invention will be described with reference to drawings.

Figure 29:
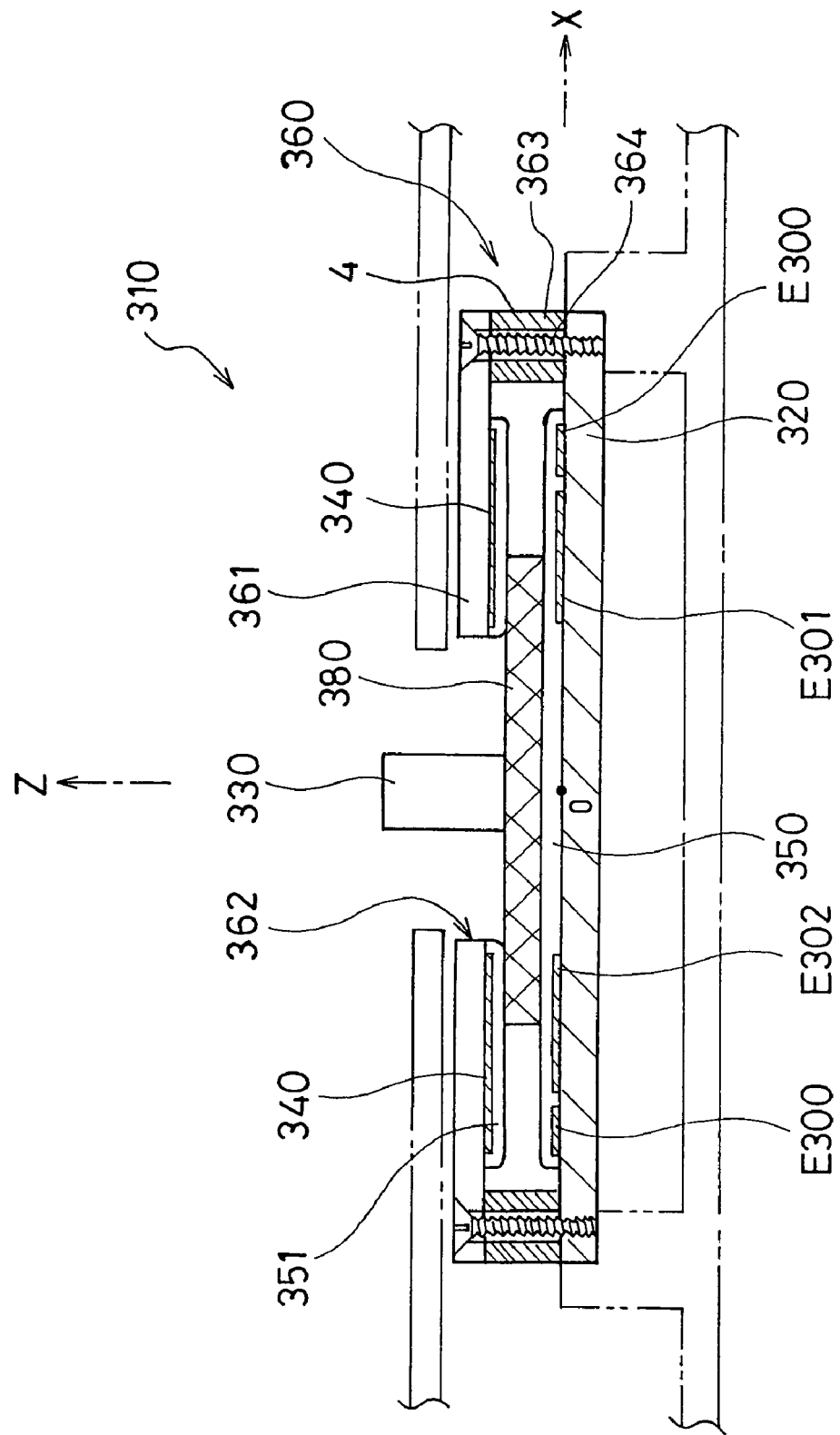
FIG. 29 is a schematic sectional view of a capacitance type sensor according to the fourth embodiment of the present invention.
Figure 30:
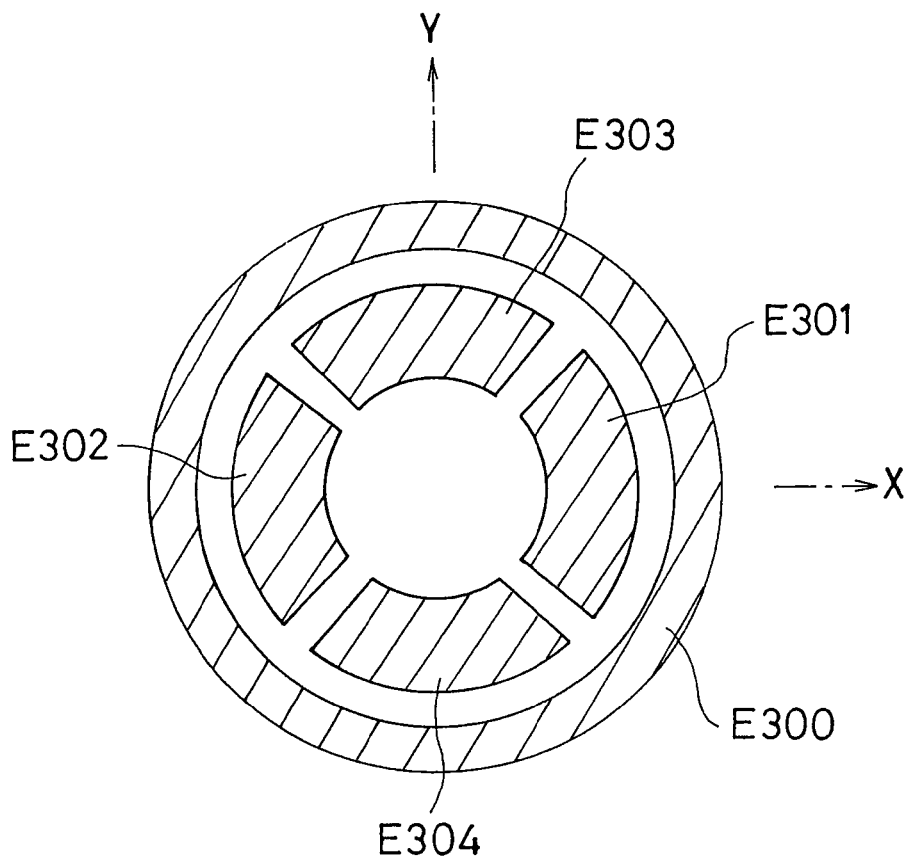
FIG. 30 illustrates an arrangement of electrodes formed on a substrate of the capacitance type sensor of FIG. 29.
Figure 31:
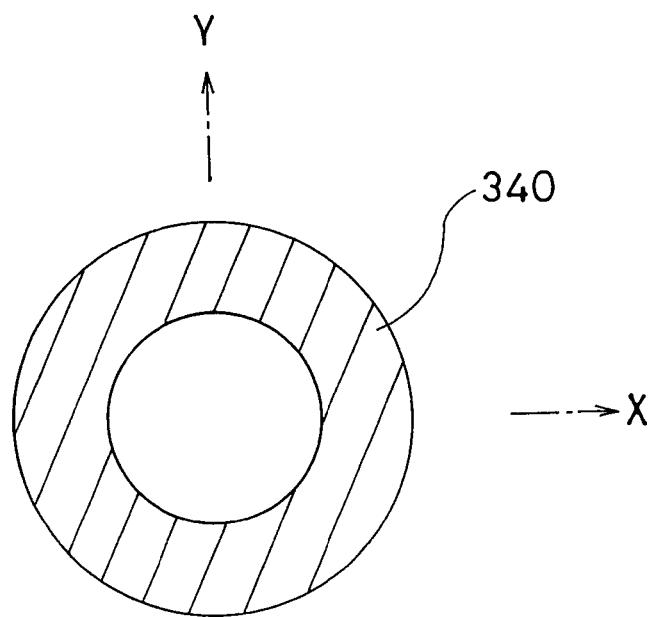
FIG. 31 illustrates the shape of a conductive member formed on the lower surface of a supporting member of the capacitance type sensor of FIG. 29.

FIG. 29 is a schematic sectional side view of a capacitance type sensor according to another embodiment of the present invention. FIG. 30 illustrates an arrangement of electrodes disposed in parallel with the substrate of the capacitance type sensor of FIG. 29. FIG. 31 illustrates an arrangement of electrodes formed on the substrate of the capacitance type sensor of FIG. 29.

The capacitance type sensor 310 includes a substrate 320, a detective member 330, a conductive member 340, capacitance element electrodes E301 to E304 and a reference electrode E300 formed on the substrate 320, an insulating film 350 formed in close contact with the capacitance element electrodes E301 to E304 and reference electrode E300 to cover the corresponding part of the upper portion of the substrate 320, an insulating film 351 formed in close contact with the conductive member 340 to cover the corresponding part of the lower portion of a supporting member 361, which is one component of a supporting mechanism 360, and an insulating member 380 disposed in between the conductive member 340 and the capacitance element electrodes E301 to E304 and reference electrode E300. The supporting mechanism 360 includes a spacer 363 and screws 364 as well as the supporting member 361 having a through-hole 362. The spacer 363 is a ring-shaped member having its diameters larger than the outer diameter of the reference electrode E300. The height of the spacer 363 is substantially equal to the total thickness of the insulating member 380 and the insulating films 350 and 351.

For convenience of explanation, an XYZ three-dimensional coordinate system is defined as illustrated and the arrangement of the aforementioned components will be explained with reference to the coordinate system. That is, in FIG. 29, the origin O is set on the substrate 320, the X-axis is set so as to horizontally extend rightward, the Z-axis is set so as to vertically extend upward, and the Y-axis is set so as to extend backward perpendicularly to FIG. 29. Thus, the upper surface of the substrate 320 is on the XY-plane and the Z-axis extends through the respective centers of the capacitance element electrodes E301 to E304 on the substrate 320, the reference electrode E300, the detective member 330 (in a state that no external force is applied), the conductive member 340, and the through-hole 362.

The substrate 320 may be a general printed circuit board for an electronic circuit. In this embodiment, a glass epoxy board is employed. Otherwise, a filmy substrate such as a polyimide film may be used as the substrate 320. However, such a filmy substrate may be too flexible, so it is preferably disposed on a sufficiently rigid supporting board.

The detective member 330 is formed into a cylindrical shape to function as a force-receiving portion. The detective member 330 is movable in parallel with the substrate 320 within the range of the through-hole 362 of the supporting member 361. The shape of the detective member 330 may properly be changed in order to improve the operability.

As illustrated in FIG. 30, on the substrate 320 formed are fan-shaped capacitance element electrodes E301 to E304 whose center is at the origin O, and a ring-shaped reference electrode E300 whose center is at the origin O. The capacitance element electrodes E301 and E302 in a pair are disposed at a distance from each other along the X-axis and symmetrically with respect to the Y-axis. Also, the capacitance element electrodes E303 and E304 in a pair are disposed at a distance from each other along the Y-axis and symmetrically with respect to the X-axis. Alternatively, the reference electrode E300 may be formed inside the capacitance element electrodes E301 to E304.

The conductive member 340 functions as a ring-shaped electrode whose center is at the Z-axis. The inner diameter of the conductive member 340 is equal to the inner diameter of the capacitance element electrodes E301 to E304. The outer diameter of the conductive member 340 is equal to the outer diameter of the reference electrode E300. The conductive member 340 is attached to the lower face of the supporting member 361 so as to be opposite to the capacitance element electrodes E301 to E304 and reference electrode E300.

The insulating film 350 is formed in close contact with the capacitance element electrodes E301 to E304 and reference electrode E300 on the substrate 320 to cover the corresponding part of the upper portion of the substrate 320. Besides, the insulating film 351 is formed in close contact with the conductive member 340 to cover the corresponding part of the lower portion of the supporting member 361. Therefore, the conductive member 340, capacitance element electrodes E301 to E304, and reference electrode E300, which are made of copper or the like, are never exposed to air. Thus, the insulating films 350 and 351 have functions of preventing those member and electrodes from being oxidized.

The insulating member 380 is a disk-shaped member having its diameter smaller than the outer diameter of the capacitance element electrodes E301 to E304. The insulating member 380 is disposed so as to be in contact with the insulating films 350 and 351 and sandwiched by them. The detective member 330 is attached at the center of the upper face of the insulating member 380. The insulating member 380 is formed by molding a synthetic resin into a single body. As the synthetic resin preferably used is a synthetic resin that brings about low surface friction. The shape of the insulating member 380 may properly be changed in consideration of the shapes and arrangement of the capacitance element electrodes E301 to E304 and the reference electrode E300.

In this embodiment, the capacitance element electrode E301 is disposed so as to correspond to the X-axial positive direction while the capacitance element electrode E302 is disposed so as to correspond to the X-axial negative direction. Thus, they are used for detecting the X-axial component of an external force. Also, the capacitance element electrode E303 is disposed so as to correspond to the Y-axial positive direction while the capacitance element electrode E304 is disposed so as to correspond to the Y-axial negative direction. Thus, they are used for detecting the Y-axial component of an external force.

The reference electrode E300 and the capacitance element electrodes E301 to E304 are connected to terminals T300 to T304 (see FIG. 32) via through-holes or the like, respectively. They are connected with an external electronic circuit through the terminals T300 to T304. In this embodiment, the reference electrode E300 is grounded via the terminal T300.

Thus, the reference electrode E300 and capacitance element electrodes E301 to E304 cooperate with the conductive member 340 to form capacitance elements C300 to C304 between them. The dielectric constant between the conductive member 340 and each of the capacitance element electrodes E301 to E304 and the reference electrode E30 changes in accordance with the movement of the insulating member 380 between the corresponding electrodes. The capacitance value of each of the capacitance elements C300 to C304 changes accordingly.

Figure 32:
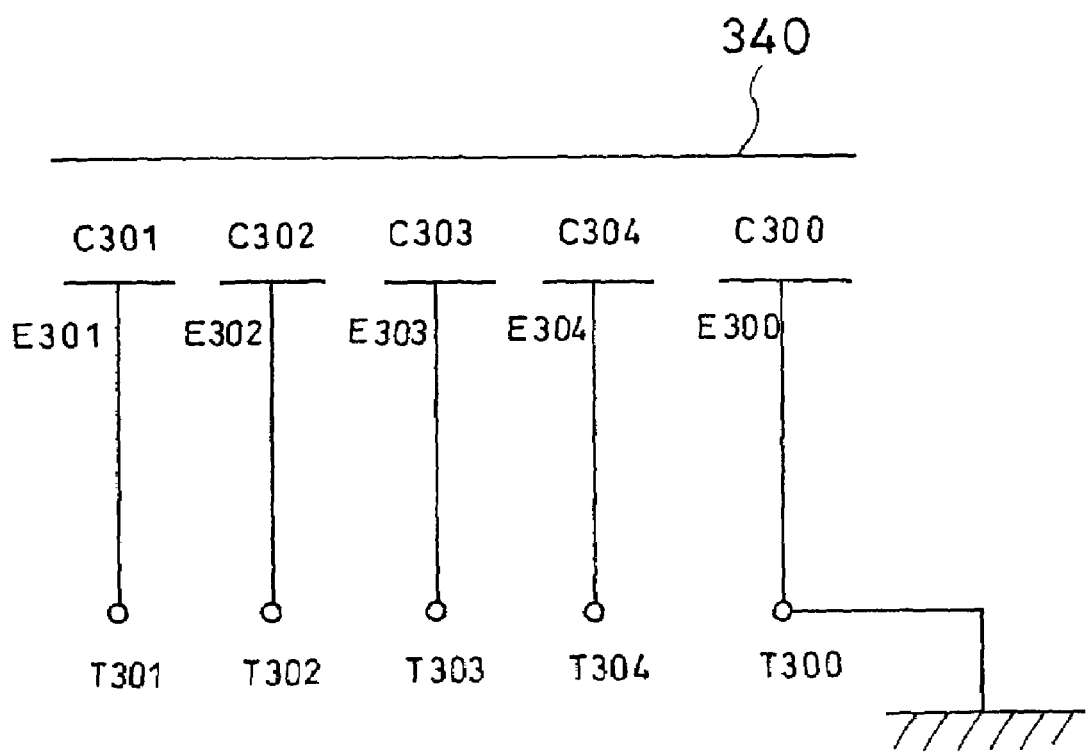
FIG. 32 is a circuit diagram equivalent to the construction of the capacitance type sensor illustrated in FIG. 29.
Figure 33:
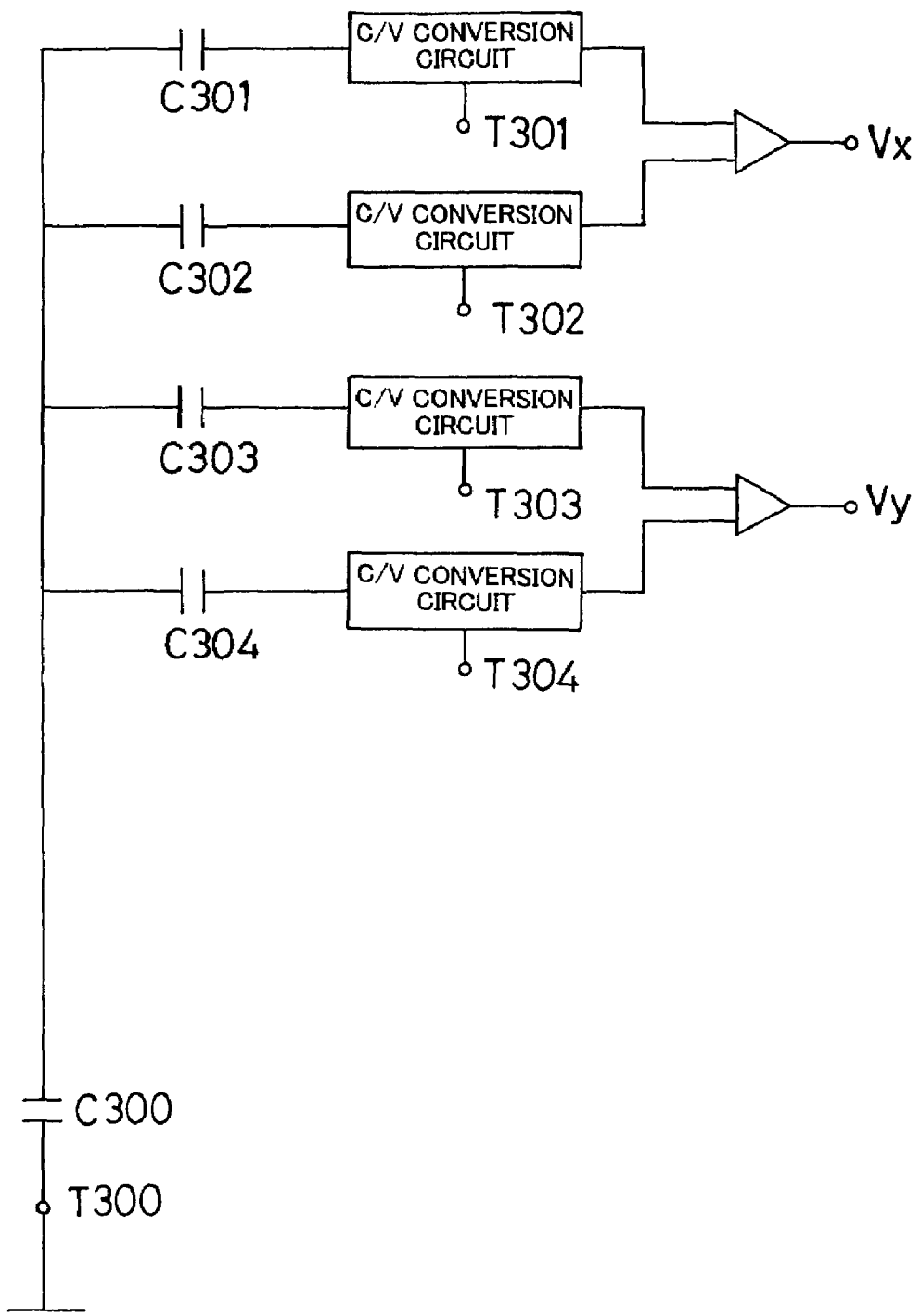
FIG. 33 is an explanatory diagram for explaining a method for deriving an output signal from a cyclic signal being input to the capacitance type sensor illustrated in FIG. 29.
Figure 34:
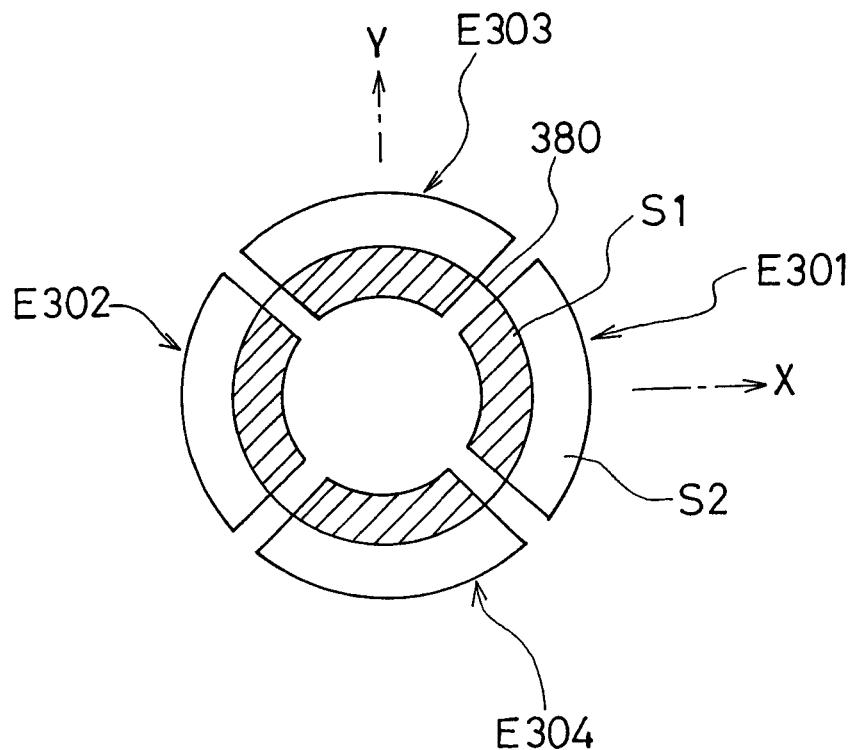
FIG. 34 illustrates a positional relation between capacitance element members and an insulating member when no operation is applied to a detective member of the capacitance type sensor illustrated in FIG. 29.
Figure 35:
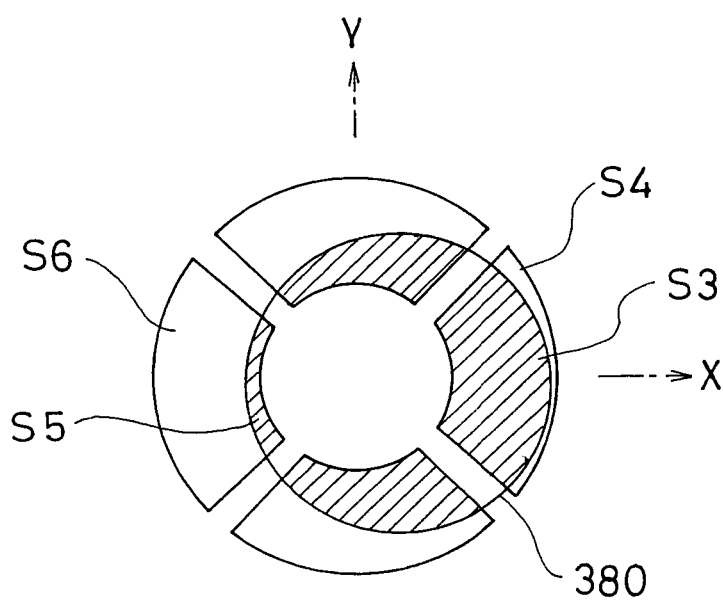
FIG. 35 illustrates a positional relation between the capacitance element members and the insulating member when an operation in the X-axial positive direction is applied to the detective member of the capacitance type sensor illustrated in FIG. 29.
Figure 36:
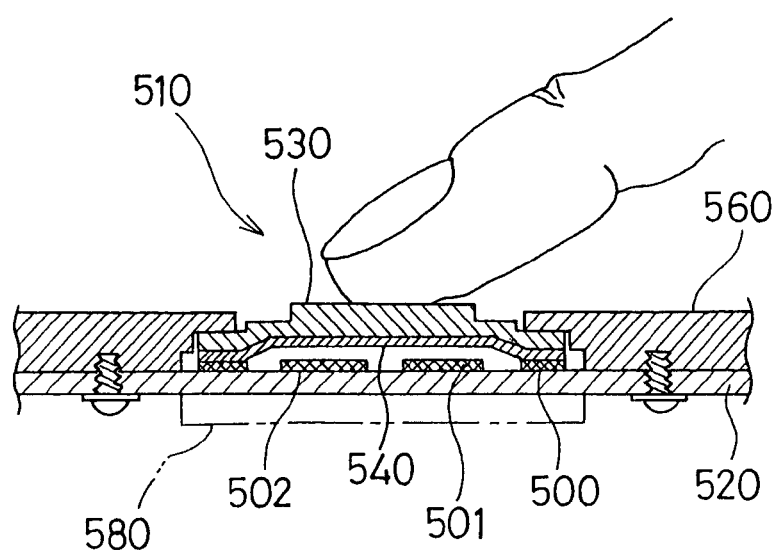
FIG. 36 is a schematic sectional view of a conventional capacitance type sensor.
Figure 37:
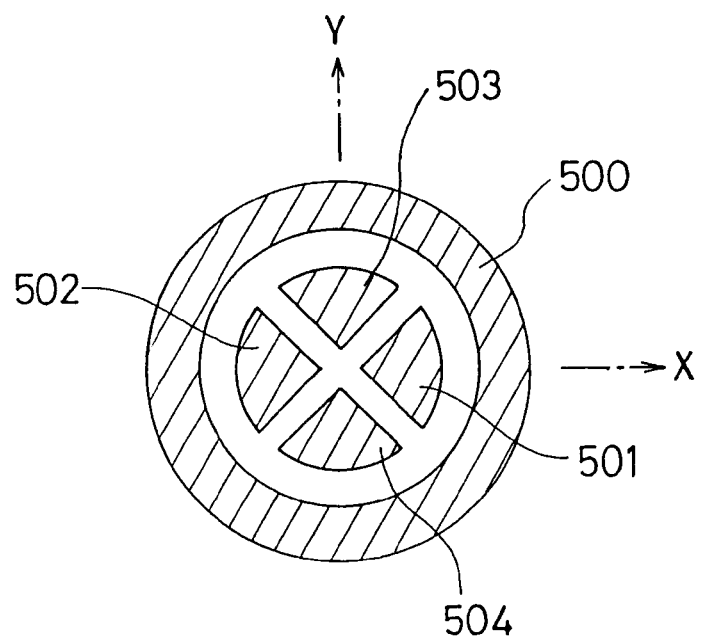
FIG. 37 illustrates an arrangement of electrodes formed on a substrate of the capacitance type sensor of FIG. 36.
Figure 38:
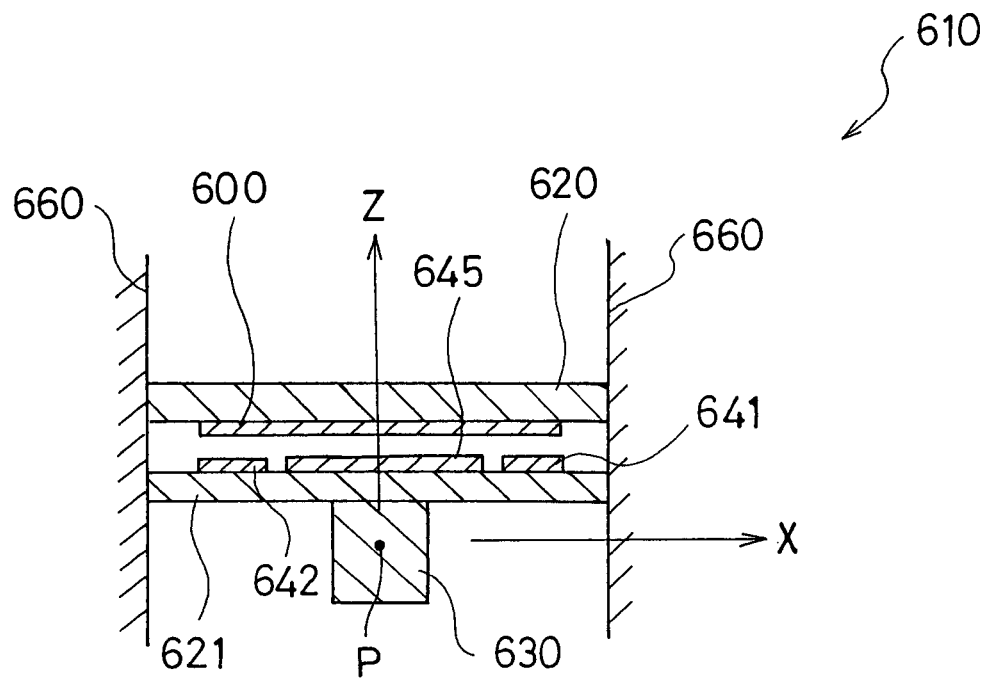
FIG. 38 is a schematic sectional view of a conventional capacitance type sensor.
Figure 39:
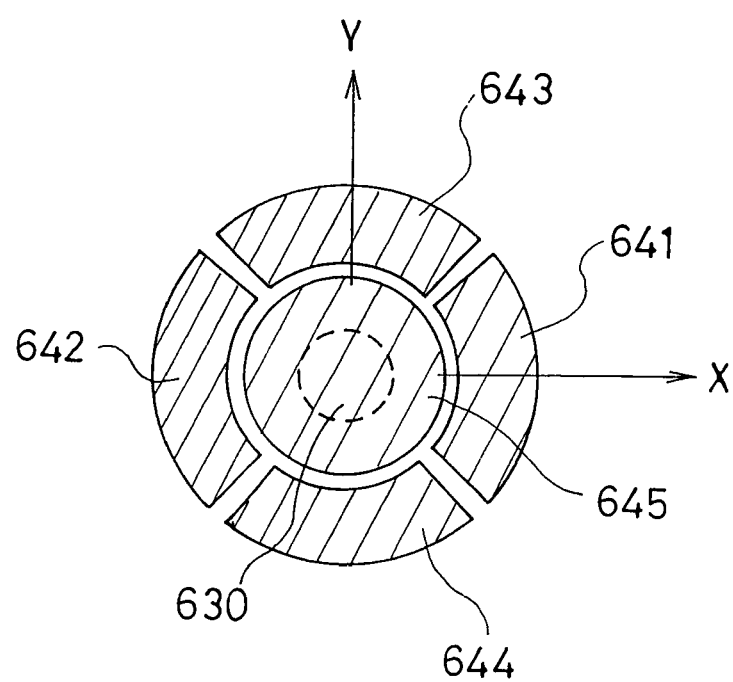
FIG. 39 illustrates an arrangement of electrodes formed on a substrate of the capacitance type sensor of FIG. 38.

Next, the operation of the capacitance type sensor 310 according to this embodiment constructed as described above will be described with reference to drawings. FIG. 32 is a circuit diagram equivalent to the construction of the capacitance type sensor illustrated in FIG. 29. FIG. 33 is an explanatory diagram for explaining a method for deriving an output signal from a cyclic signal being input to the capacitance type sensor illustrated in FIG. 29. FIG. 34 illustrates a positional relation between the capacitance element electrodes and the insulating member when no external operation is applied to the detective member of the capacitance type sensor illustrated in FIG. 29. FIG. 35 illustrates a positional relation between the capacitance element electrodes and the insulating member when an operation in the X-axial positive direction is applied to the detective member of the capacitance type sensor illustrated in FIG. 29.

First, a circuit construction equivalent to the construction of the capacitance type sensor 310 will be described with reference to FIG. 32. The capacitance element electrodes E301 to E304 and reference electrode E300 formed on the substrate 320 are opposite to the conductive member 340. The capacitance elements C300 to C304 are formed between the fixed conductive member 340 as a common electrode and the fixed reference electrode E300 and capacitance element electrodes E301 to E304, respectively. The capacitance elements C300 to C304 are variable capacitance elements whose capacitance values change due to the movement of the insulating member 380 between the conductive member 340 and the reference electrode E300 and capacitance element electrodes E301 to E304.

The capacitance values of the capacitance elements C300 to C304 can be measured independently of one another as the capacitance values between the conductive member 340 and the respective terminals T301 to T304 connected to the reference electrode E300 and capacitance element electrodes E301 to E304. In this embodiment, since the reference electrode E300 is grounded via the terminal T300, the conductive member 340 as a common electrode of the capacitance elements C301 to C304 is considered to be grounded via the capacitance element C300 and the terminal T300. That is, the capacitance element C300 has a function of electrically coupling the conductive member 340 with the terminal T300.

Next, a deriving method of an output signal indicating the intensity and direction of an external force to the detective member 330, from a change in capacitance value of each of the capacitance elements C301 to C304 will be described with reference to FIG. 33. In FIG. 33, output signals $V_x$ and $V_y$ indicate the intensities and directions of the X-axial and Y-axial components of an external force, respectively.

In this embodiment, for deriving the output signals $V_x$ and $V_y$, a cyclic signal such as a clock signal is always being input to each of the terminals T301 to T304. For example, with respect to the cyclic signal being input to the terminal T301, two capacitance elements C301 and C300 are connected in series. Also, two capacitance elements C302 and C300 are connected in series with respect to the cyclic signal being input to the terminal T302, two capacitance elements C303 and C300 are connected in series with respect to the cyclic signal being input to the terminal T303, and two capacitance elements C304 and C300 are connected in series with respect to the cyclic signal being input to the terminal T304.

When the detective member 330 receives an external force to be moved in a state that the cyclic signals are being input to the terminals T301 to T304, the insulating member 380 moves accordingly within the XY-plane. The composite dielectric constant between the capacitance element electrodes and the conductive member 340 then changes in accordance with the positions of the end portions of the insulating member 380 and thereby the capacitance values of the respective capacitance elements C301 to C304 change. As a result, phase shifts occur in the cyclic signals being input to the terminals T301 to T304. Using the phase shifts thus occurring in the cyclic signals, the output signals $V_x$ and $V_y$ can be obtained that indicate the X-axial and Y-axial intensities and directions of the external force received by the detective member 330. The details of the deriving method are the same as those described with respect to the signal processing circuit in the capacitance type sensor of FIG. 1, so the description will be omitted here.

Next will be discussed a case wherein, in a state that no force has been applied to the detective member 330 illustrated in FIG. 29, an operation in the X-axial positive direction is applied to the detective member 330.

First, in the positional relation between the capacitance element electrodes E301 to E304 and the insulating member 380 when no operation is applied to the detective member 30, as illustrated in FIG. 34, overlapping occurs in the range of substantially half the width from the inner diameter side toward the outer diameter side of each of the capacitance element electrodes E301 to E304 (portions with slant lines in FIG. 34).

In FIG. 34, when the area of the portions where the insulating member 380 is overlapping the respective capacitance element electrodes E301 to E304 is represented by S1 and the area of the portions where the insulating member 380 is not overlapping the respective capacitance element electrodes E301 to E304 is represented by S2, all the capacitance elements C301 to C304 have the same capacitance value and the following expression is obtained.

$$C301 = C302 = C303 = C304 = \varepsilon 1 \cdot \frac{S1}{d} + \varepsilon \cdot \frac{S2}{d}$$

In the above expression, d represents the interval between the electrodes of each of the capacitance elements C301 to C304, $\in$ represents the dielectric constant of air, and $\in 1$ represents the dielectric constant of the insulating member 380. Note that the thickness of either of the insulating films 350 and 351 is sufficiently smaller than d and these films are formed evenly between the electrodes of every capacitance element, so the thickness of either of the insulating films 350 and 351 is omitted here for simplicity.

Next will be described a case wherein an operation in the X-axial positive direction is applied to the detective member 330. In this case, by operating the detective member 330 in the X-axial positive direction, the insulating member 380 is moved in the X-axial positive direction. In the positional relation between the capacitance element electrodes E301 to E304 and the insulating member 380 at this time, as illustrated in FIG. 35, the area of the portion where the conductive member 380 is overlapping the electrode E301 corresponding to the X-axial positive direction has increased while the area of the portion where the conductive member 380 is overlapping the electrode E302 corresponding to the X-axial negative direction has decreased. At this time, the areas of the portions where the conductive member 380 is overlapping the electrode E303 corresponding to the Y-axial positive direction and the electrode E304 corresponding to the Y-axial negative direction are considered to hardly change.

In FIG. 35, when the areas of the portions where the insulating member 380 is overlapping the respective capacitance element electrodes E301 and E302 are represented by S3 and S5 and the areas of the portions where the insulating member 380 is not overlapping the respective capacitance element electrodes E301 and E302 are represented by S4 and S6, the capacitance elements C301 and C302 have different capacitance values and the following expressions are obtained.

$$C301 = \varepsilon 1 \cdot \frac{S3}{d} + \varepsilon \cdot \frac{S4}{d}$$

$$C302 = \varepsilon 1 \cdot \frac{S5}{d} + \varepsilon \cdot \frac{S6}{d}$$

In general, the capacitance value of a capacitance element is in proportion to the dielectric constant between the electrodes constituting the capacitance element and the area of the electrodes. Therefore, when the dielectric constant $\in 1$ of the insulating member 380 is smaller than the dielectric constant $\in$ of air, the relation in magnitude between the capacitance values of the capacitance elements C301 and C302 is as follows:

C301<C302.

Inversely, when the dielectric constant $\in 1$ of the insulating member 380 is larger than the dielectric constant $\in$ of air, the relation in magnitude between the capacitance values of the capacitance elements C301 and C302 is as follows:

C302<C301.

Generally speaking, in many cases, the dielectric constant $\in 1$ of the insulating member 380 is larger than the dielectric constant $\in$ of air.

At this time, phase shifts occur in the respective cyclic signals A and B being input to the terminals T301 and T302. The phase shifts are read out to derive an output signal $V_x$.

As described above, in the capacitance type sensor 310 of this embodiment, the conductive member 340 used in common for constituting the capacitance elements C300 to C304 is electrically coupled through capacitive coupling with the reference electrode E300 grounded or kept at a certain potential. Therefore, the withstand voltage characteristic of the sensor 310 is improved and the sensor is hardly broken due to the flow of a spark current. Besides, a bad condition in electrical connection or the like can be prevented. Thus, a highly reliable capacitance type sensor 310 can be obtained. In addition, since the capacitance elements C301 and C300; C302 and C300; . . . ; or C304 and C300 are connected in series with respect to a cyclic signal, by providing wiring only on the substrate 320 supporting the capacitance element electrodes E301 to E304 and the reference electrode E300, any wiring for grounding the conductive member 340 or keeping it at a certain potential need not separately be provided. Therefore, a capacitance type sensor having a simple structure can be manufactured through a less number of manufacturing steps.

Besides, the plural capacitance element electrodes E301 to E304 are formed and thereby the X-axial and Y-axial components of an external force received by the detective member 330 can be known independently of one another.

Since signals different in phase from each other are supplied to the capacitance element electrodes in each pair (E301 and E302, and E303 and E304), the phase shift by passing through a circuit can be made wider. In addition, since a signal processing circuit utilizing a logic element is used, the signal can accurately be detected.

Besides, since the insulating films 350 and 351 are formed so as to be in close contact with the capacitance element electrodes E300 to E304 and the conductive member 340 and cover the corresponding part of the upper portion of the substrate 320 or supporting member 361, the capacitance element electrodes E300 to E304 and the conductive member 340 are prevented from being exposed to air and thereby each electrode surface is prevented from being oxidized.

Although the preferred embodiments of the present invention have been described, the present invention is never limited to the above-described embodiments. So far as the claims mention, various changes in design can be made. For example, in the above-described embodiments, the detective member and the conductive member are formed as separate parts. But, these may be formed into one body. Therefore, both the detective and conductive members may be made of conductive members.

In the above-described first to third embodiments, by moving the detective member Z-axially, the displacement electrode (conductive member) is moved Z-axially. But, by moving a detective member disposed on the back side of a flexible substrate (the opposite side to the reference electrode), a capacitance element electrode may be moved Z-axially.

In the above-described fourth embodiment, by moving the detective member within the XY-plane with fixing the capacitance element electrodes and the conductive member, the insulating member is moved within the XY-plane. But, inversely to this, by moving the detective member with fixing the insulating member, the capacitance element electrodes and conductive member may be moved within the XY-plane. Incidentally, the insulating member may not be formed into a single member. For example, two or more concentric members having different dielectric constants may be bonded. Even in case of thus changing the construction of the insulating member, the same effect can be obtained.

In the above-described embodiments, the capacitance element electrodes corresponding to at least two axes of the X-, Y-, and Z-axes are provided. But, in accordance with an application, capacitance element electrodes may be formed so that an only necessary axial component can be detected.

In the above-described embodiments, the capacitance type sensor is used as a force sensor for detecting a force applied directly to its detective member by a human. But, the capacitance type sensor is also used for detecting a force applied to its detective member through another member. Therefore, the capacitance type sensor is also usable as a position sensor in which one end of an interconnecting member is connected to the detective member for detecting a position of an object of positional detection connected to the other end of the interconnecting member, for example. In this case, without such an interconnecting member, the detective member may be attached to the object of positional detection. Further, a conductive or insulating member may be attached directly to the object of positional detection.

INDUSTRIAL APPLICABILITY

The present invention is suitable as a capacitance type sensor that is superior in withstand voltage characteristic, able to simplify the manufacturing process, and usable as an input device for a personal computer, a portable telephone, games, or the like.

What is claimed is:

1. A capacitance type sensor comprising:
a substrate determining an XY-plane in a defined XYZ three-dimensional coordinate system;
a detective member facing said substrate;
a conductive member facing said substrate;
a plurality of capacitance element electrodes formed on said substrate and cooperating with said conductive member to form a plurality of first capacitance elements, respectively;
a reference electrode formed on said substrate and cooperating with said conductive member to form a second capacitance element, wherein said reference electrode is grounded or kept at a certain potential; and
an insulating member disposed in between said conductive member and said plurality of capacitance element electrodes, and movable in parallel with said substrate as said detective member is moved along said XY-plane,
wherein said plurality of first capacitance elements are operatively connected in series with said second capacitance element, respectively, and
wherein displacement of said detective member is detected on the basis of detection of changes in the respective capacitance values of said plurality of first capacitance elements caused by a change, along said XY-plane, of the position of an end portion of said insulating member between said conductive member and said plurality of capacitance element electrodes.

2. A capacitance type sensor comprising:
a substrate determining an XY-plane in a defined XYZ three-dimensional coordinate system;
a detective member facing said substrate;
a conductive member disposed in between said substrate and said detective member, wherein said conductive member is Z-axially movable as said detective member is Z-axially moved;
a plurality of capacitance element electrodes formed on said substrate and cooperating with said conductive member to form a plurality of first capacitance elements, respectively; and
a reference electrode formed on said substrate and cooperating with said conductive member to form a second capacitance element, said reference electrode being grounded or kept at a certain potential,
wherein said plurality of first capacitance elements are operatively connected in series with said second capacitance element, respectively, and
wherein displacement of said detective member is detected on the basis of detection of changes in the respective capacitance values of said first capacitance elements caused by changes in the distance between said conductive member and at least one of said plurality of first capacitance element electrodes.

3. A capacitance type sensor comprising:
a conductive member determining an XY-plane in a defined XYZ three-dimensional coordinate system;
a plurality of capacitance element electrodes cooperating with said conductive member to form a plurality of first capacitance elements, respectively;
a reference electrode cooperating with said conductive member to form a second capacitance element, wherein said reference electrode is grounded or kept at a certain potential; and
a detective member Z-axially movable to displace distance between said conductive member and at least one of said plurality of capacitance element electrodes, and
wherein said plurality of first capacitance elements are operatively connected in series with said second capacitance element, respectively, and
wherein displacement of said detective member is detected on the basis of detection of changes in the respective capacitance values of said plurality of first capacitance elements caused by changes in the distance.

4. The capacitance type sensor according to claim 3, further comprising an insulating film formed in close contact with said plurality of capacitance element electrodes and said reference electrode to cover said plurality of capacitance element electrodes and said reference electrode.

5. The capacitance type sensor according to claim 3, comprising a single reference electrode.

6. The capacitance type sensor according to claim 3, comprising a plurality of reference electrodes.

7. The capacitance type sensor according to claim 3, wherein said plurality of capacitance element electrodes are in pairs.

8. The capacitance type sensor according to claim 3, signals different in phase from each other are supplied to a circuit including one of said plurality of capacitance element electrodes and a circuit including another of said plurality capacitance element electrodes.

9. The capacitance type sensor according to claim 3, wherein a signal periodically alternating between a high level and a low level is input to at least one of said plurality of capacitance electrodes, said sensor further comprising a control element to discharge at least the one of said plurality of first capacitance elements when said signal is at the low level, wherein an open-collector type inverter element is used as said control element.

10. A capacitance type sensor comprising:
a conductive member determining an XY-plane in a defined XYZ three-dimensional coordinate system;
a plurality of capacitance element electrodes cooperating with said conductive member to form a plurality of first capacitance elements, respectively;
a reference electrode cooperating with said conductive member to form a second capacitance element, wherein said reference electrode is grounded or kept at a certain potential;
an insulating member disposed in between said conductive member and said pair of capacitance element electrodes; and
a detective member movable along said XY-plane to change a positional relationship between said insulating member and at least one of said conductive member and said plurality of capacitance element electrodes,
wherein said plurality of first capacitance elements are operatively connected in series with said second capacitance element, respectively, and
wherein displacement of said detective member is detected on the basis of detection of changes in the respective capacitance values of said plurality of first capacitance elements caused by a change of the positional relationship.

11. The capacitance type sensor according to claim 10, wherein a CR circuit including one of said plurality of capacitance element electrodes differs in time constant from a CR circuit including another of said plurality of capacitance element electrodes.

12. The capacitance type sensor according to claim 10, wherein output signals obtained from signals respectively input to a circuit including one of said plurality of capacitance element electrodes and a circuit including another of said plurality of capacitance element electrodes are detected with a signal processing circuit utilizing a logic element.

13. The capacitance type sensor according to claim 12, wherein said logic element performs an exclusive-OR operation.

14. The capacitance type sensor according to claim 12, wherein said logic element performs an OR operation.

15. The capacitance type sensor according to claim 12, wherein said logic element performs an AND operation.

16. The capacitance type sensor according to claim 10, wherein signal periodically alternating between a high level and a low level is input to at least one of said plurality of first capacitance elements, and said sensor further comprises a control element to discharge at least the one of said plurality of first capacitance elements when said signal is at the low level.

17. The capacitance type sensor according to claim 16, wherein an open-collector type inverter element is used as said control element.

18. The capacitance type sensor according to claim 1, comprising a single reference electrode.

19. The capacitance type sensor according to claim 1, comprising a plurality of reference electrodes.

20. The capacitance type sensor according to claim 1, wherein said plurality of capacitance element electrodes are in pairs.

21. The capacitance type sensor according to claim 10, wherein signals different in phase from each other are supplied to a circuit including one of said plurality of capacitance element electrodes and a circuit including another of said plurality of capacitance element electrodes.

22. The capacitance type sensor according to claim 10, further comprising an insulating film formed in close contact with said plurality of capacitance element electrodes and said reference electrode to cover said plurality of capacitance element electrodes and said reference electrode.

23. A capacitance type sensor comprising:
a substrate determining an XY-plane in a defined XYZ three-dimensional coordinate system;
a detective member facing said substrate;
a conductive member disposed in between said substrate and said detective member, wherein said conductive member is Z-axially movable as said detective member is Z-axially moved;
a pair of first capacitance element electrodes formed on said substrate symmetrically with respect to a Y-axis and cooperating with said conductive member to form a pair of first capacitance elements, respectively;
a pair of second capacitance element electrodes formed on said substrate symmetrically with respect to an X-axis and cooperating with said conductive member to form a pair of second capacitance elements, respectively;
a third capacitance element electrode formed on said substrate in proximity of an origin of said XYZ three-dimensional coordinate system and cooperating with said conductive member to form a third capacitance element; and
a reference electrode formed on said substrate and cooperating with said conductive member to form a fourth capacitance element, wherein said reference electrode is grounded or kept at a certain potential,
wherein each of said pair of first capacitance elements, said pair of second capacitance elements, and said third capacitance element is operatively connected in series with said fourth capacitance element, and
wherein displacement of said detective member is detected on the basis of detection of changes in the respective capacitance values of said pair of first capacitance elements, said pair of second capacitance elements, and said third capacitance element caused by changes in distances between said conductive member and said pair of first capacitance element electrodes, said pair of second capacitance element electrodes, and said third capacitance element electrode.

24. The capacitance type sensor according to claim 23, wherein said reference electrode is formed outside said third capacitance element electrode,
wherein said pair of first capacitance element electrodes and said pair of second capacitance element electrodes are formed outside said reference electrode, and
wherein said sensor further comprises a fourth capacitance element electrode disposed in contact with said reference electrode and at a distance from said third capacitance element electrode to cover said third capacitance element electrode,
wherein said fourth capacitance element electrode comes into contact with said third capacitance element electrode when said conductive member is moved an external force applied to said detective member.

25. The capacitance type sensor according to claim 23, wherein said detective member and said conductive member are formed into one body.

26. The capacitance type sensor according to claim 23, wherein said conductive member is made of an elastic material.

27. The capacitance type sensor according to claim 23, further comprising a supporting member for supporting said conductive member, wherein said supporting member is made of an elastic material.

28. The capacitance type sensor according to claim 23, wherein a protrusion is formed on said conductive member at a position facing said third capacitance element electrode.

29. The capacitance type sensor according to claim 23, wherein said detective member is divided into parts so as to correspond to said pair of first capacitance element electrodes, to said pair of second capacitance element electrodes, and to said third capacitance element electrode, respectively.

30. The capacitance type sensor according to claim 23, wherein said detective member is divided into parts so as to correspond to said pair of first capacitance element electrodes and said pair of second capacitance element electrodes and to said third capacitance element electrode, respectively.

31. The capacitance type sensor according to claim 23, wherein at least a part of a surface of said conductive member facing said pair of first capacitance elements, said pair of second capacitance elements, and said third capacitance element electrode is made uneven in height.

32. The capacitance type sensor according to claim 23, wherein said conductive member comprises:
   a displacement portion movable as said detective member is moved by receiving an external force;
   a fixed portion fixed to said substrate; and
   an interconnecting portion for interconnecting said displacement and fixed portions,
   wherein said pair of first capacitance element electrodes and said pair of second capacitance element electrodes are formed outside said third capacitance element electrode, and
   wherein said reference electrode is formed outside said pair of first capacitance element electrodes and said pair of second capacitance element electrodes.

33. The capacitance type sensor according to claim 23, wherein said reference electrode comprises a first reference electrode and a second reference electrode, either of which is grounded or kept at a certain potential,
   wherein said conductive member is divided into parts so as to correspond to said pair of first capacitance element electrodes and said pair of second capacitance element electrodes and said third capacitance element electrode, respectively,
   wherein said first reference electrode is formed outside said third capacitance element electrode,
   wherein said pair of first capacitance element electrodes and said pair of second capacitance element electrodes are formed outside said first reference electrode, and
   wherein said second reference electrode is formed outside said pair of first capacitance element electrodes and said pair of second capacitance element electrodes.

* * * * *

UNITED STATES PATENT AND TRADEMARK OFFICE
CERTIFICATE OF CORRECTION

PATENT NO. : 6,989,677 B2
APPLICATION NO. : 10/432939
DATED : January 24, 2006
INVENTOR(S) : Morimoto, Hideo It is certified that error appears in the above-identified patent and that said Letters Patent is hereby corrected as shown below:

On the Title Page, (30) Foreign Application Priority Data, insert the following:
--Nov. 30, 2000 (JP) 2000-364730--.

Signed and Sealed this

Twenty-second Day of August, 2006

JON W. DUDAS
*Director of the United States Patent and Trademark Office*